US008234218B2

(12) United States Patent
Robinson et al.

(10) Patent No.: US 8,234,218 B2
(45) Date of Patent: Jul. 31, 2012

(54) METHOD OF INSERTING/OVERLAYING MARKERS, DATA PACKETS AND OBJECTS RELATIVE TO VIEWABLE CONTENT AND ENABLING LIVE SOCIAL NETWORKING, N-DIMENSIONAL VIRTUAL ENVIRONMENTS AND/OR OTHER VALUE DERIVABLE FROM THE CONTENT

(75) Inventors: Jack Robinson, Vacaville, CA (US); Peter Muller, Woodside, CA (US); Timothy Noke, Santa Clara, CA (US); Teng Lew Lim, Mountain View, CA (US); Wallace Glausi, Menlo Park, CA (US); Larry Fullerton, New Hope, AL (US)

(73) Assignee: AddnClick, Inc, Vacaville, CA (US)

( * ) Notice: Subject to any disclaimer, the term of this patent is extended or adjusted under 35 U.S.C. 154(b) by 1083 days.

(21) Appl. No.: 12/004,392

(22) Filed: Dec. 19, 2007

(65) Prior Publication Data

US 2008/0163379 A1 Jul. 3, 2008

Related U.S. Application Data

(63) Continuation-in-part of application No. 09/686,206, filed on Oct. 10, 2000, now abandoned, and a continuation-in-part of application No. 09/749,091, filed on Dec. 26, 2000, now abandoned, and a continuation-in-part of application No. 11/982,707, filed on Nov. 2, 2007, and a continuation-in-part of application No. 11/477,162, filed on Jun. 28, 2006, now abandoned.

(60) Provisional application No. 60/877,891, filed on Dec. 28, 2006, provisional application No. 60/918,984, filed on Mar. 19, 2007.

(51) Int. Cl.
*G06F 21/00* (2006.01)
*G06F 7/04* (2006.01)
(52) U.S. Cl. .......... 705/54; 705/58; 705/59; 705/14.23; 705/902; 726/27
(58) Field of Classification Search .................... 705/54
See application file for complete search history.

(56) References Cited

U.S. PATENT DOCUMENTS

| 6,072,483 | A | 6/2000 | Rosin et al. |
| 6,313,855 | B1 | 11/2001 | Shuping et al. |
| 6,357,042 | B2 * | 3/2002 | Srinivasan et al. .............. 725/32 |
| 6,381,747 | B1 * | 4/2002 | Wonfor et al. ................ 725/104 |
| 6,442,590 | B1 | 8/2002 | Inala et al. |

(Continued)

OTHER PUBLICATIONS

"Programming Actionscript 3.0", Adobe Systems Incorporated, all pages, 2007.*

(Continued)

*Primary Examiner* — James A Reagan
*Assistant Examiner* — Calvin Cheung
(74) *Attorney, Agent, or Firm* — Ater Wynne LLP

(57) ABSTRACT

A method by which a User can associate selectable Markers, Data Packets and/or Objects with Content. The Content may generally be distributed electronically, and the Markers allow for insertion and/or overlay of Objects when the Content is selected for viewing by a Viewer. Objects and Data Packets are generally provided by a User, Promoter, Host, Service, or other entity to convey information to a Viewer. A Service provides tools and capabilities to both the User and the Promoter to facilitate their respective actions according to embodiments of the invention, including enabling the creation of live social networks (such as those linked to a specific Service provider, a specific User group, activities by a specific Promoter, and/or to specific Data Packets) and the creation of n-dimensional Virtual Environments.

23 Claims, 42 Drawing Sheets

U.S. PATENT DOCUMENTS

| | | | |
|---|---|---|---|
| 6,973,445 | B2 | 12/2005 | Tadayon et al. |
| 7,123,814 | B2 | 10/2006 | David |
| 7,158,666 | B2 | 1/2007 | Deshpande et al. |
| 7,168,051 | B2 | 1/2007 | Robinson et al. |
| 2004/0100480 | A1 | 5/2004 | Lupu |
| 2004/0227768 | A1 | 11/2004 | Bates et al. |
| 2006/0218225 | A1 | 9/2006 | Hee Voon et al. |
| 2007/0038931 | A1 | 2/2007 | Allaire et al. |
| 2007/0124157 | A1 | 5/2007 | Laumeyer et al. |
| 2007/0150603 | A1 | 6/2007 | Crull et al. |
| 2007/0157228 | A1 | 7/2007 | Bayer et al. |
| 2007/0192352 | A1 | 8/2007 | Levy |
| 2007/0271156 | A1* | 11/2007 | Sarusi et al. .................. 705/27 |
| 2008/0040683 | A1* | 2/2008 | Walsh ........................ 715/786 |
| 2008/0301304 | A1 | 12/2008 | Chitsaz et al. |
| 2010/0299199 | A1* | 11/2010 | Kang ........................ 705/14.49 |

OTHER PUBLICATIONS

International Preliminary Report on Patentability for Int'l Patent App. No. PCT/US2009/001613; dated Sep. 28, 2010 (7 pages).

Parthasarathy, Pramila; Non-Final Office Action dated Dec. 27, 2010 from U.S. Appl. No. 12/004,622 (20 pages).

Dragoi, Octavian, The Continuum Architecture: "Towards Enabling Chaotic Ubiquitous Computing." A thesis presented to the Univ. of Waterloo, 2004.

International Search Report for Int'l Appl. No. PCT/US08/13938, ISA/US, 2009, 9 pages.

International Search Report for Int'l Appl. No. PCT/US08/13926, ISA/US, 2009, 11 pages.

Riegler, Final Office Action dated Sep. 21, 2011 from U.S. Appl. No. 12/079,730 (30 pgs)

Applicant's Response to Office Action dated Aug. 1, 2011 from U.S. Appl. No. 12/004,622, filed Nov. 15, 2011 (10 pgs).

Applicant's Pre Appeal Brief filed in U.S. Appl. No. 12/079,730 on Jan. 23, 2012 (7 pgs).

Notice of Panel Decision of Pre-Appeal Brief Review from U.S. Appl. No. 12/079,730 dated Feb. 12, 2012 (2 pgs).

* cited by examiner

Music Industry Application

Music Industry Application of the Invented Insert/Overlay of Markers, Objects, Data packets, Content, Virtual Environments and Live Social Networking, as an Alternative Means of Monetizing Songs and Music.

There is a unique opportunity for Music Labels (companies) and Independent Musicians to let Internet Listeners help them generate potentially more revenue via new internet techniques than through traditional sales of their Songs and Music (collectively referred to as the "Music").

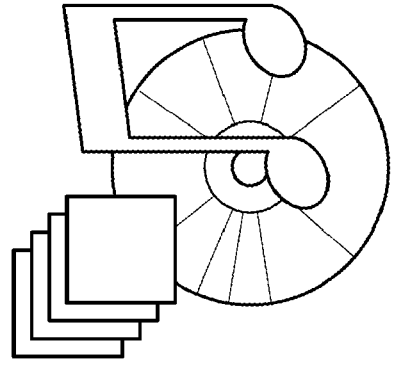

FIG.17a

Music Industry Application

Music Labels and Independent Musicians can register their music with a Service that would allow them to Insert/Overlay Markers and Data Packets on and into their Music.

These Markers and Data packets are information that will allow the association/placement of Content and Internet Actions relative to their Music.

Music Industry Application

On playback of the Music, the Markers and the Data Packets in the Music send information to a server at one or more Service Providers (e.g., for the Music Label/ Independent Musicians) or of some other Promoter.

Music Industry Application

The Listener can be allowed to Insert/Overlay Markers/Objects/Data Packets in the Music they are listening to (that will be registered with the Service), giving the Listener an opportunity to participate in revenue sharing from the placement of Content (in the music or its environment) ... such as advertisements and sales for local music clubs, concerts, messages to others in a Music fan club, direct purchases of additional music from the Music Label and Independent Musicians having quality and formats not available from "ripped" Music on the internet.

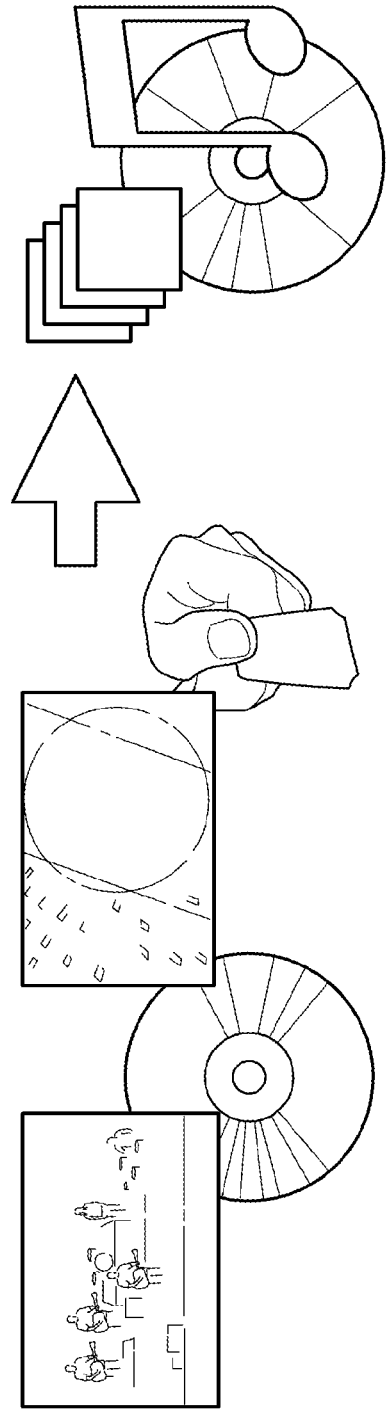

FIG.17e

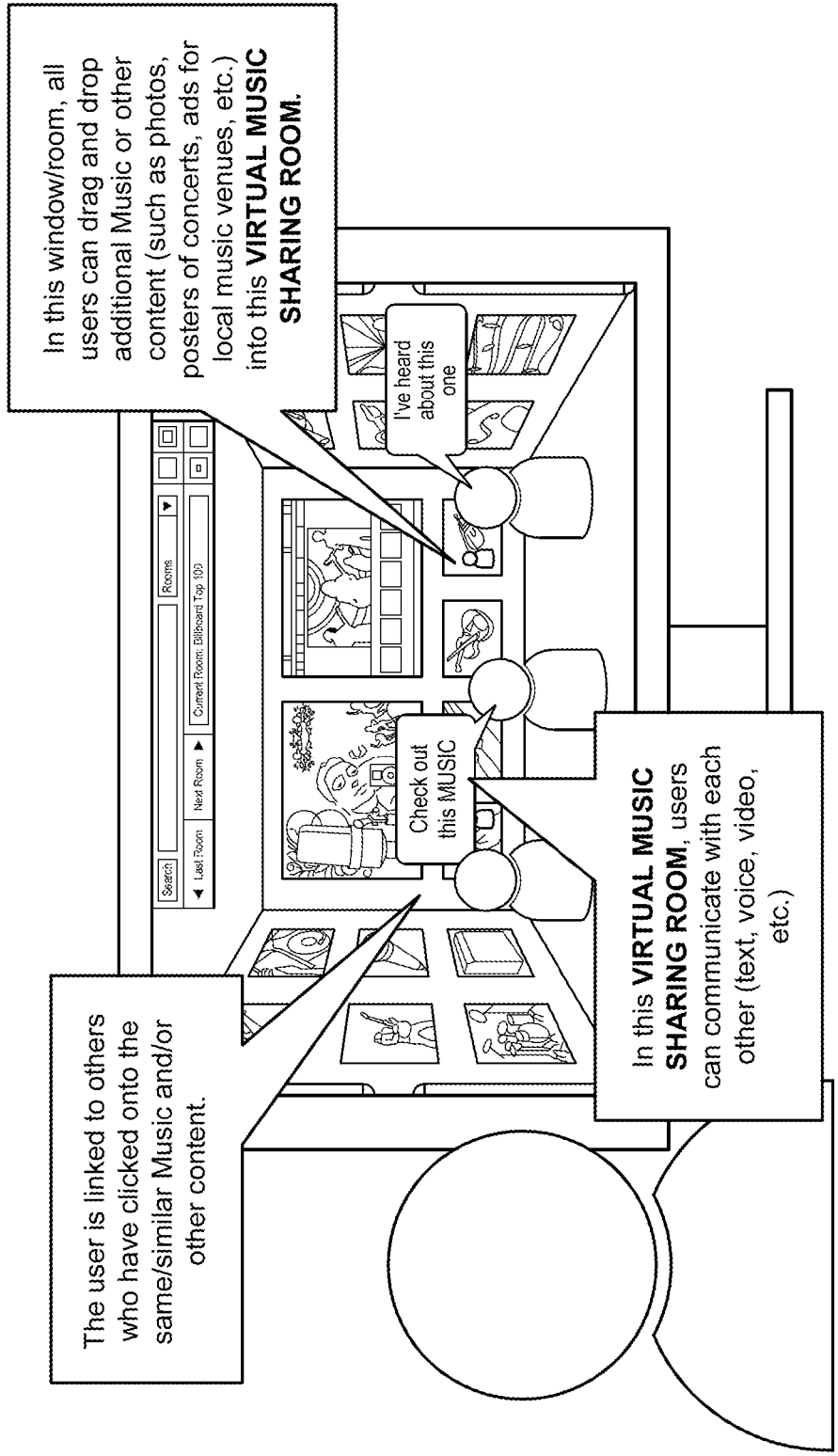

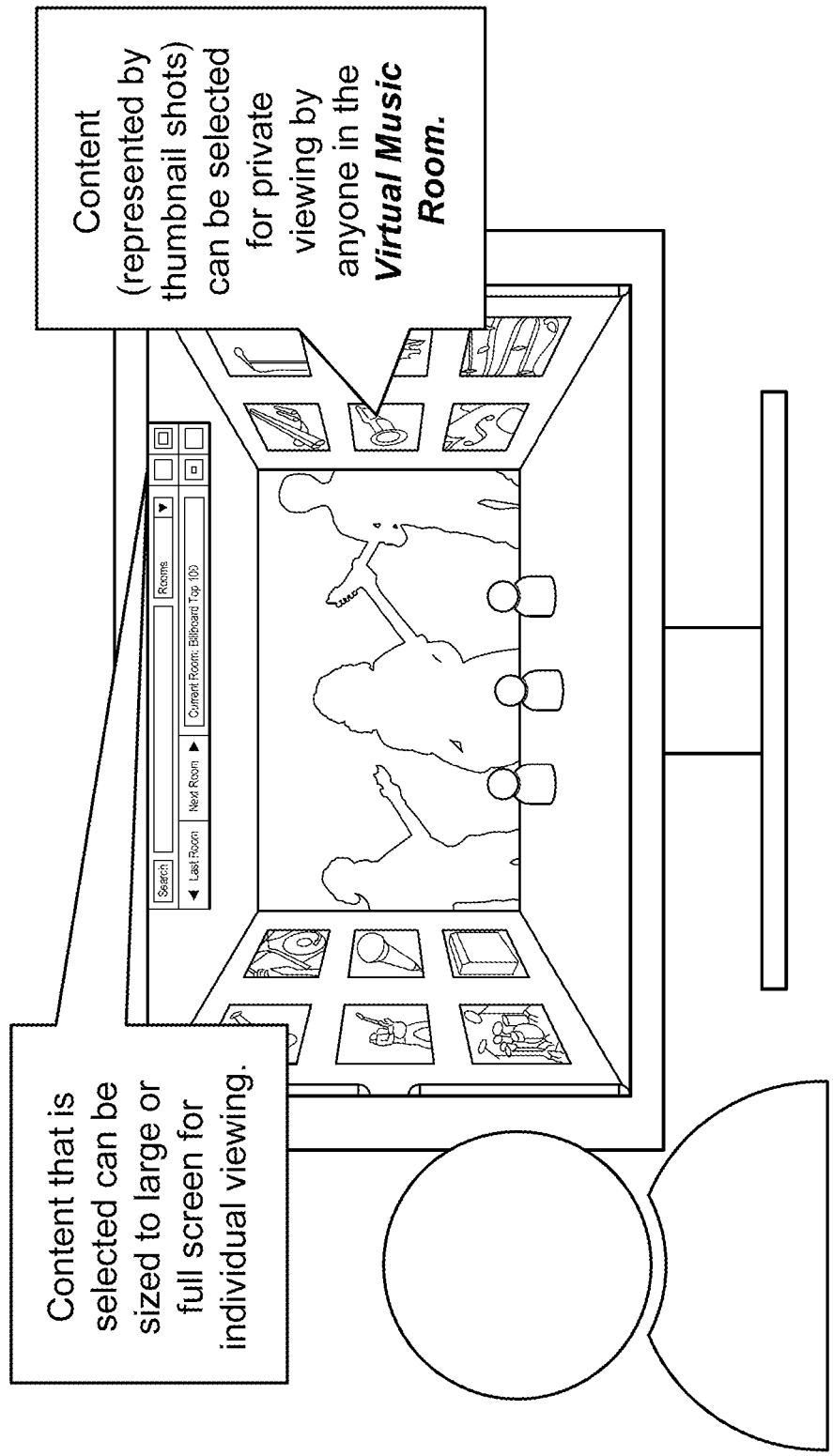

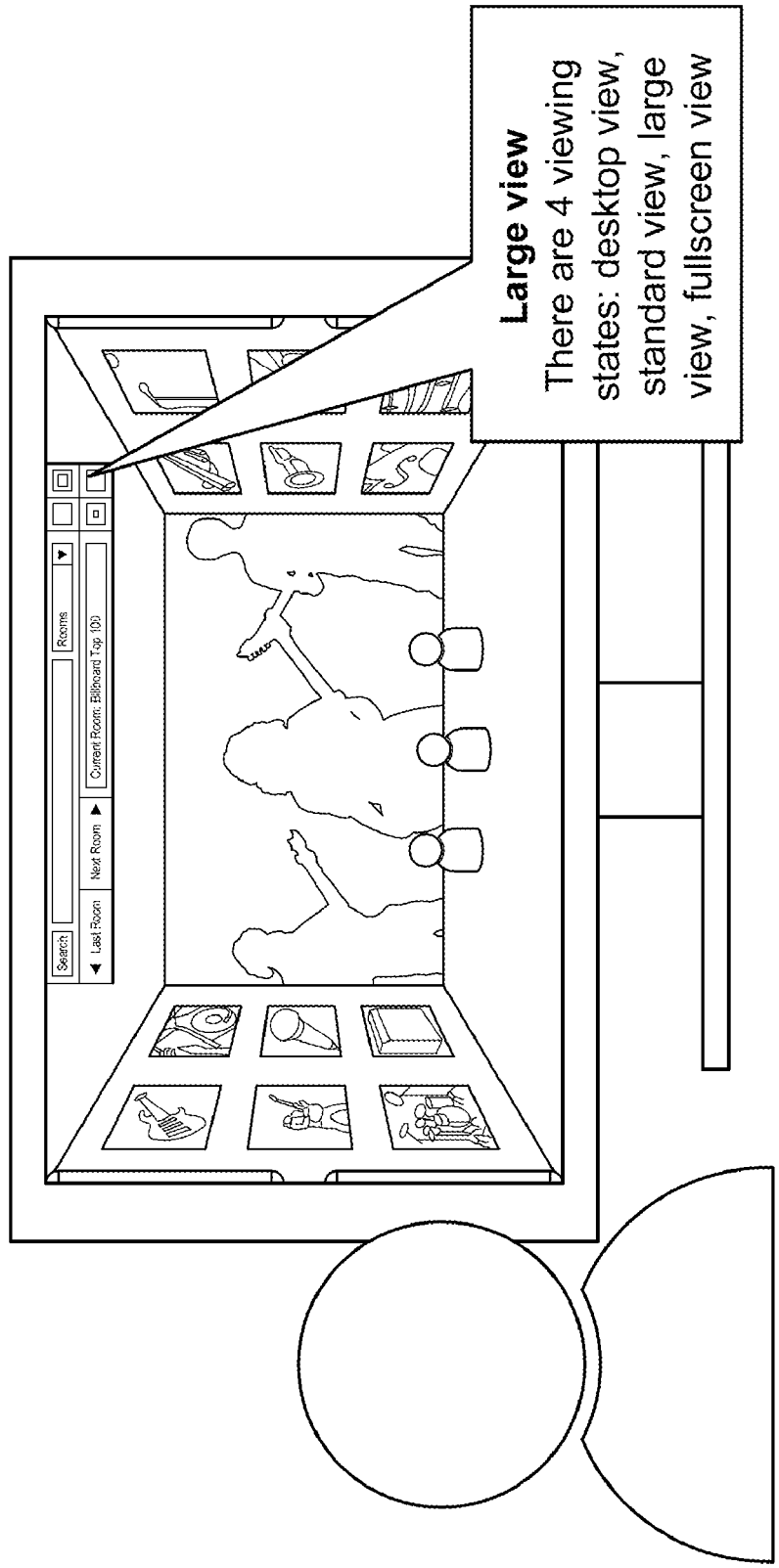

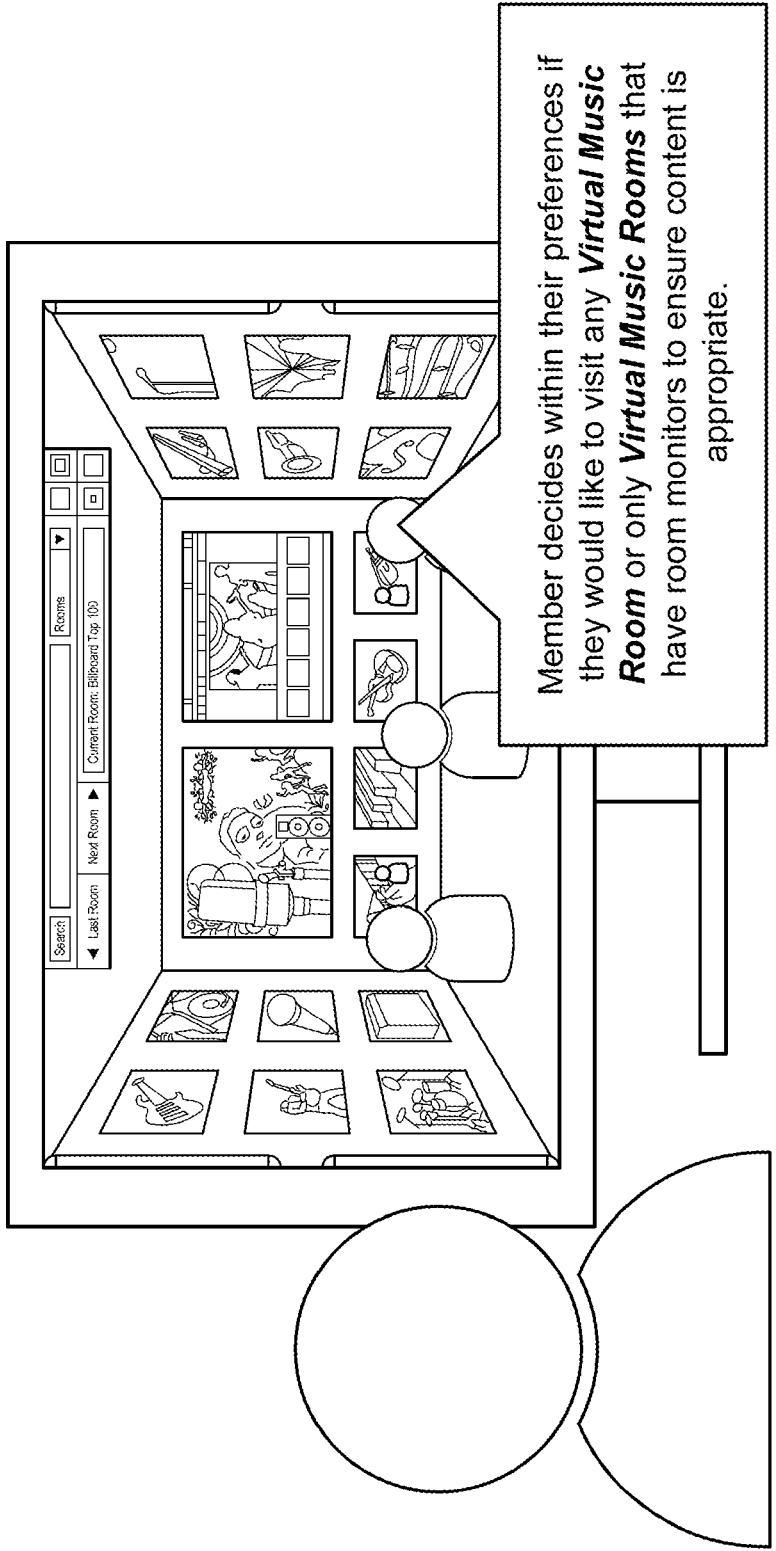

Discussion Virtual Music Rooms

*Discussion Virtual Music Rooms* can contain an ongoing dialog between Music listeners (a chat room or forum).

Co-Browsing Virtual Music Rooms

A single member hosts other members and they all stay together as the host goes from one *Virtual Music Room* to another, and the host can take the members of that *Virtual Music Room* to sites on the internet that they can all share together simultaneously (co-browsing).

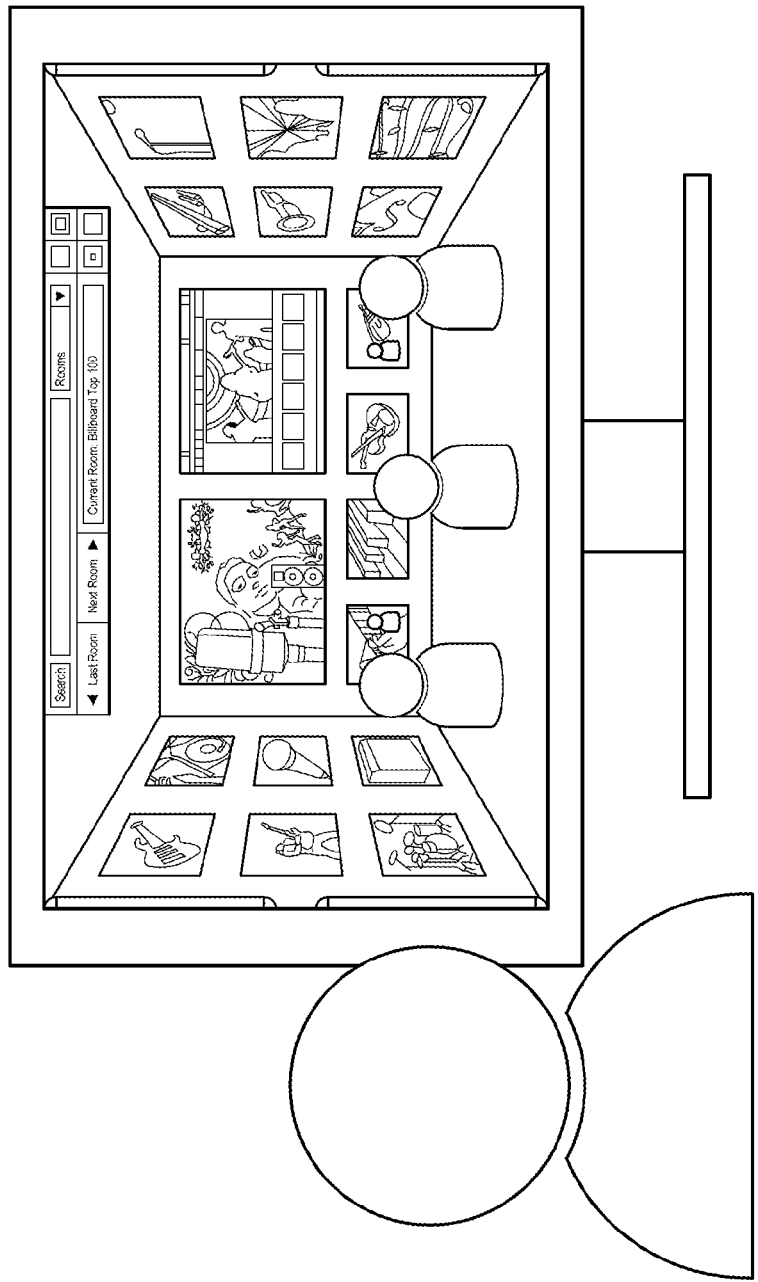

METHOD OF INSERTING/OVERLAYING MARKERS, DATA PACKETS AND OBJECTS RELATIVE TO VIEWABLE CONTENT AND ENABLING LIVE SOCIAL NETWORKING, N-DIMENSIONAL VIRTUAL ENVIRONMENTS AND/OR OTHER VALUE DERIVABLE FROM THE CONTENT

RELATED APPLICATIONS

The present application is a Continuation-in-Part of and claims the benefit of priority to U.S. patent application Ser. No. 09/686,206 filed 10 Oct. 2000 now abandoned; the present application is also a Continuation-in-Part of and claims the benefit of priority to U.S. patent application Ser. No. 09/749,091 filed 26 Dec. 2000 now abandoned; the present application is also a Continuation-in-Part of and claims the benefit of priority to U.S. patent application Ser. No. 11/982,707 filed on 2 Nov. 2007; the present application is also a Continuation-in-Part of and claims the benefit of priority to U.S. patent application Ser. No. 11,477,162 filed 28 Jun. 2006 now abandoned; the present application also claims the benefit of priority to U.S. Provisional Patent Application Ser. No. 60/877,891 filed 28 Dec. 2006; and the present application also claims the benefit of priority to U.S. Provisional Patent Application Ser. No. 60/918,984 filed 19 Mar. 2007; the disclosures of which are incorporated herein in their entirety by this reference. The present application also incorporates herein by this reference the entire disclosures of each of U.S. Provisional Patent Application Ser. No. 60/856,404 filed 2 Nov. 2006, U.S. patent application Ser. No. 09/745,257 filed 20 Dec. 2000 and issued as U.S. Pat. No. 7,168,051 on 23 Jan. 2007, and U.S. patent application Ser. No. 09/384,606 filed on 27 Aug. 1999 and granted as U.S. Pat. No. 6,553,566 on 22Apr. 2003.

FIELD OF THE INVENTION

This invention relates generally to the field of electronically transmittable information. More particularly, it concerns supplementing content which is viewable via electronic devices so that additional informational content is available to content viewers to enable commerce, brand building, communications, and social networking, among other things.

BACKGROUND OF THE INVENTION

Viewable content available today, such as that downloadable from the internet and/or created and distributed by a wide variety of sources, generally contains and conveys to viewers a limited amount of information. As much information as the Content has at the time of creation, it generally consists of that same amount of information throughout its existence. Content may be edited from time to time to create new content, but generally the quantity and quality of the content remains relatively constant (e.g., static, unchanging).

Content creators can generate a revenue stream by the sale, rental, licensing, or other provision of content to consumers of content, but a continued revenue stream largely depends upon continued creation and distribution of new content. Content creators may also generate some revenue through 'product placement', in which merchandisers pay content creators to place their merchandise prominently in content. For example, the Ford Motor Company and/or Coca-Cola, Inc. may pay a movie producer to have a main character in a movie drink Coca-Cola branded beverages and drive a Ford Mustang convertible. However, once the movie is filmed, edited, and distributed, no more revenue can be obtained from product placements within that movie content. The content is static in quality, and has a limited revenue generation curve.

Viewers also receive only static content, which becomes uninteresting once viewed one or more times, and may in fact be uninteresting from the moment of creation. Viewers must search through a multitude of content sources to find content that is interesting and relevant to them. Separately, they shop, interact, gather news, and carry on many other activities, each activity relatively independent from each other. In this age of proliferating information, viewers consume tremendous amounts of time pursuing information that is personally relevant and interesting.

DETAILED DESCRIPTION OF THE PREFERRED EMBODIMENTS

Figure 1A:
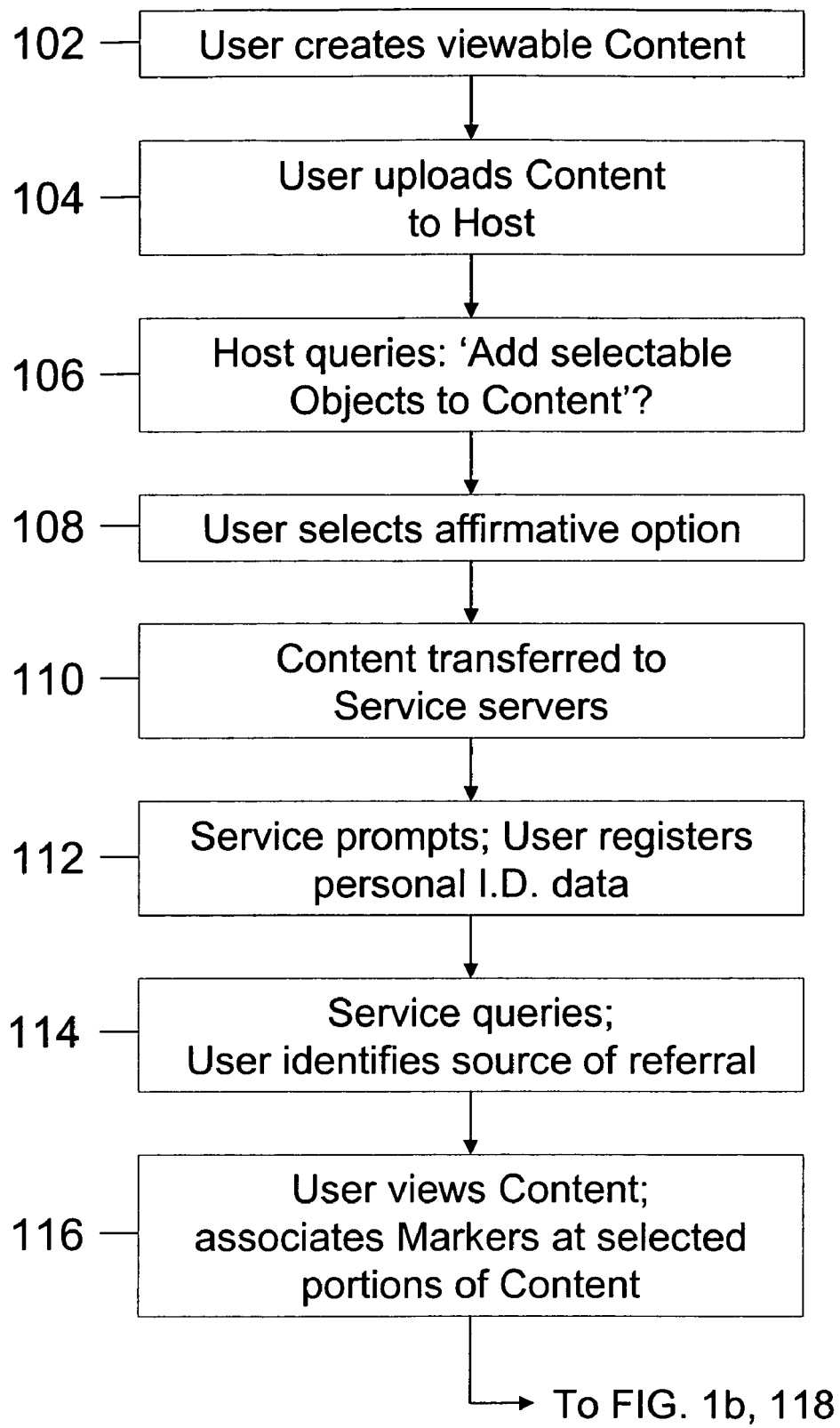
FIGS. 1a-1b are block diagrams depicting a plurality of operations including content upload and registration according to an embodiment of the invention.

The invention in accordance with a preferred embodiment involves a system and method by which a User can place selectable Markers into Content. The Content may generally be distributed electronically, and the Markers allow for insertion and/or overlay of Objects when the Content is selected for viewing by a Viewer. Objects are generally provided by a Promoter to convey information to a Viewer. A Service provides tools and capabilities to both the User and the Promoter to facilitate their respective actions, as described in detail below. Viewers can be linked concurrently with other Viewers in live social networks that are created and based substantially upon the same, similar and/or specific attributes of Markers, Objects and/or Data Packets included in content. Live social networks may be linked to a specific Service provider, a specific User group, activities undertaken by a specific Promoter, and/or to specific Data Packets.

For purposes of clarity, general definitions are provided for some of the terms used throughout this description. These definitions are not intended to limit the scope of each term, but only to provide an initial understanding so that the reader can readily recognize and understand the terms when used herein. Those having ordinary skill in the art will recognize from the overall specification that each term has a more expansive scope according to alternate embodiments than is contained in these brief summary definitions.

"Content" includes any viewable content, including images, whether static (e.g., still photographs, artwork) or non-static (e.g., video, animation), whether original (e.g., user-created) or not (e.g., obtained by User from another source), interactive Content, such as n-dimensional Virtual Environments and n-dimensional Virtual Worlds, whether electronically transmittable to a Viewer (e.g., via internet) or transferred to a Viewer on an electronic storage medium (e.g., a digital video disc (DVD)), audio or text, that may be viewed on an internet-connected (or connectable) electronic device. Examples of Content include video, video games, still images, any motion content, video conference calls, live video feeds, n-dimensional virtual environments and/or worlds, etc., blogs, podcasts, and vlogs. Nor should Content be considered limited to those types listed here, but can encompass all presently available and/or foreseeable forms of electronic media and/or content that is or can be visually displayed. Content including an associated marker and/or data packet may be referred to as "Marked Content", and can exist as a separate content layer overlying, corresponding to, and dynamically responsive to a layer of viewable content.

A "User" is an entity (e.g., individual, company, organization, governmental body) that provides Content that may be accessed and viewed by a Viewer. A User is generally human, but may include electronic systems or devices designed to perform all or some subset of the operations that a User performs as described herein. For example, a User can be a camera or video monitor coupled with pattern and/or image recognition software for tracking, monitoring, cataloguing, archiving, and/or reporting Content. An 'n-User' is any User who edits already marked Content, whether or not the n-User has registered with the Service.

A "Viewer" accesses Content provided by a User. A Viewer is generally human, but may include electronic systems or devices designed to perform all or some subset of the operations that a Viewer performs as described herein. For example, a Viewer can be a camera or video monitor coupled with pattern and/or image recognition software for tracking, monitoring, cataloguing, archiving, and/or reporting Content. A Viewer may not actually View Content visually, but may access the Content nonetheless and be considered a Viewer. Further, identification as a Viewer is not limited by whether Objects inserted and/or overlaid at Markers within the Content are viewable, or rather may convey primarily, partially, or entirely information of some other sensory nature (e.g., audio). In some embodiments, a Viewer can also be a reader or a listener.

A "Promoter" is any entity (e.g., individual, company, organization, government) with the intent to provide information and/or content (e.g., brands, products, etc.) to Viewers. A User, Host and/or a Service can also be a Promoter in some embodiments of the invention.

A "Marker" is generally software (e.g., device executable code) configured to be associated with (e.g., inserted into or overlaid upon) Content. A Marker may occupy a relatively fixed position relative to the viewable Content, or it may be associated with the Content so that the Marker's position is variable relative to the viewable Content. Markers can be generic shapes and/or symbols representing an insertion/overlay point for an Object to be inserted and/or overlaid relative to a Content image. A Marker may be either visible or invisible to a Viewer when viewing Content. A unique identification code can be associated with or encoded into each Marker, and can be used to associate the Marker with particular Content, Promoters and/or Objects. A Marker can provide a 'placeholder' and/or 'insertion/overlay' point in Content for the placement of one or more Objects.

An "Object" is any piece of information that a Promoter wishes viewers to access. Objects can include brand names, brand objects, messages (audio, visual, text, or links thereto), although the embodiments are not in any way limited to this partial list. Objects can include audio or other information that may be either partially or entirely non-viewable, yet conveys information and/or data to a viewer. Objects can also be associations, links (e.g., hyperlinks), or virtual conduits that link the Viewer to informational content provided by a Promoter. An Object can also be a hotspot including data linking a Viewer with other Viewers and/or social networks. An "Object" can also provide access to an n-dimensional virtual environment or n-dimensional virtual world that Viewers can view and/or enter, and that users can be transported or travel through to other n-dimensional virtual environments or n-dimensional virtual worlds. Objects can be either persistent (e.g., permanent) or temporary virtual images, and can be changed on a computer or on a server. Objects can be changed remotely (e.g., via the internet) or placed at (e.g., associated with) a Marker in Content at any time by the source of the Content (e.g., a User), by a third party, or by a computer program or computer/internet-based system for placement of Objects. Objects can be specific to a geographical area where a Viewer is located, or specifically targeted to the demographics of a Viewer. An Object may be either visible or invisible to a viewer, and may be a virtual environment, or may link to a virtual environment. Objects may also be self-executing (e.g., software code) when Content is selected for viewing, viewed, stored, or otherwise operated upon by a Viewer. Therefore, a self-executing Object may not require a Viewer to select the Object as a prerequisite to obtaining information from the Object.

A "Service" provides tools and/or capabilities to a user enabling the user to associate Markers with Content. A Service also provides tools and/or capabilities to a Promoter enabling the Promoter to insert and/or overlay objects at Markers in Content. A Service can detect and track access to marked Content and Objects to assign rights to compensation (e.g., payment) to Users, Promoters, Hosts, the Service, or others. When a Promoter, Host or other third party is able to perform activities according to embodiments of the invention, perhaps using tools, capabilities, or authority provided by the Service, the Promoter, Host or third party so acting may also be considered 'the Service' with regard to those actions. In general, the tools referred to herein are primarily or entirely software-based tools configured for execution on or by a device that can be connected, either directly or indirectly, to the Internet or another network (e.g., an internet-linkable or linked device).

A "Host" is an internet-accessible repository for Content (e.g., website) at or through which Viewers can access Content provided by Users. Examples of Hosts could include Google Images, YouTube, CNN.com, or virtually any other at which viewable Content may be made available to a Viewer by a User. The number of potential Hosts is virtually innumerable, and increasing nearly every day.

A "Social Network" is a social structure generally comprising a plurality of interconnected nodes, each of which are typically, although not exclusively, individuals or organizations. Social networking can refer to a category of internet applications that help connect friends, business partners, or other individuals together using a variety of tools. A "live social network" is a Social Network in which members engage with each other concurrently, so interactions in a live social network are substantially as responsive and real-time as interactions between people meeting face-to-face.

"Metadata" is information about data and/or other information. Metadata is typically structured, encoded data that describe characteristics of information-bearing entities to aid in identifying, locating, discovering, assessing, and managing the described entities. Metadata described herein can also include "keywords".

A "Data Packet" is typically a discrete and complete unit of executable data configured to be associated with and/or relative to Content. In embodiments, a Data Packet may include compressed or uncompressed instructional data and/or an audio/video packet and can be associated with content by an n-User, a Promoter, a Host, a Service, or by another entity. A Data Packet can be recognized by software and segregated to reveal compressed or uncompressed audio/video/instructional/executable data, or an n-dimensional virtual environment and/or world that Viewers can view and/or virtually participate within. A Data Packet can also be placed within, and be used as a portal from one n-dimensional virtual environment and/or world to another or to other Content. A Data Packet may subsequently be executed, or stored for later execution, filing or retrieval, and/or the Data Packets could be viewed on the screen of a target viewing and/or listening device (e.g. a desktop, webtop, television, computer, mobile telephone, electronic book, video game unit, Personal Digital Assistant, radio, internet radio, a networked device). Data Packets can be self-executing, so that the data in a packet executes immediately when the Content is viewed. Alternatively, a data packet may execute at the completion of a predetermined delay (e.g., predetermine and set by the User) after a Viewer begins viewing Content. Additionally, a Data Packet may execute and run in a separate window on a User's device display, with or without instruction from the viewer. A Data Packet could enable messages to be placed within Content and to be retrieved by an n-user.

A "virtual environment" is a computer simulation of a real or imaginary environment. A virtual environment may allow people to enter and interact within n-dimensional computer graphics worlds. A "virtual world" is a computer-based simulated environment intended for its users to inhabit and interact via avatars. This habitation usually is represented in the form of two or three-dimensional graphical representations of humanoids (or other graphical or text-based avatars). Some, but not all, virtual worlds allow for multiple users. An "augmented reality" is the combination of real world and computer generated data. These 3 terms are collectively referred to herein as "Virtual Environment" or "virtual environment".

Numerous references to 'the internet' occur throughout this description. While such references most typically refer to the World Wide Web, as has become broadly understood and used by the general public, the embodiments are not so limited. Embodiments of the invention could function and provide benefits equally or substantially as well when implemented on or with various limited access and/or entirely proprietary networks, or other systems of electronically interconnected devices. Examples of networks according to alternative embodiments and/or applications could include Arpanet, proprietary intranet systems, heavily censored national networks (e.g., as in China), and others. Therefore, reference to 'the internet' herein are to be construed to include any network with which or within which a service can be interconnected, or into or from which Content is published, downloaded, uploaded, or otherwise conveyed between a User and a Viewer.

Although much of the Content referred to throughout is described as Content transmittable via the internet, Content-based technologies have and continue to rapidly converge. For example, Content conveyed via television signals can be received by and displayed on a display means of various devices (e.g., computers), or can be conveyed over telephone networks via fiber optic systems, just to name a few examples. Therefore, references to Content and systems throughout this description are not limited to Content conveyed primarily or wholly through internet or computer readable media, but may also include Content conveyed at least in part via systems typically associated with other purposes (e.g., broadcast, communications, entertainment, data transfer, navigation). Virtually any system or network by which Content can be conveyed between a User and a Viewer, and to, through, or with which a Service has either a persistent or occasional connection, is also contemplated within embodiments of the invention. Additionally, a 'display means' herein includes any device or portion thereof configured to render content visually perceivable by a Viewer (e.g., liquid crystal display, cathode ray tube, plasma screen, light emitting diode display, etc.)

Use of the term 'may' (e.g., 'may', 'may be', 'may have') within this description generally indicates that the described operation, structure, or other innovative element described is present in one or more embodiments of the invention, but is not necessarily present in all embodiments. Therefore, the term 'may' is not indefinite herein, but indicates a condition relevant to at least a subset of the possible embodiments according to the applicants' contemplation of the invention.

Additional terms appear throughout this description, whose meaning will be apparent to those having ordinary skill in the art, based on their usage in context and/or by reference to the figures.

1) Content Upload and Registration

Figure 1B:
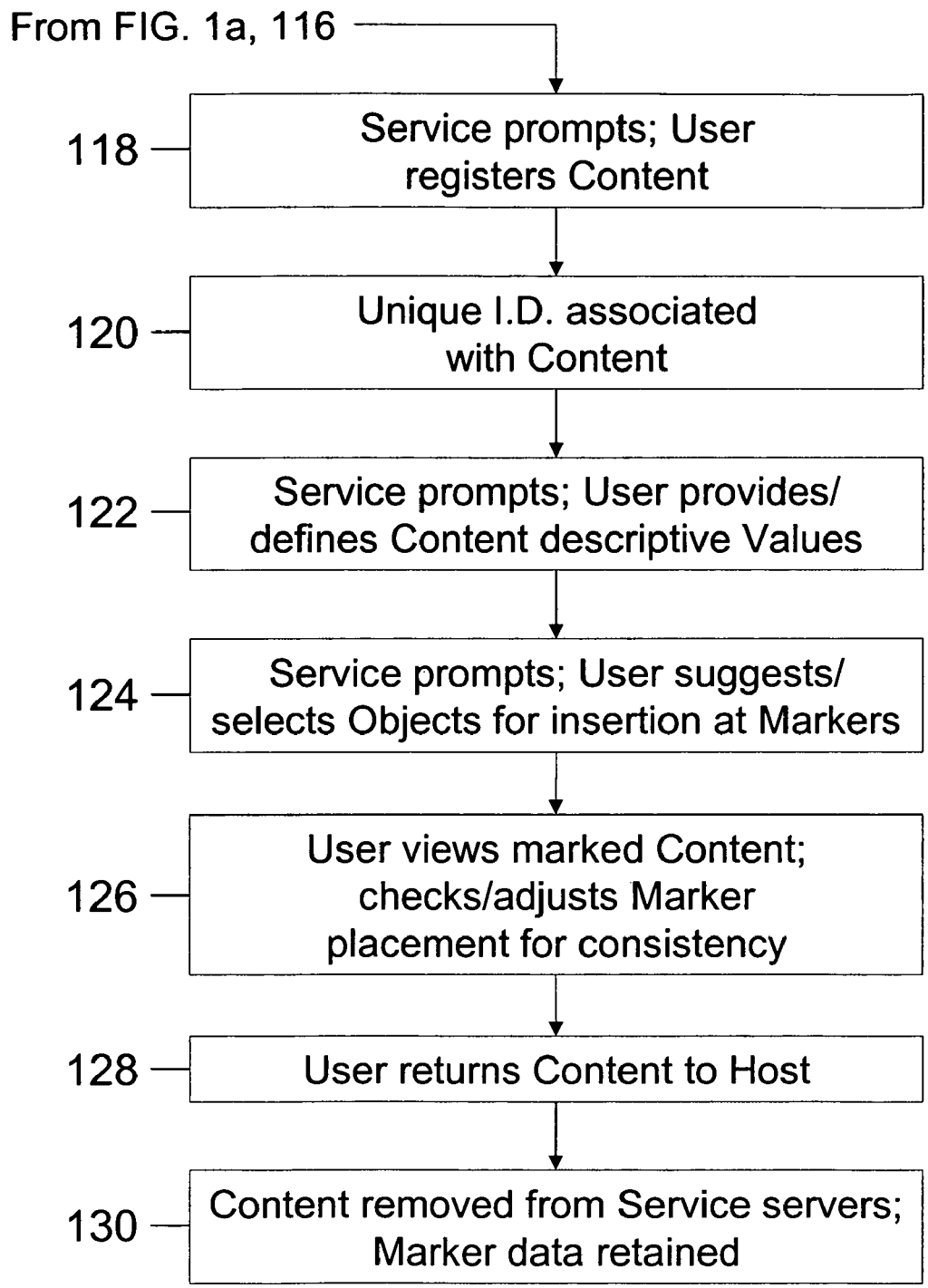

FIGS. 1a-1b depict a number of operations according to an embodiment of the invention. Although these operations are depicted in series, some individual operations may be omitted, transposed, or may occur in parallel in alternative embodiments.

As shown at 102 and 104, a User creates viewable Content, and uploads the Content to a Host. If the Host is a website, the User may upload the Content to the Host's servers. Alternatively, the User may simply create a hyperlink at the Host website that viewers can select to access the Content located elsewhere. The User may choose to maintain the Content on an internet-linked server, computer, or website the User controls, in which case the User may also be considered a Host.

If the User broadcasts from his own website, server, or computer, and wants to use the Service directly, the User can proceed directly to the operation shown at 110 in FIG. 1A, and transfer the Content to the Service servers. However, if the User chooses to use an external host, the Host can ask the User at 106 if he would like to add selectable Objects to the Content by use of the Service. The User may wish to insert objects for his own purposes, for example personal messages, pictures, or commentary on the Content. Alternatively, a Host may also ask if the User would like to generate revenue from Promoters that will pay to have their Objects (e.g., brand names, brand objects, or eCommerce links) associated with the Content through the Service. Generally, the Host will provide a method by which the User can register their affirmative or negative answer to the Host's query.

If the User wants to use the Service, he selects the provided affirmative option, at 108, and the uploaded Content is transferred to internet (web) servers under the control of the Service, as shown at 110. At 112, the Service prompts the User to register his personal identification data with the Service, and the User submits the requested data for registration. Such information may be retained by the Service on user ID servers. User personal identification data that may be collected includes standard locator information (e.g., name, address, phone number, email address), various information related to the User's interests, User demographic information (e.g., age, sex, place of work, income level), and frequently visited web sites, although the scope is not so limited. The Service can use such demographic and other information to specifically target and provide Promoter information, products and services to Promoters' targeted groups. For example, if a shoe company wants to reach or have their products be marketed to a specific market, such as hikers or skateboarders, the Service can use demographic information to direct those products and services to that market. In addition to information provided by the User in response to the Service queries, the Service may additionally have tools to identify what other websites the User has visited, or what videos or audios the User has downloaded, to enable the Service to build a more detailed profile of the User's interests.

The Service queries the User, at 114, to identify the source or method by which he was referred to the Service. The User will be given the option to name who (e.g., an individual) or what (e.g., company, website, service) introduced him to the Service. This information will enable the Service to share a portion of any revenue that is generated from such referral, for at least a specified time period. Alternatively, if the User's content was transferred to the Service from a Host, as at 110, the Service may recognize the Host as the referral source without querying the User.

2) Association of Markers and/or Data Packets with Content

The User will be instructed to review his Content and place Markers into whatever portion of the viewable Content (e.g., image) seems appropriate to the User. For example, if the Content is a video, the User may be instructed to play the video in slow motion, or at variable speed, and to place Markers at locations in the video. In general, the User may have a graphical user interface (GUI) that resides on his computer 'desktop', on a 'webtop', and/or on the website of the Host to which he has uploaded his Content. The Service will provide simple 'drag and drop' and/or 'point and click' and/or 'outlining' tools to place Markers. For example, the User may use a 'mouse' peripheral device to steer a position indicator on the GUI display to a particular position within the Content. By clicking a mouse button, the tools provided by the Service will associate a Marker with the image at the location selected and indicated by the User. The assigned position of a Marker spatially with regard to the apparent dimensions of an image (e.g., 2-n dimensional), and, temporally relative to a beginning or an end of the content (in the case of non-static content), is retained by the Service servers for future processing. In an embodiment, when marking Content created by the User, or Content for which the User possesses valid rights and/or permission to alter, the User can directly modify the Content by adding Markers. However, if the User is not authorized to alter the Content, or does not wish to alter the Content, association of Markers with Content creates an additional layer of Content which is separate from, but is identified to, correlated (perceivably registered) to, and dynamically responsive to the original Content. In either situation, the Content with which the Markers are associated with is referred to herein as "Marked Content".

The User continues to associate Markers at selected positions throughout the Content subject to the User's judgment, or subject to guidelines established by the Service. It will be clear to those of ordinary skill in the art that while a computer mouse peripheral device is one means for indicating and selecting locations for placing Markers, the embodiments are not so limited. For example, the User may indicate a location for associating a Marker by touching a handheld stylus, the User's finger, or some other pointing directly on a touch-sensitive display screen. Likewise, other systems and devices such as gaze tracking systems, sip and puff control devices, joystick control devices, voice-recognition control systems, and numerous others can likewise be used to indicate a location and associate a Marker with the Content. In addition, a pattern recognition and/or image recognition means (e.g., embodied in software, firmware, or hardware, or a combination thereof) could be used to define, locate and automatically associate Markers within the Content. For example, an image recognition program could be used to place a Marker on every shirt in a video for the subsequent placement of Objects on those shirts.

During Marker placement, Markers can be visible to the User, to aid the User in properly positioning the markers relative to the Content. For example, Markers can be assigned as 2-dimensional regions defined and/or delineated by the User using tools similar to a 'telestrator' (commonly used in sportscasts and broadcast weather reports). By this method, Users define a boundary or outline, as shown at 1410 in FIG. 14b, corresponding with a particular viewer-perceivable pattern or object (e.g., a wall, clothing, a vehicle) in an image, and can choose to associate the Marker with that pattern. Pattern recognition software can then track the object pattern as it moves through, past and relative to other patterns in the Content, and maintain the Marker associated with the pattern. If, for example, the Content is a video, and the pattern with which a marker is associated is a car, when the car moves out of the visible range (e.g., viewer-perceivable range, field of view) in the Content image (e.g., off the display to one side, or shrinking into the distance), the Marker may likewise progressively move out of or shrink beyond the visible range. If the pattern then returns within the visible range of the Content, the Marker likewise returns. Alternatively, Markers can be persistent, and remain within the visible range of the Content even when an associated object or pattern in the Content no longer appears within the visible range.

Markers may also have predefined attributes, such as shape, size, opacity/transparency, or color, which may be either fixed (not changeable by the User) or which may be User adjustable. Such attributes can also be adjusted by operation of a pattern recognition means to maintain a user-perceivable correlation between viewer-perceivable attributes of the Marker and those of an associated viewer-perceivable element of the Content (e.g., a shirt, a bottle, a car, etc.). Markers may be included in the tools provided by the Service, or they may be available as a part of the User's or Host's GUI. The Service can also provide Markers with predetermined attributes corresponding to common items, such as beverage bottles, signs, or others. Likewise, Users, Promoters, and others can create new Marker configurations and submit them to a Service. When those Marker configurations are then used by others, the creator of the Marker configuration can receive a small royalty payment. The possibilities are relatively limitless, and new Marker designs could also be made available to Users at any time as upgrades and/or revisions to the provided tools. Marker configurations could also be a revenue source of a Service, in that Users may pay to use interesting Markers for their Content similar to how mobile phone users currently pay to download interesting ring tones for their phones. Users, promoters, or other third parties could also create interesting markers and provide them to a Service in exchange for recognition of some kind of consideration. The Service can then make these Markers available to others to use and similarly collect a use fee.

The Service will prompt the User and the User registers the Marked content, at 118, and at 120, a unique identification is associated with the Content. This unique identification, among other things, allows the Service to recognize the Content when a Viewer selects the Content for viewing. The unique ID also helps the Service maintain association of Markers, and insertion/overlay of Objects, both of which may be stored at Service servers (e.g., on a hard drive, data storage tape, optical disk, or another data storage means), with the proper Content, even when the Content itself resides elsewhere.

The User is then asked, at 122, to provide and/or define Content-descriptive values, or keywords, which describe the nature, origin, general theme, or other characteristics of the Content. These keywords and/or values will assist search engines (e.g. Google) to place text-based advertisements with the Content, (which, for example could be placed at the end of a video clip or displayed beneath it), or vice versa.

At 124, the Service prompts the User to suggest which brand names, brand products, or other Objects would be best to insert and/or overlay at each Marker in the marked Content. The Service can also provide a list of brand names, products or other Objects from which the User can select appropriate choices, including those submitted to the Service by various Promoters who wish to reach target audiences through User-marked Content. For example, if the User suggests using the brand name PEPSI to insert and/or overlay at a Marker associated with the image of a bottle on a table in the User's content, the brand PEPSI can be made to appear on the bottle whenever a Viewer selects the Content for viewing, and the bottle appears within the visible range in the Content.

As previously described, pattern recognition software can recognize the size, shape, color, and other visual characteristics of a selected object or pattern (e.g., the bottle) in the Content. The software can also make adjustments to keep the position of the Marker relative to the position of the bottle relatively constant in the Content image, as the position of the bottle in the image changes based on the changing position of the image capture device (e.g., camera that originally captured the Content image(s)) relative to the bottle. Further, the pattern recognition software can also make adjustments to the lighting and apparent perspective. For example, if the bottle is placed upon a table, and the camera moved in a full 360-degree circle around the bottle while continuously capturing an image of the bottle, a Marker associated with the bottle could remain stationary with respect to the bottle so that it does not move with the movement of the camera. Therefore, the PEPSI brand Object inserted and/or overlaid at the Marker would likewise appear to remain stationary with respect to the bottle. However, if the User prefers, he could alternatively choose to allow the Marker, and therefore the Object, to move with the movement of the camera so that the Object remains in view of the Viewer at all times that the bottle is also in view.

The User may be able to specify that a single Marker can be inserted and/or overlaid with plurality of Objects, or with multiple types of Objects concurrently. Such plural insertion/overlay may even allow selection of the plurality of Objects simultaneously. For example, both an audio and a visual Object (e.g., an .mp3 file and an .mpeg file) can be inserted and/or overlaid at a Marker. When the Objects are selected by a Viewer, the image becomes visible to the Viewer, and a music file or audio message plays at the same time. This is just an example according to an embodiment, and does not limit the scope or nature of other embodiments. Alternatively, a Marker may be configured with this capability by the Service, and does not need to be, or cannot be altered by the User. According to an embodiment, a User can place an object at a Marker and lock the Marker to prevent later placement of any other Object at that Marker. For example, a User may want to associate a Viewer-text entry field object at a Marker where Viewers could submit reviews and/or other comments regarding the associated Content, or where Viewers could create a Content-relevant e-mail or text message or other message, and send the message to the User or to another Viewer. The User could place the corresponding Object at the Marker and set a marker attribute (e.g., marker parameter) to prevent alteration or removal of the Object, or placement of any additional Objects at that same Marker.

When the User finishes associating Markers with the Content, or perhaps periodically while associating Markers, the Service may prompt the User to make adjustments to Markers. For example, a pattern recognition system provided by a Service may detect something unusual and flag the User, and may also provide suggested corrective actions available to the User and relevant to the detected condition. For example, a User may associate a bottle-shaped marker with the pattern of a table in a video, and may designate the Marker to remain persistent regardless the continued presence of the table pattern. However, in a later portion of the video, the table has been removed, and is no longer visible. A pattern recognition system provided by the Service may detect that the bottle, once apparently sitting on the table, now appears to be floating in mid-air. Therefore, the Service can prompt the User to either remove the Marker (e.g., drag it back to a toolbar), or to move the Marker to another location within the Content (e.g., onto another table). If the User removes the Marker, they may opt to remove the Marker from the Content entirely, or from only a portion of the Content.

At 126, the User views the marked Content, checking and adjusting Marker placement for consistency and artistic appearance as needed. If, for example, a Marker associated with a stationary object (e.g. a wall) and a Marker associated with a moving object (e.g. a vehicle) conflict due to a portion of the moving object crossing in front of (or behind) the stationary object, the User can specify an appropriate resolution according to depth priority. For example, the User may be able to designate the Marker associated with the stationary object as 'Background', while designating the other Marker as 'Foreground'. This can, in an embodiment, provide a situation where the moving Marker remains visible and fully selectable when transitioning through the Content image and across (apparently between the Viewer and) the stationary Marker. Meanwhile, the stationary Marker is only selectable during the transition of the moving Marker to the extent that some portion of it is still visible from behind the moving Marker. Therefore, Markers can be understood as placeable in one or more layers of depth relative to content and to one another.

During this process, the Service may provide the User with the option to make all or some portion of the Markers visible to the User for easy reference. The User may be provided with full discretion to place Markers wherever and however the User desires within the Content. Alternatively, the Service may provide Marker placement recommendations, or even guidelines (e.g. style guidelines) to which the User must generally and/or strictly adhere.

When the User is satisfied that all Markers in the Content are as they should be, the User returns the Content to the Host, at 128. As noted above, this could mean that the User returns the Content to his own server and/or website, or an external server and/or website (e.g., YouTube).

At 130, the Service may then remove the Content from Service servers, retaining a registry including the unique identification of the Content (and all relevant User-relative data) and all Marker data (e.g., type, location within content, user suggestions for Object insertions/overlays). The markers, however, remain embedded in the Content in the locations (e.g. positional and/or chronological locations) and manner designated by the User during the association operations described above. The Service owns the Markers, and can charge Promoters for access to the Markers for placement of Objects that the Promoters want to deliver to the attention of Viewers of Content.

In much the same ways as described above with regard to Markers, a User can alternatively or additionally associate Data Packets with Content. Rather than providing, for example, an insertion and/or overlay placeholder for later insertion and/or overlay of Objects, a Data Packet may include a discrete and complete unit of executable content data placed relative to the Content. For example, the data comprising a Data Packet may represent, and make available to a Viewer when executed, a video, text and/or audio clip. Examples include but are not limited to embedding a hidden video, text or audio clip within a video, text or audio clip—such as a hidden song within the video, a hidden video within an audio clip wherein the video is selectable when cued by an audio indication and is viewable on a display or other viewable means, a hidden audio-video lecture from an instructor within online course materials, etc.), a result of executed software code, a personal message, an internet link (e.g., URL, URN, URI), an n-dimensional virtual environment and/or an n-dimensional virtual world that Viewers, readers or listeners can virtually enter into or move throughout, an automatically dispatched electronic mail message, an opened telephonic connection or some other type of data encoded content. Therefore, Data Packets can deliver to Viewers of Content many of the same types of content as do Objects (described below). However, the nature and content of Data Packets generally remain as designated by the User until and unless the User decides to alter, replace, or remove them, or until they are altered as an operational result of their intended function.

As the examples above should make clear, the ability to associate Data Packets with or relative to Content is not limited to only viewable Content. For example, inasmuch as Data Packets may be self-executing, a Data Packet can be associated with purely audio Content, and can execute without the need for Viewer selection of the Data Packet, or even without Viewer recognition of the presence of the Data Packet prior to execution. Therefore, Data Packets can be associated with, and provide benefits with, nearly any kind of underlying Content. As with Marker data, a Service will receive Data Packet data from a User, a Promoter or Host, and retain a record of the Data Packet data including characteristics related to the placement of the Data Packet(s) relative to the Content.

A Service would make tools available to Users enabling placement of Data Packets relative to Content, and allowing the User to specify how the Data Packets are presented to Users that access and view the Content. For example, Data Packets may be embedded into the Content, and may be visually represented to a Viewer, or may be visually invisible to a Viewer. Data Packets can be self-executing, so that the data in the packet is executed immediately when the Content is viewed, or alternatively, execute at the completion of a predetermined delay (e.g., predetermined and set by the User) after a Viewer begins viewing Content, or upon Viewer execution. Alternatively, a Data Packet may execute and run in a separate window on a User's device display.

Service provided tools may allow control of playback, volume, or other Content execution relevant parameters pertaining to execution of data in the Data Packet, separate from and simultaneous with similar or other control of the Content, (e.g., start, stop, pause, resume, volume, speed, repeat, skip, next, previous, undo, edit, send, navigate, recall, save, forward, addressing, block, filter, resize, bookmark, etc.). Execution of data in a Data Packet may also cause concurrent execution of viewable Content to be placed on hold (e.g., paused) until completion of the Data Packet data execution, or until the Viewer intervenes to exercise control over the execution of the Data Packet data, the viewable Content, or both.

A User, Promoter or Host may also provide a Data Packet with encoding which allows only authorized Viewers to execute the data in the Data Packet. By this capability, a User, Promoter or Host can deliver information to only specific Viewers, although the Data Packets containing the information are placed relative to Content which is itself viewable to a broad audience of Viewers. For example, a merchandiser may advertise to all potential customers by making broadly available Content describing his or her products, but may also associate a Data Packet with the Content, the Data Packet including a special discount code for use by preferred customers or 'members'. Generally, a data packet may extent an invitation to a viewer to engage in a commercial transaction including but not limited to one or more of comprising one or more of an announcement regarding a sale, a coupon, a rebate offer, a consolidated multi-item purchase price offer, a limited time offer, an exclusive offer, a subscription offer, and a product sample, although others are anticipated and fall within the scope of one or more embodiments.

Codes placed in a Data Packet by a User, Promoter or Host, or inserted at a Marker by a User, Host, Promoter, Viewer, or other can also serve to associate Content with other Content similarly encoded or to associate and link Viewers, readers or listeners to others on the internet who are simultaneously engaged in the same/similar internet Content as that of the information or Content placed in the Data Packet. The Service, acting as a network 'brain', can establish and maintain associations between Content related by such codes when an inserted Object/code is selected, or Data Packet code is executed, by a User, Viewer, or other. A Service can also construct and maintain a virtual directory of all interrelated Content via codes associated with the Content via Data Packets or Markers. Similarly, codes inserted at Markers by Viewers, Hosts, Promoters, or others can serve to associate some or all of these various parties with the Content and can be used to link them to Users, or to link Users to other Users, Viewers, Hosts or Promoters, and a Service can construct and maintain a virtual directory of which Viewers, Hosts, Promoters, or others are associated by codes inserted relative to Content. Alternatively, and/or simultaneously, other codes can serve to associate various parties to each other, and/or into a social network related to the Content, and a Service can construct and maintain a virtual directory of which Viewers, Hosts, Promoters, or others have been, are or can be associated and linked together by inserted codes with Content. A Service can monitor and store chat, other means of communications and transactions (such as Content file sharing) that occur in environments (windows, areas, n-dimensional virtual environments, n-dimensional virtual worlds, etc.) that are created by these Data Packets.

The various capabilities for controlling presentation, execution, availability, Viewer control, or other parameters of Data Packets may be defined by a User when or prior to associating Data Packets with Content. Further, a User can in some embodiments, as a maintenance function, change such parameters, or even remove previously placed Data Packets at any time after the Data Packets are associated with Content and/or after the Content is 'published'.

In a more 'open' embodiment, n-Users can associate Data Packets with Content after publication of the Content by the User. The ability for n-Users to do so could be controlled by the User via a setting enabled at some time between Content creation and publication, or even after Content is published, as a maintenance capability. In this way, n-Users can, for example, insert Data Packets which invite subsequent Viewers to connect with (e.g., automatically, or selectively at Viewer's discretion) the n-User for a social interaction. For example, an n-User may wish to gather information from other Content Viewers relative to a product or topic presented by the Content. When a subsequent Viewer selects the Data Packet associated with the Content by the n-User, the Viewer is invited into an interactive exchange with the n-User (such as a social networking environment, as described herein), or, in another example, may be directed to a web-based survey form placed by the n-User to gather information. One of ordinary skill in the art will appreciate the great number of beneficial applications enabled by this and similar embodiments of the invention disclosed herein.

3) Promoter Designation of Objects for Insertion and/or Overlaying at Markers

Figure 2:
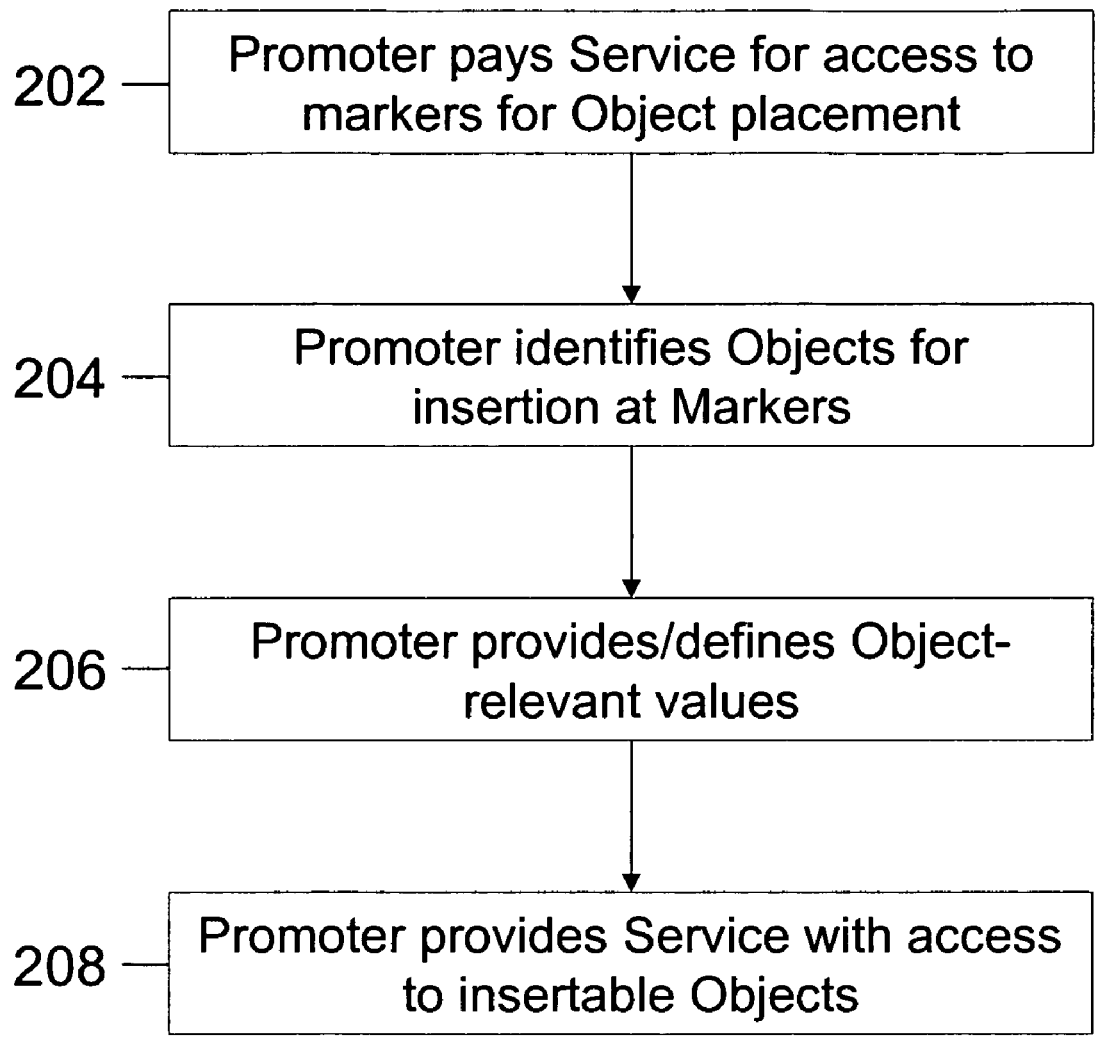
FIG. 2 is a block diagram depicting a plurality of operations including a promoter making objects available for inserting and/or overlaying according to an embodiment of the invention.

Referring to FIG. 2 at 202, Promoters having information that they wish to bring to Viewers' attention can pay the Service for access to Markers in marked Content. Of course, on occasion, the Service may also opt to provide access to Markers for no charge. For example, Promoters may be given access to one or more markers for a duration, at the discretion of the Service, to demonstrate how the Service can benefit the Promoter. As another example, the Service may provide access to Markers above and beyond what the Promoter pays for as part of a 'bonus' to generate goodwill with the Promoter, or as a public service (e.g., when the Promoter is a public service organization).

A Promoter may want to insert/overlay Objects at Markers associated with specific Content (e.g., a particular video), with specific types of Content (e.g., video content only), or with Content of a particular topic or nature (e.g., sporting events). A Promoter could also wish to insert/overlay Objects with any Markers having User-defined attributes/values that correspond with the Promoter's objectives, or that are associated with Content the Promoter thinks may be viewed by Viewers in his target demographic. The Promoter can specify which of these options or combinations of options he wants to use. Of course, other options may be made available by the Service and offered to Promoters.

The Promoter, at 204, will identify Objects to be inserted/overlaid at Markers. Objects can include brands, products, graphic designs, audio messages, links to a web page (e.g. URL-defined hyperlink), n-dimensional virtual environments and/or worlds, other Content, downloadable material (e.g. software), surveys, order forms, or email. This list is not exclusive, however, and many other options as will be apparent to those having ordinary skill in the art. For example, a Promoter may want a brand name (e.g., 'Jam Juice' Energy Drink) to appear in Content relating to sporting events.

Objects may also simply consist of associations. Selection of an association Object can convey a Viewer to Object-linked information, such as to a website, an-dimensional virtual environment and/or world, or Content residing on a server. Association Objects can also be used to convey Viewers to a utility, such as an email utility, a survey utility, a job application utility, or countless others as will be apparent to those of skill in the art. Therefore, Objects are not limited to text, graphics, or other visible images, but may include associations through which a Viewer can be linked with nearly any kind of information.

The Promoter can then provide and/or define Object-relevant values and link them with an Object, at 206. Object relevant values may describe visual attributes of the Object (e.g., size, shape, color), general contextual attributes (e.g., Object is related to sports or to a specific sports activity), specific contextual attributes (e.g., the Object is a bottled beverage), or any number of other attributes, properties, themes, qualities, or descriptive terms that can aid in relating Objects to Markers and/or Content to meet a Promoter's objectives. Promoters can provide/define Object relevant values which relate an Object to specific Markers, or to Markers related to a specific Object, brand, or type of Objects by User suggestion (e.g., as at 124 in FIG. 1*b*), or to markers in specific or general classes of Content.

Alternatively, a Promoter may desire for the insertion and/or overlay of specific Objects at specific Markers and/or in specific Content. The Object-relevant values may include, or may solely consist of such instructions. For example, the Promoter may also be a User, and may provide Content via a Host and associate Markers with the Content. In this situation, the Promoter may have a plan for promoting products to Viewers, and will therefore designate Objects for insertion/overlay at Markers in the Content according to that plan. In another instance, a movie studio as Promoter may want to promote new release movies. Therefore, the studio may create or cause the creation of Content, and associate Markers with the Content, into which Markers are inserted/overlaid Objects consisting of movie posters or links to Movie previews. These are just a few examples, and do not in any way limit the scope or nature of the nearly unlimited possible embodiments of the invention.

Once the Promoter has provided and/or defined Object-relevant values for one or more Objects, the Promoter then provides the Service with access to the Objects, at 208. Providing access may include providing the Object to the Service for storage on the Service's server(s), or providing the Service with access to the Objects on the Promoter's server(s). The Objects may also be maintained somewhere other than on a server residing at the Service or the Promoter, but may be maintained at a separate location where the Objects are accessible to the Service, the Promoter, or both.

In embodiments of the invention, 'access' may include actual possession of an original or copy of the Object on a Service server or a form of storage medium compatible with the form of the Object (e.g., optical disc, magnetic storage media, photograph, a list). 'Access' may also include constructive possession of an Object through permission and capability to access an original or copy of the Object from a server owned by someone or something other than the Service. Therefore, 'providing access' can include informing the Service of the location of the Object, such as a publicly or commercially available archive or other source, even if the Service still must obtain rights to use the Object. Providing access may involve physically conveying storage media containing the Object, uploading or otherwise transferring the Object via an electronic link, or numerous other methods. In embodiments wherein the identities of the User, the Host, and the Promoter partially or fully overlap, the actions involved in or required for providing the Service with access to Objects may be substantially streamlined.

4) Activation of Object Insertion/Overlay

Figure 3:
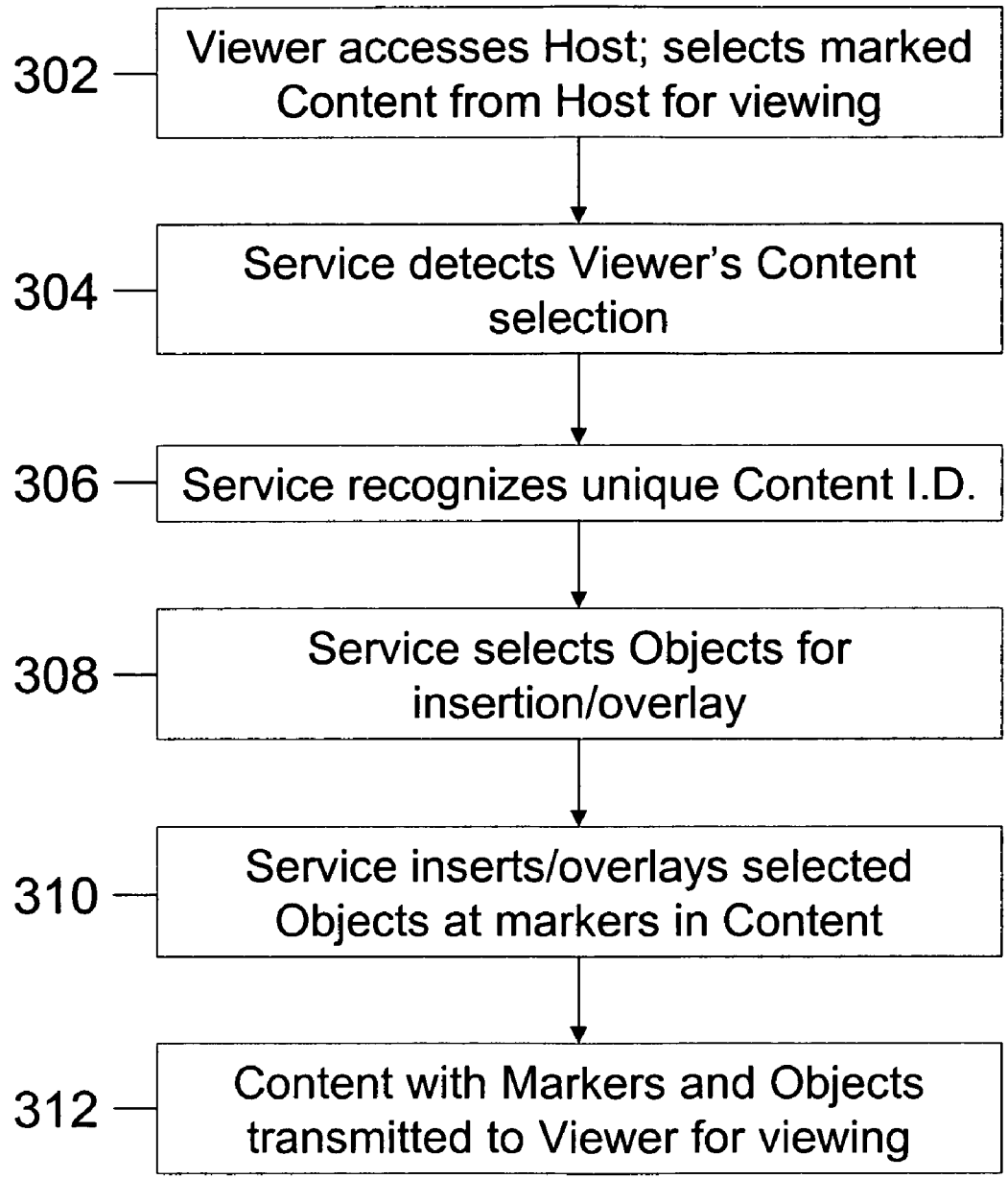
FIG. 3 is a block diagram depicting a plurality of operations including inserting and/or overlaying objects according to an embodiment of the invention.

Referring to FIG. 3 at 302, a Viewer accesses a Host, and selects marked Content from the Host for Viewing. The Content may be activated and viewed at the Host website (e.g., YouTube) using tools and capabilities provided to Viewers by or through the Host, or may be downloaded from the Host to the Viewer for later viewing. In the latter situation, the Content may be considered 'selected for viewing' when the downloaded Content is later opened (e.g., a Content file is 'run' so that the Content can be viewed) by the Viewer, rather than when the Content file is downloaded.

At 304, the Service detects the Viewer's selection of marked Content. In situations where a Viewer selects the Content for viewing at the Host website, the Viewer generally is already connected to the internet. In the situations where a Viewer selects Content for viewing after downloading a Content file from the Host, the Viewer may or may not still be connected to the internet. If the Viewer is not connected to the Internet, selecting the Content for viewing will cause the Content to initiate/open an internet connection so that the Service can detect the Viewer's selection of the Content for Viewing. Alternatively, if connection to the internet is not currently available, selecting the Content will establish a queue. At the next subsequent availability of an internet connection (e.g., the Viewer reconnects the device to a wired, wireless, or other internet-linked system), the Viewer's device will establish a connection to the internet and the Service will detect Content selections held in the queue. Alternatively, execution of Content selections in a queue can be scheduled, so that an internet connection is established on a schedule preset by the Viewer, rather than automatically when such connection is available.

At 306, the Service will recognize the unique Content identification associated with and/or embedded into the Content at the time the User registered the Content with the Service. Once the Service identifies the Content, the Service can then select Objects, at 308, to insert and/or overlay at the Markers in the Content. The Service may spontaneously select markers based on keyword/value relationships as provided by Users (relating to Markers) and by Promoters (relating to Objects), or may select Objects based on more firmly prescribed instructions linking specific (or relatively specific) Markers with specific (or relatively specific) Objects, as described above.

At 310, the Service then inserts and/or overlays the Objects at the Markers in the Content, and at 312, transmits the Content with the Markers and inserted/overlaid Objects to the Viewer for viewing. Transmitting the Content may simply involve causing the Content to begin playing on the Host site or the Viewer's display (e.g., commencing the playing of a video, game, or other non-static content, entry into an n-dimensional virtual environment and/or world), or causing a Content image to appear on the Viewer's display (e.g. by displaying a photographic image, computer generated image, or causing a computer to render an image real-time), although the embodiments are not so limited. Because Markers can exist in a separate content layer overlying marked Content, Objects can be inserted at a Marker in the separate content layer, and simultaneously overly the marked Content. In an embodiment, therefore, an Object can be both inserted and overlaid relative to Content.

The Objects may all be inserted/overlaid into the Content prior to the Content becoming viewable by the Viewer. Alternatively, Objects may be inserted/overlaid progressively as the Viewer continues to view the Content. This latter situation may be particularly true when the Content is of an interactive nature, for example a computer game or an n-dimensional virtual environment and/or world. In such situations, the Viewer's actions throughout the game can cause marked portions of Content to appear relatively randomly (e.g., not according to a pre-determined schedule or invariable sequence). Therefore, Objects will be inserted/overlaid 'on the fly', as the game or other activity proceeds, rather than entirely prior to commencement. This may mean that Objects are continuously downloaded and inserted/overlaid real time by the Service throughout game play or other activities, or it may mean that the Service downloads all Objects that may be inserted/overlaid at Markers in the Content prior to commencement of the game or other activity, and the objects are then inserted/overlaid by the Service as the game or other activity proceeds. If a single Marker appears repeatedly throughout the viewed Content, either the same or different Objects can be inserted at the Marker during each subsequent appearance.

As mentioned, Content may be selected and downloaded for later viewing, and later selection, of Objects. Similarly, Data Packets in Content can also be saved for later access by a Viewer. Data Packets may contain information for which a connection to the internet is necessary, or may be fully executable without an internet connection. In those situations when an internet connection is necessary (e.g., Data Packets which, when executed, navigate to a website or other web-based presence, or act to acquire remote information via the internet), the Data Packets may be handled similarly to Content with Markers and inserted/overlaid Objects. Later selection/access of the Data Packet(s) can either cause an internet connection to be established, or, alternatively, a queue may be established, or added to, so that the Data Packet(s) can execute via a later internet connection. Data Packets not requiring an internet connection can be saved on the Viewer's device, or on a peripheral storage device, and may be accessed at either a scheduled time or at the Viewer's leisure. Alternatively, a Data Packet may self-execute at a later time based upon a time-based attribute of the information in the Data Packet, pre-set by the User, the Viewer, or a third-party.

5) Linking Viewers in Social Networks via Analysis of Metadata of the Markers, the Objects and the Content.

The Service can perform an analysis of the metadata description data of Markers, Objects and Content to link Viewers of the same and/or similar Markers, Objects and/or Content to each other, in the same or a similar manner as is described in U.S. Provisional Patent Application Ser. No. 60/856,404, entitled USING INTERNET CONTENT AS THE MEANS TO ESTABLISH SOCIAL NETWORKS BY LINKING INTERNET USERS, SEARCHERS, VIEWERS AND/OR LISTENERS OF THE SAME AND/OR SIMILAR INTERNET CONTENT TO EACH OTHER VIA A PLATFORM THAT ENABLES ANY OF THE FOLLOWING IN N-DIMENSIONAL ENVIRONMENTS: SOCIAL NETWORKING, COMMUNICATIONS, SHARING, CO-BROWSING, E-COMMERCE, ADVERTISING, SEARCH, HOSTING AND REGISTRY SERVICES, PUSH AND PULL APPLICATIONS, ANONYMOUS COMMUNICATIONS, AND RICH PRESENCE, filed Nov. 2, 2006.

Figure 16:
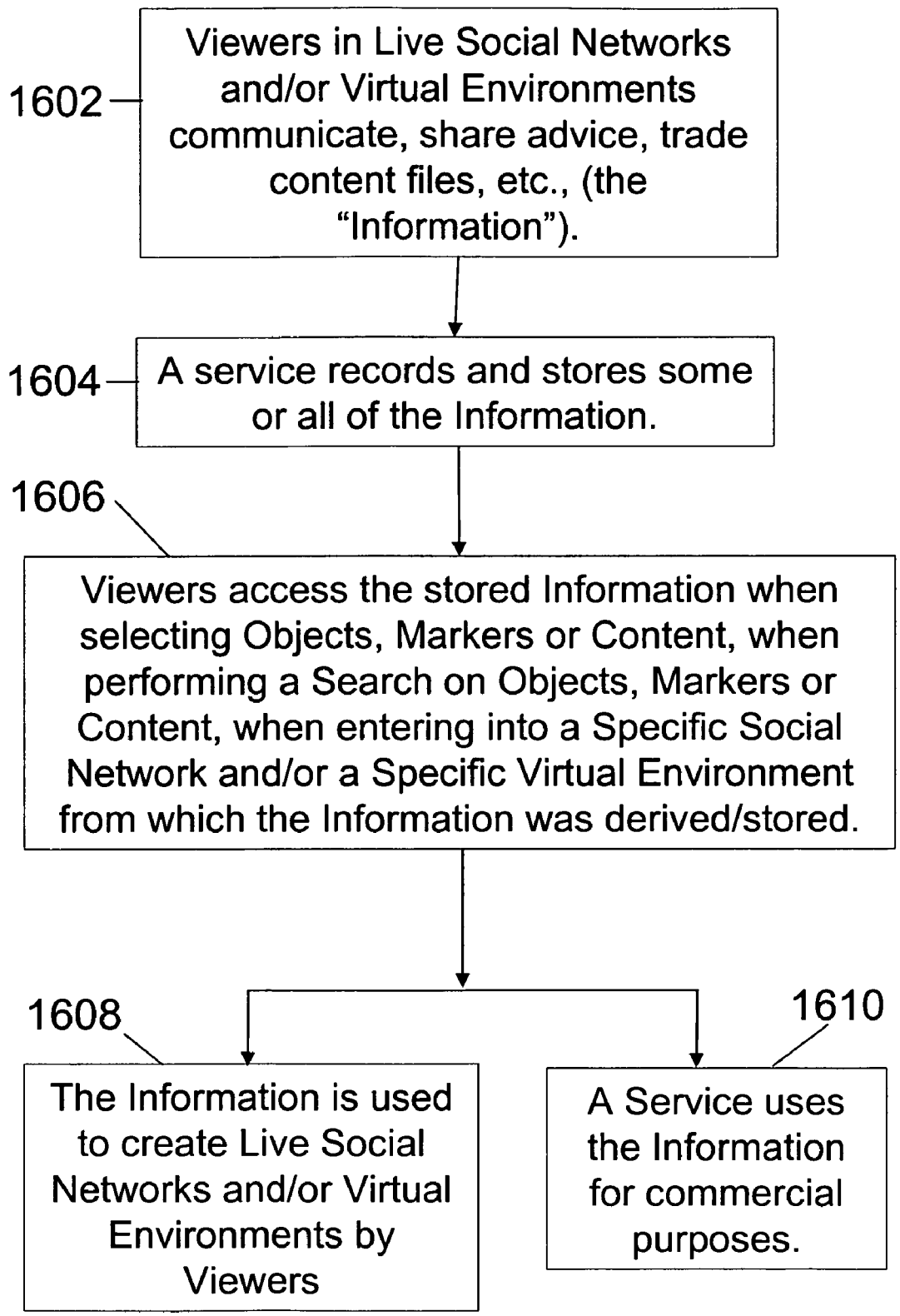
FIG. 16 is a block diagram depicting storing historical information derived from interactions relative to social networks and/or n-dimensional virtual environments, and uses of such information, according to an embodiment of the invention.

As shown at 1602 in FIG. 16, User files with the Service Metadata descriptions for types of Objects to be placed in Markers that the User places in Content.

As shown at 1604, when a Viewer accesses Content that contains Markers, the Service downloads relevant Objects into the Content for that Viewer (based on Viewer attributes/interests). In addition, and perhaps concurrently in some embodiments, the Service also analyzes the Metadata descriptors of the Markers and searches its database of Viewers (e.g., who are currently online or who have left instructions to be later connected into a live social network in which another online Viewer is engaged in Content having the same or similar Metadata descriptors as the Markers). The Service matches and links the Viewer to other Viewers (who are online at that moment), and who are viewing Content having the same and/or similar Metadata descriptors in the Markers in the Content they are viewing.

As detailed at 1606, the linking of Viewers who share a commonality of interests (as defined by the same and/or similar Metadata of the Markers that are inserted and/or overlaid into Content), enables new forms of Social Networking, Co-Browsing, Co-Shopping, E-Commerce, Advertising, Customer Service, and other beneficial activities.

In an alternative embodiment, a User can insert a code as a Data Packet associated with Content, and also associate a Marker(s) which allows Viewers to insert and/or overlay a code at the Marker(s). By this method, the Users and/or Viewers can signify their intent (e.g., availability, willingness, desire) to interact (e.g., live or otherwise) with other Users and/or Viewers with regard to the Content. Insertion of a code by a Viewer can act to allow the Viewer to be linked into an interactive social environment, either immediately or upon approval by the User or a moderator, and can notify the User and/or other Viewers that the Viewer is entering the social environment, whether or not the User and/or other Viewers are currently interacting in the social environment. Likewise, inserting their code at a Marker may enable notification of the Viewer when the User or other Viewers (or moderator, or others) have entered the social network and are available for live or other interaction, or upon the occurrence of some other event related to the Content, such as the revision or replacement of the Content, or the publication of associated Content.

By the above described code insertion capabilities, Viewers (as well as Users, Promoters, or others) can be linked together to enable concurrent (e.g. live) and/or later viewing of Content. During such simultaneous or later viewing (which may alternatively involve listening to audio content, watching visual content, or otherwise perceiving other or mixed media Content), Viewers can concurrently interact with each other and/or with the Content in real time through a concurrent or otherwise interactive environment. For example, while geographically separated, a director and a cinematographer could simultaneously view a sequence of film with audio and/or video components, and discuss edits to be made to the film. Using tools provided by a Service, one or both of them could act as a User or n-User, and insert Markers at various locations in the Content film, at which either of them could later insert instructions as Objects for later access by film editors. Alternatively, instructions could be associated with the Content film as Data Packets.

In another embodiment, two or more Viewers can be linked for concurrent viewing of Content although the Viewers are not otherwise acquainted. When one of the Viewers selects the Content for viewing, a Service recognizes codes previously inserted at a Marker by other Viewers (or a User, or Promoter, or others) associated with the Content, and links the Viewer with one or more of the other Viewers, etc., for example in a live social network with each other. Therefore, the Content can be concurrently experienced by multiple viewers, who can also interact relative the Content via an interaction-enabling means (e.g., text, audio, or other communication means and/or methods) described herein or otherwise known to those having skill in the art.

In another embodiment, two or more Viewers can be linked for simultaneous viewing of Content although the Viewers are not otherwise acquainted. When one of the Viewers selects the Content for viewing, a Service recognizes codes previously inserted at a Marker by other Viewers (or a User, or Promoter, or others) associated with the Content, and links the Viewer with one or more of the other Viewers, etc., as in a live social network with each other in an n-dimensional environment. Therefore, the Content can be simultaneously experienced by multiple viewers, who can also interact relative the Content via text, audio, or other communication methods described herein or otherwise known to those having skill in the art.

Figure 17B:
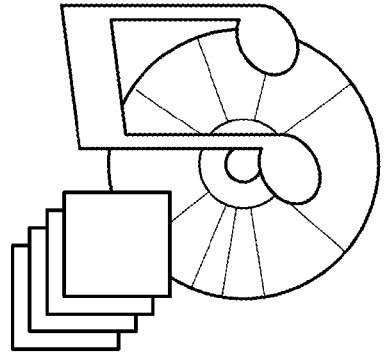
FIGS. 17a-s are screen grab depictions of a music content-based embodiment of the invention.
Figure 17C:
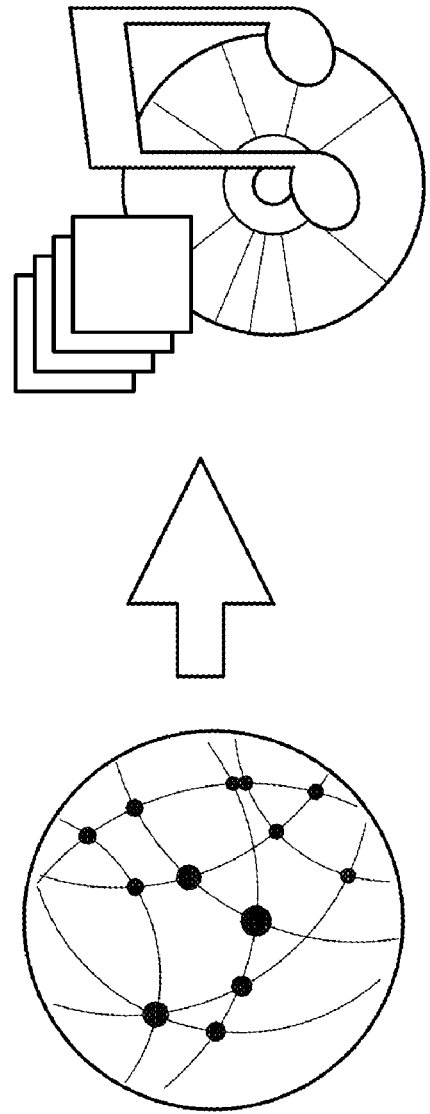
Figure 17D:
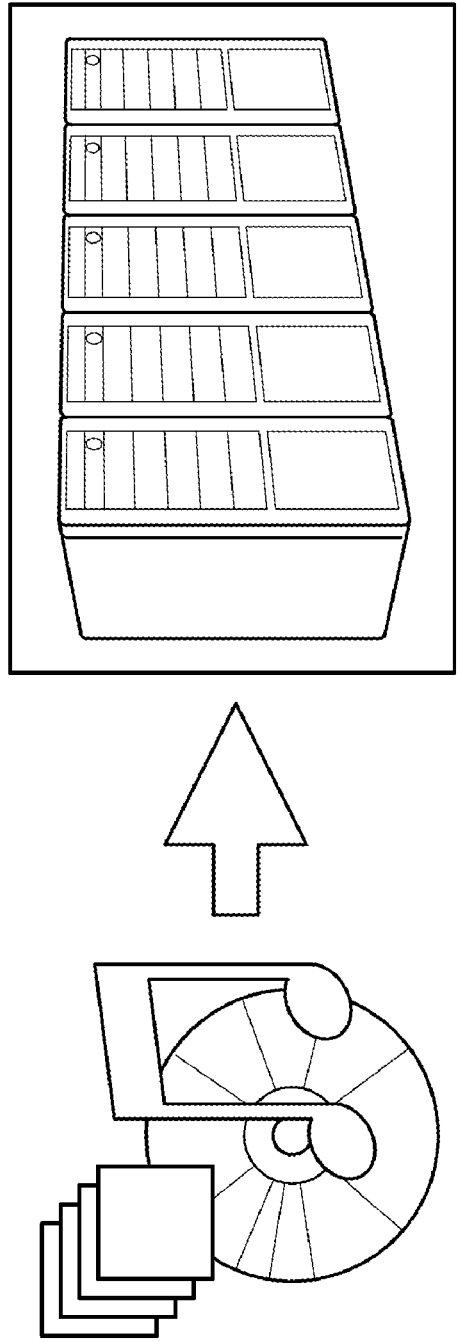
Figure 17F:
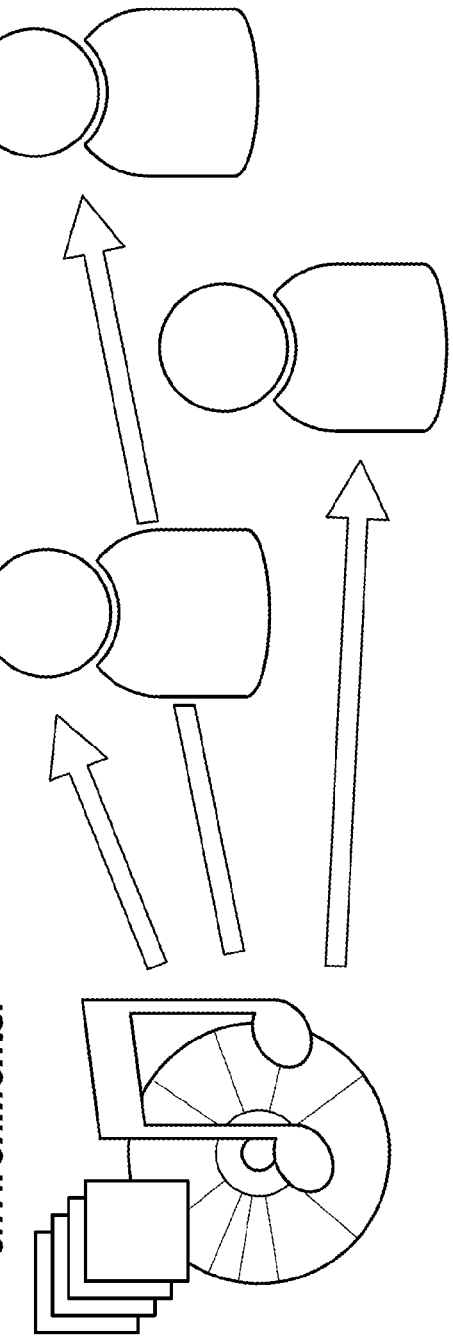
Figure 17G:
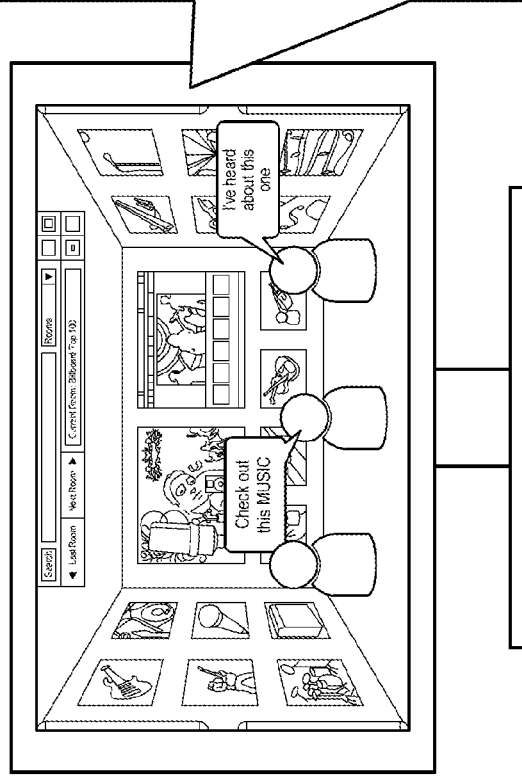
Figure 17H:
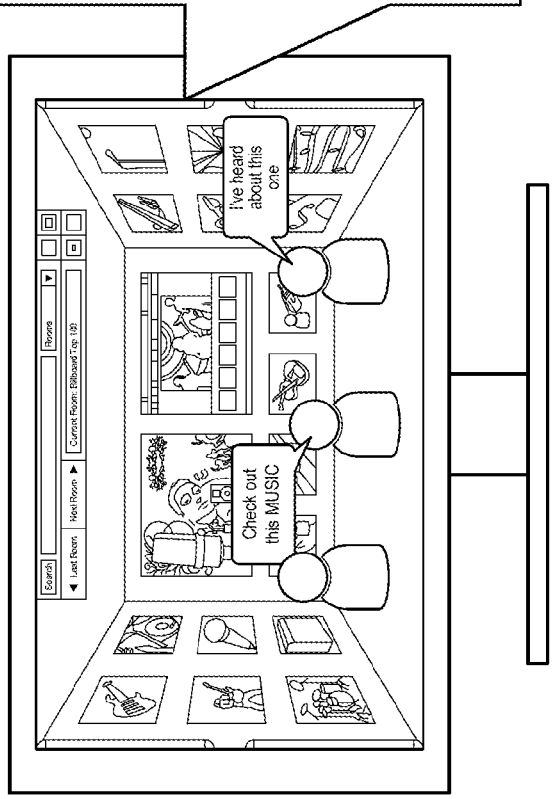
Figure 17I:
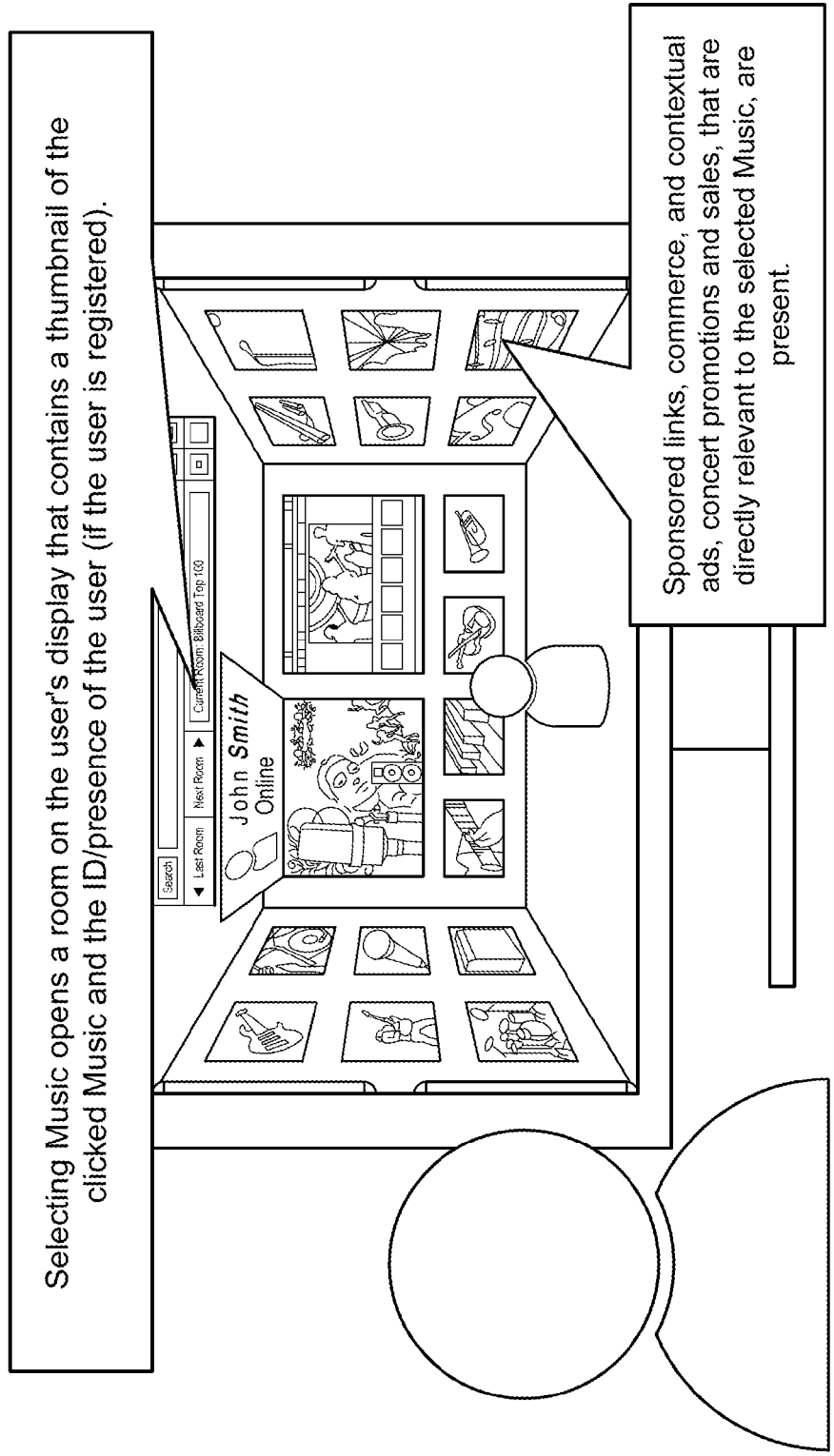
Figure 17K:
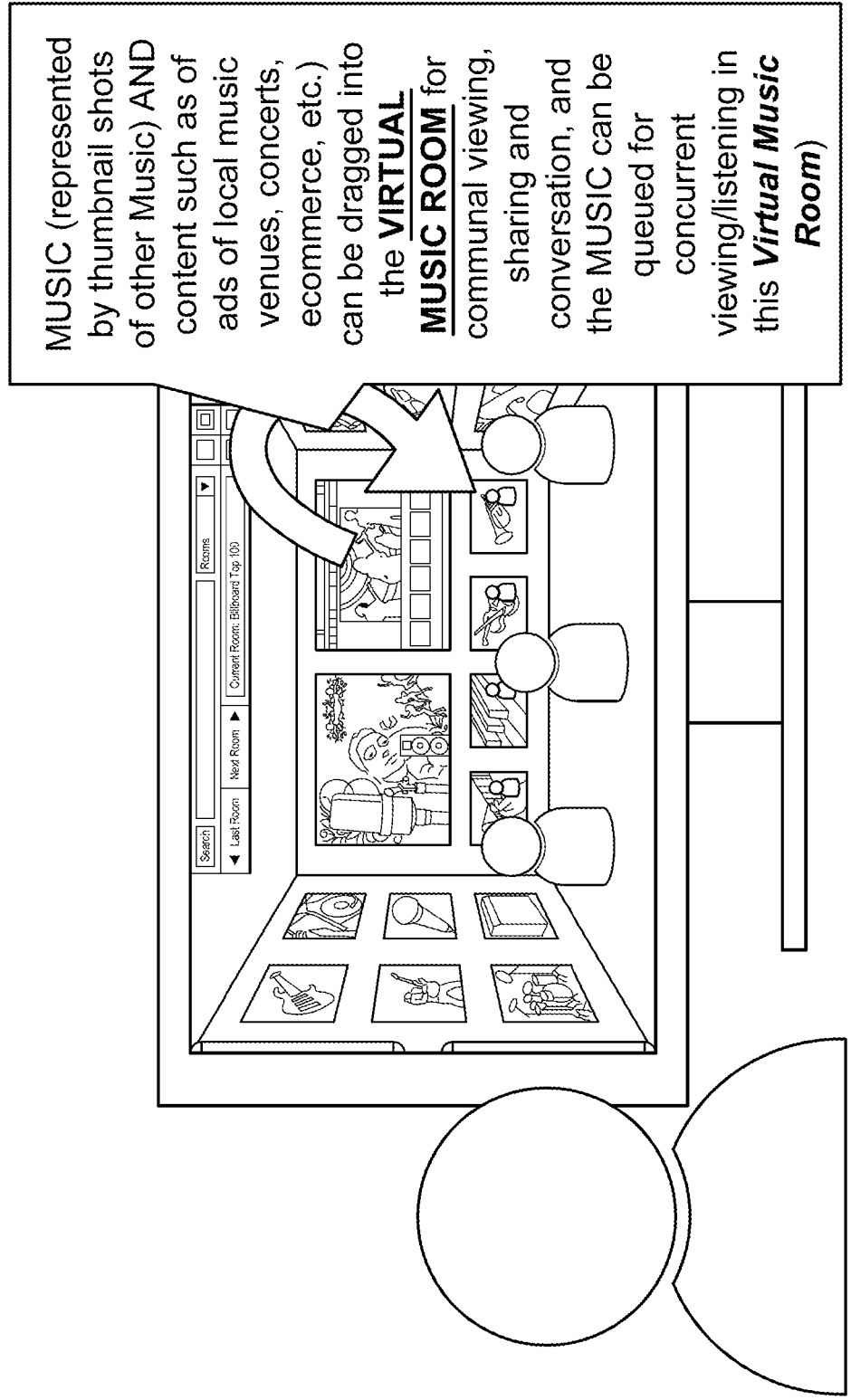
Figure 17N:
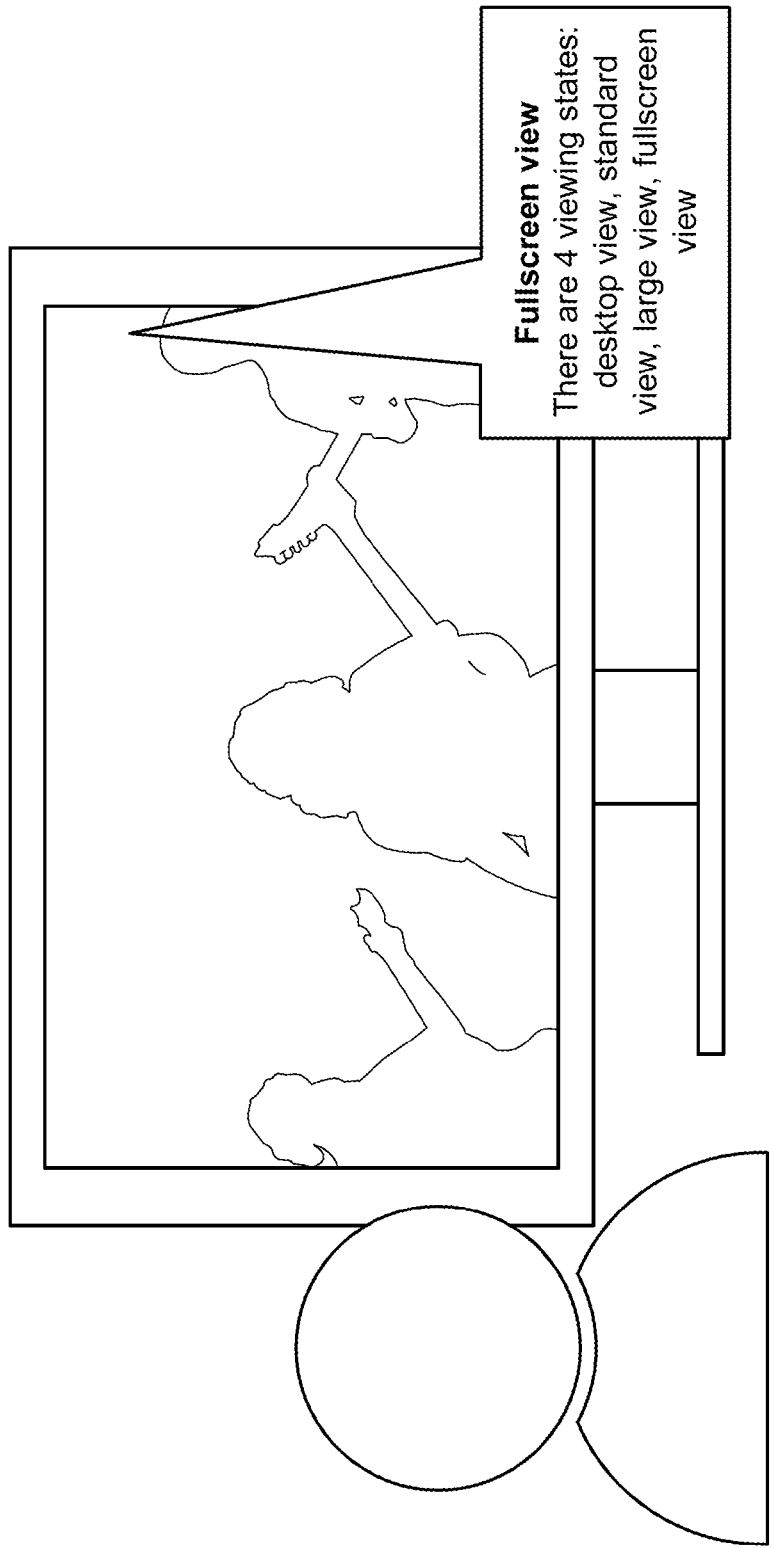
Figure 17P:
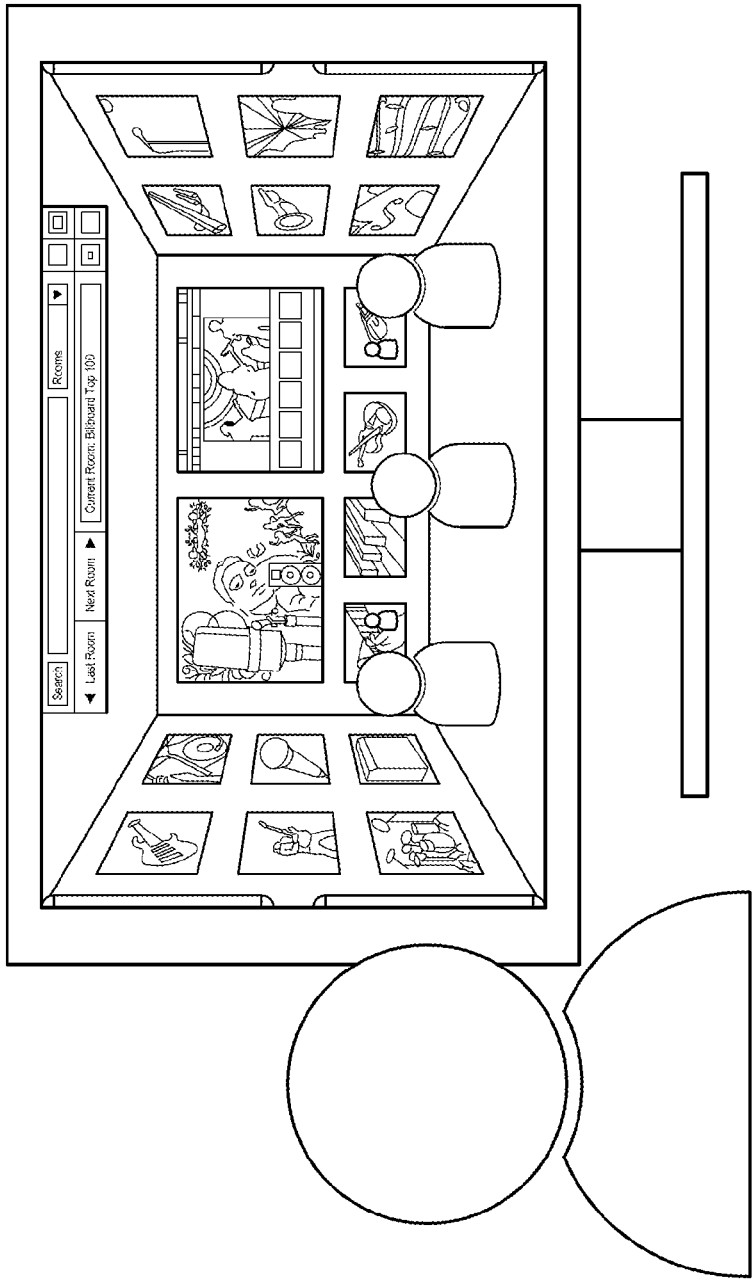
Figure 17Q:
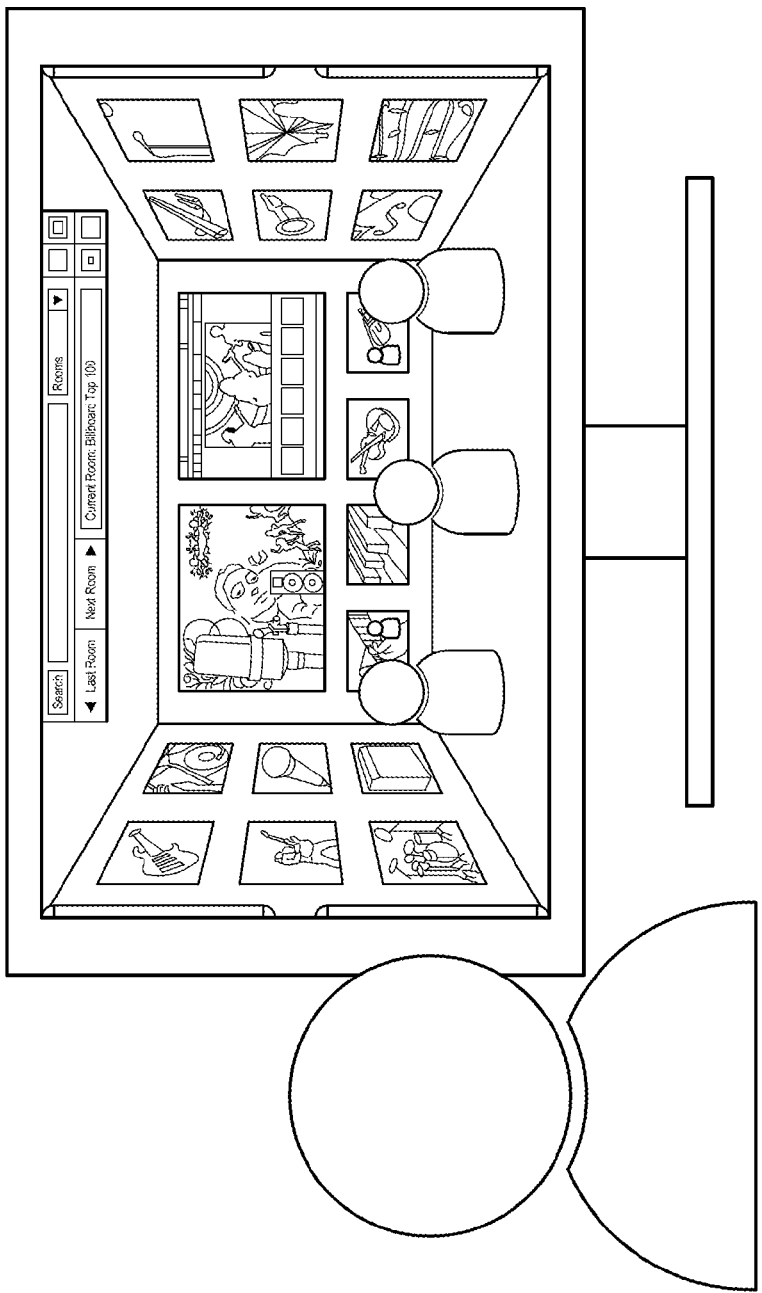
Figure 17S:
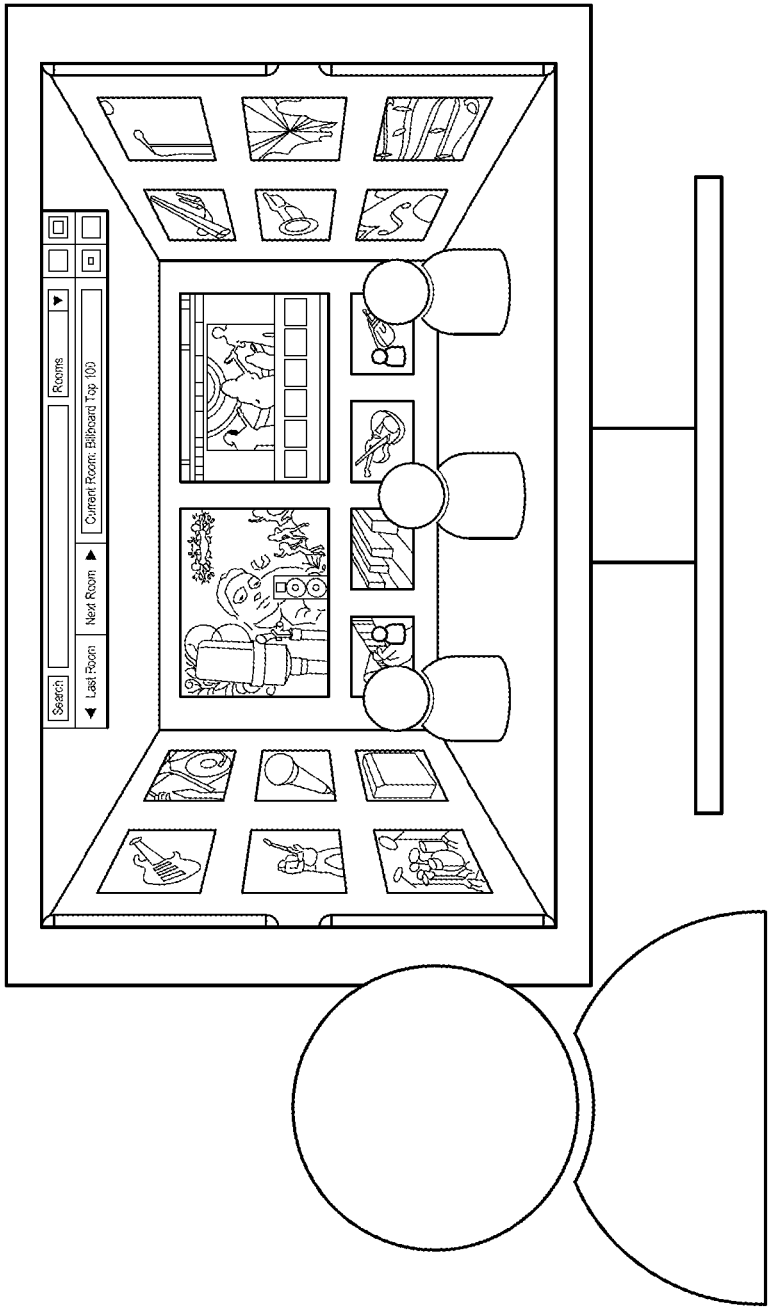

Objects that are inserted/overlaid into Content can be used for the purpose of collecting specific information that is being generated, exchanged, viewed, listened to, or interacted with in a live social network and/or within an n-dimensional Virtual Environment. Information gathered from an inserted/overlaid Object can then be used to create a new live social network and/or n-dimensional Virtual Environment. For instance, the Object that has been inserted/overlaid into the Content could be the image of a CD that, when clicked on, can record onto CD media the audio content exchanged within the live social network and/or within the n-dimensional environment. In an embodiment, clicking or selecting by some other means, the image of the CD object that has been inserted/overlaid into the Content, or selection of some other viewer-perceivable indication of code, can launch an analysis of the melody of audio content (or more generally, can analyze the qualitative properties of any other type of content being perceived by a Viewer) that can then be used to create a live social network and/or an n-dimensional Virtual Environment, as substantially depicted and described in FIGS. 17*a*-17*s*.

The object that is inserted/overlaid by a Viewer into the Content could be the image of a DVD that can record onto DVD media the audio and/or the video Content exchanged within the live social network or within the n-dimensional environment. In an embodiment, by clicking or selecting by some other means the image of the DVD object inserted/overlaid into the Content, could launch an analysis of the melody of the audio and/or a search for specific images (using image recognition techniques) to create a live social network and/or an n-dimensional Virtual Environment from that information that is captured.

A Radio Broadcast object or a TV Broadcast object, that has been inserted/overlaid into the Content, can when clicked on, broadcast within a live social network and/or within a n-dimensional virtual environment, and/or through the internet to other on-line sites and/or applications and/or to off-line destinations, the content and/or communications gathered or originating within the live social network and/or the n-dimensional Virtual Environment. By clicking on or otherwise selecting a CD/DVD/Radio/TV Object or any other Objects that are inserted/overlaid within the Content, live social networks and n-dimensional environments can be created by the means described in this invention.

Live Content exchanges between Users, in live social networks and/or in n-dimensional Virtual Environments that have been created from Objects inserted/overlaid relative to Content, could become live Content channel broadcasts (Audio, Video, Audio-Video) to other Viewers in other online and/or offline communities. Stored historical information can be broadcast contemporaneously or later as either live or on-demand channel broadcasts.

6) Viewer Selection of Objects

Figure 4:
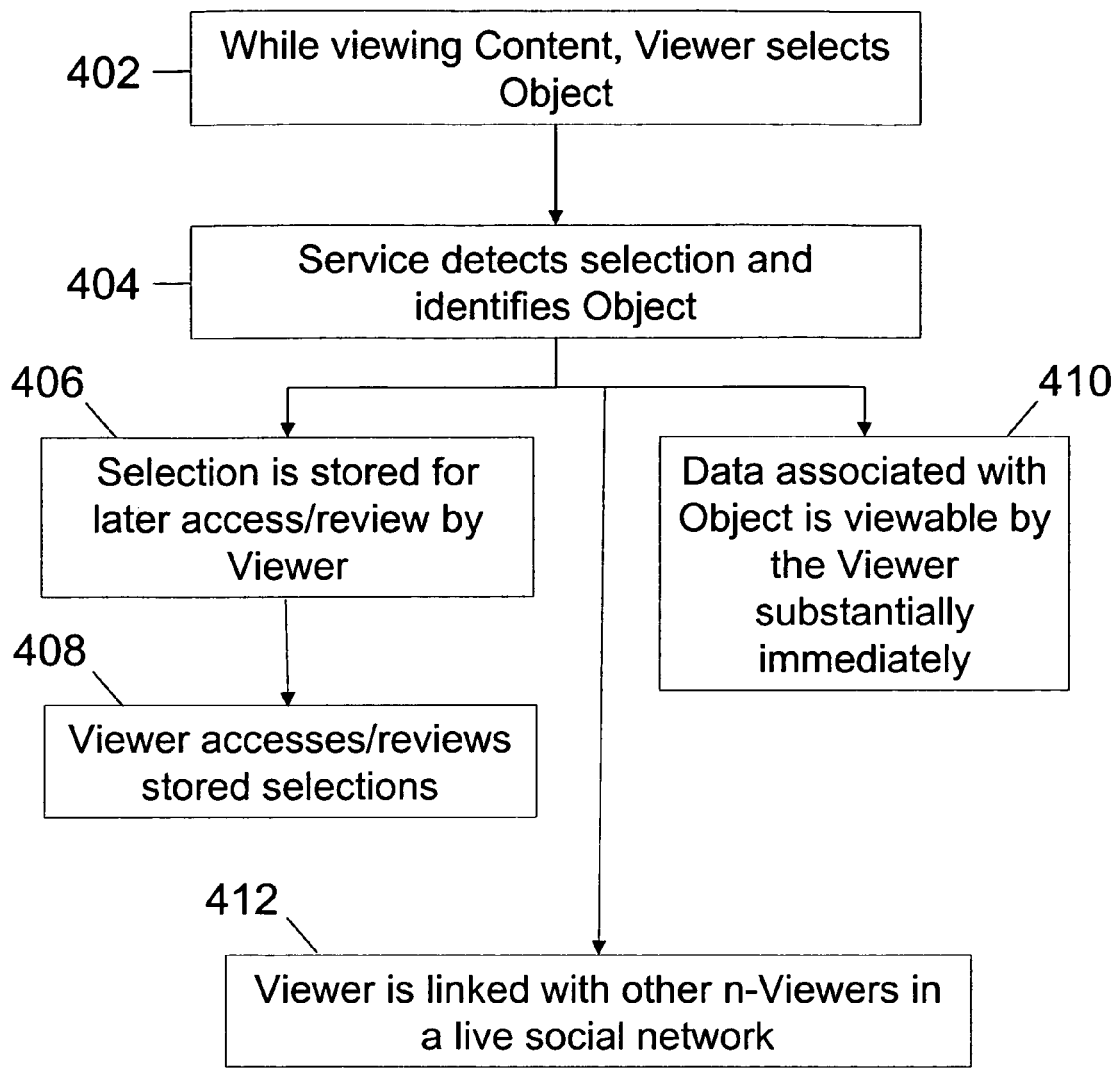
FIG. 4 is a block diagram depicting a plurality of operations including a viewer selecting an object according to embodiments of the invention.

As shown at 402 in FIG. 4, while viewing Content into which one or more Objects are inserted and/or overlaid, the Viewer can select an Object. An Object can be indicated and selected by any device or system ordinarily or specially available to computer users for indicating and/or selecting items or regions of a computer display screen or the display screen of any other electronic device. For example, a Viewer could select an Object by using a computer mouse, keyboard or keypad, gaze tracking system, sip and puff control system, or joystick, although this not an exclusive list and the embodiments are not to be understood as so limited. If the Viewer views the Content on a touch sensitive or light sensitive display screen, the Viewer can select an Object using a stylus, their finger, a laser-pointer, or some other device or method by which the display recognizes the selection and associates it with the Object. As shown at 1406 in FIG. 14*b*, the Viewer can place a cursor or other indicator on, at, over, within, or otherwise corresponding to a portion of an image in the Content, and act to select an Object corresponding to that portion of the image. The Object itself may be visually perceivable by the Viewer, or its presence may be detectable only by a Viewer detectable change in the cursor or other indicator. In embodiments, simply placing an indicator (e.g., cursor) on, at, over, within, or otherwise corresponding to an Object is sufficient to select the Object.

Alternately, moving an indicator over an Object can cause a message or other indicator to appear somewhere in a visible portion of the display device being used by the Viewer, indicating the presence of an Object. Likewise, moving an indicator over an Object could generate an audio or other detectible cue to the Viewer that they can select an Object. For vision impaired users, an audio cue can also rise and/or fall in tone, volume, or frequency as the Viewer causes an indicator to increase or decrease in proximity to an Object.

At 404, the Service detects the selection and identifies the Object. In embodiments, this may entail the Service detecting the selection in real time. In other embodiments, tools and/or capabilities provided by the Service to a Viewer, Promoter, User, Host, third-party, or to a device or system controlled and/or operated by one or more of these entities, and capable of responding as provided for by the Service, may detect the selection in real time as a proxy for the Service.

In one embodiment, shown at 406, the Object selection is stored so that it can be accessed and reviewed by the Viewer at a later time. The selection may be stored on a server or some other storage device or medium at the Service, or it may be stored by any resident data-storage means (e.g., RAM, hard drive, optical storage medium, USB connect storage device) of or linked to the device by which the Viewer accessed and/or viewed the Content. Thus, at some later time, the Viewer can access stored Object selections, as at 408, and review the data represented by those Objects. This allows a Viewer to continue the Content viewing experience relatively uninterrupted by their selections. This may be particularly advantageous to Viewers that view timing-sensitive Content, such as interactive computer based games involving other players, or who otherwise only have limited time to view the Content.

In another embodiment, shown at 412, the Object selection concurrently links the Viewer in real time to other n-Viewers who are concurrently engaged in the same/similar data or context associated with the Object, thereby creating a live social network among these linked Viewers.

Alternatively, as shown at 410, the data associated with a selected Object can be reviewed by the Viewer substantially immediately. In such instances, when warranted by the nature of the data linked to an Object (e.g. viewable data), another window may open on the Viewer's display screen to display the linked data (e.g., a web page, picture, video). In the case of non-static Content, immediate review of the Object-linked data may 'pause' the Content so that the Viewer does not miss any of the Content while reviewing the linked data. Of course, the option to pause or not pause the Content during review of Object-linked data could also be provided as a Viewer selectable option. In another instance pertaining to immediately viewable Object-linked data, selection of an Object can terminate viewing of the Content and begin review of the Object-linked data. This also may be configured as a Viewer selectable option.

Object-linked data may be considered 'substantially immediately reviewable' for at least the reasons that delays may be experienced between the time that a Viewer selects an Object, and the time that the Object-linked data is presented to the viewer. Delays may result from transmission, buffering, image rendering, hardware and/or software limitations, or other similar causes. However, for the purposes of the embodiments described herein, Object-linked data may be considered 'immediately reviewable' any time an Object is selected and the Object is not stored for later review.

Figure 14A:
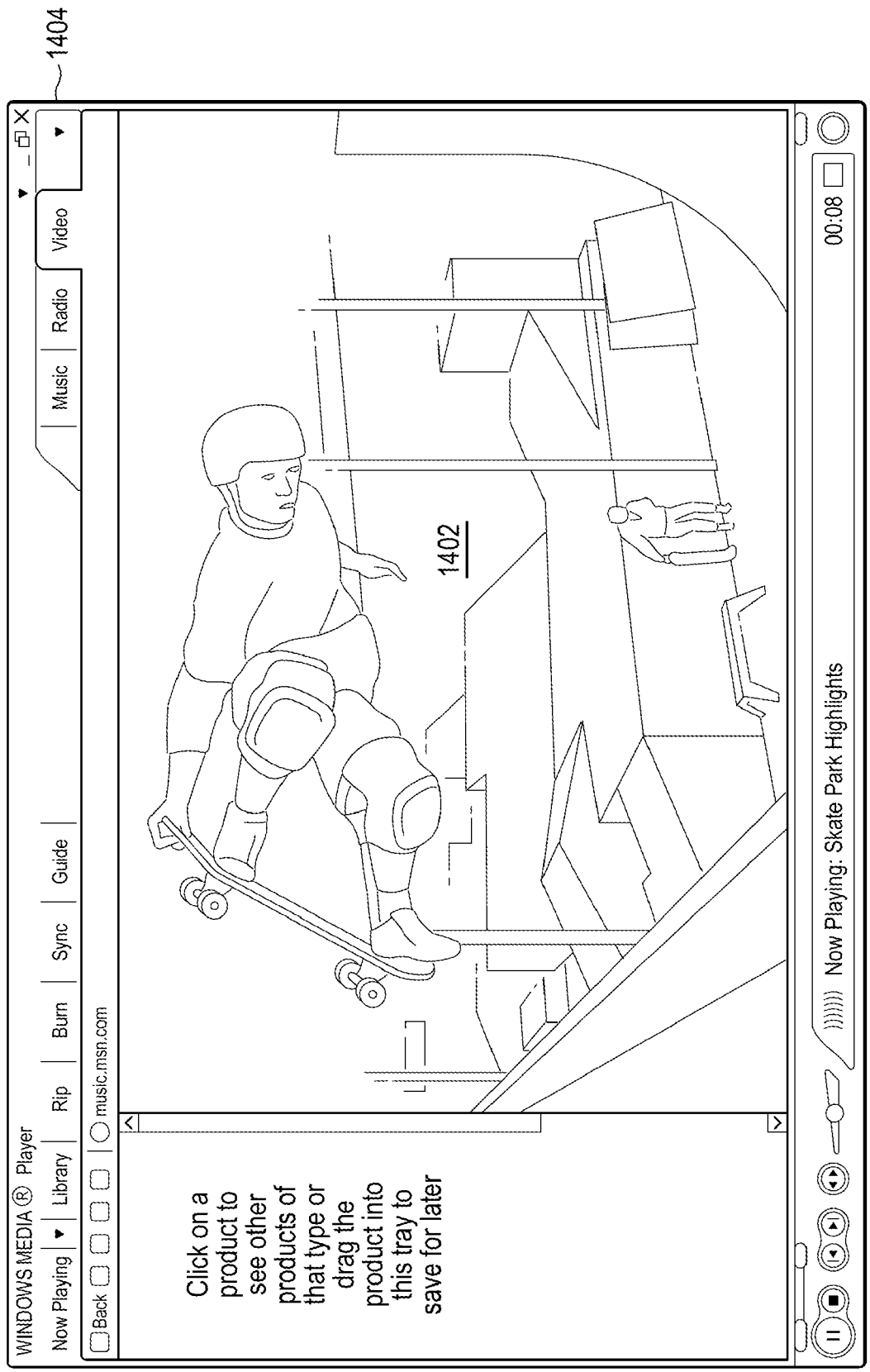
FIG. 14a is a screen-grab depiction of viewable content according to an embodiment of the invention.
Figure 14B:
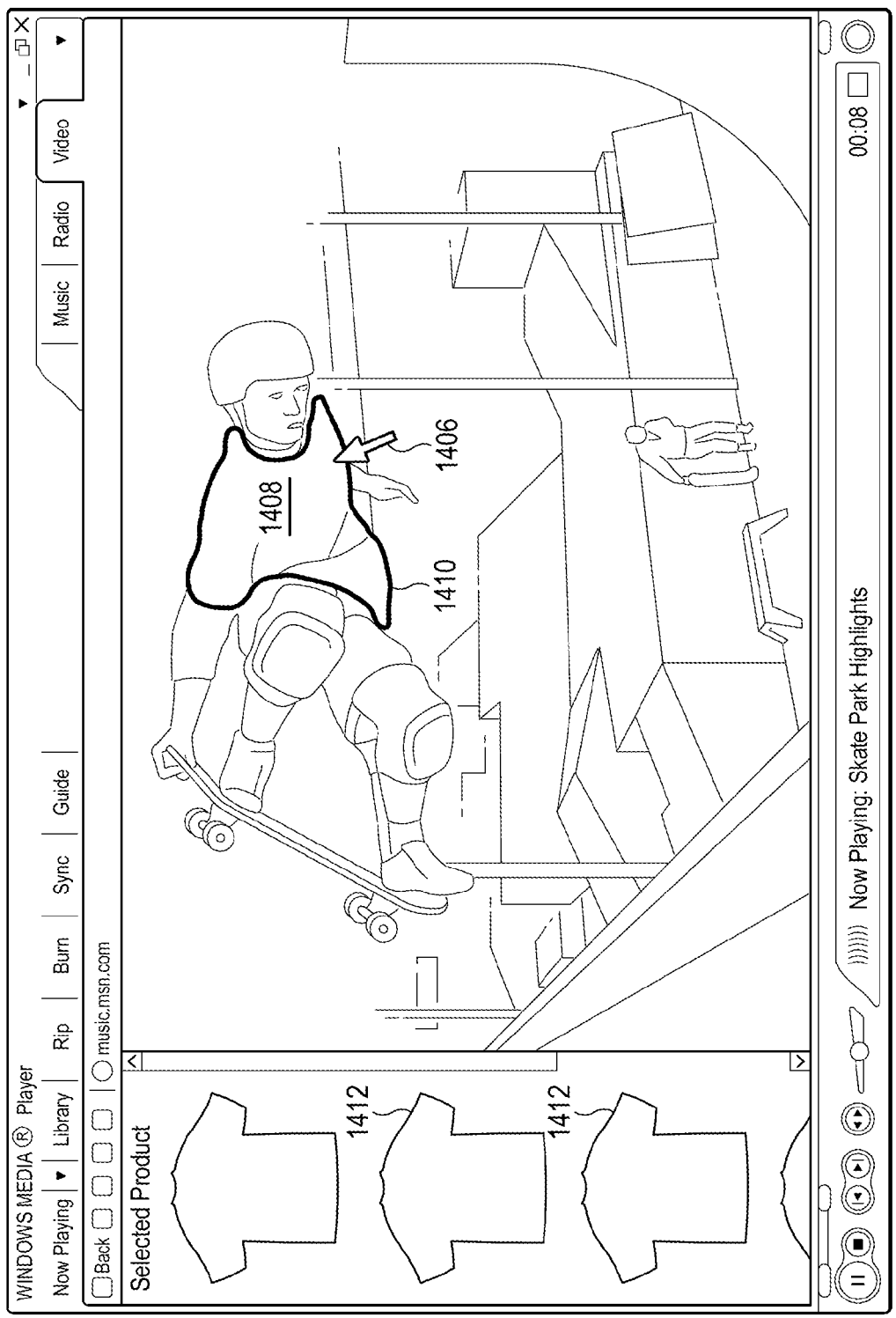
FIGS. 14b-e are screen-grab depictions of viewable content including inserted/overlaid objects according to an embodiments of the invention.
Figure 14C:
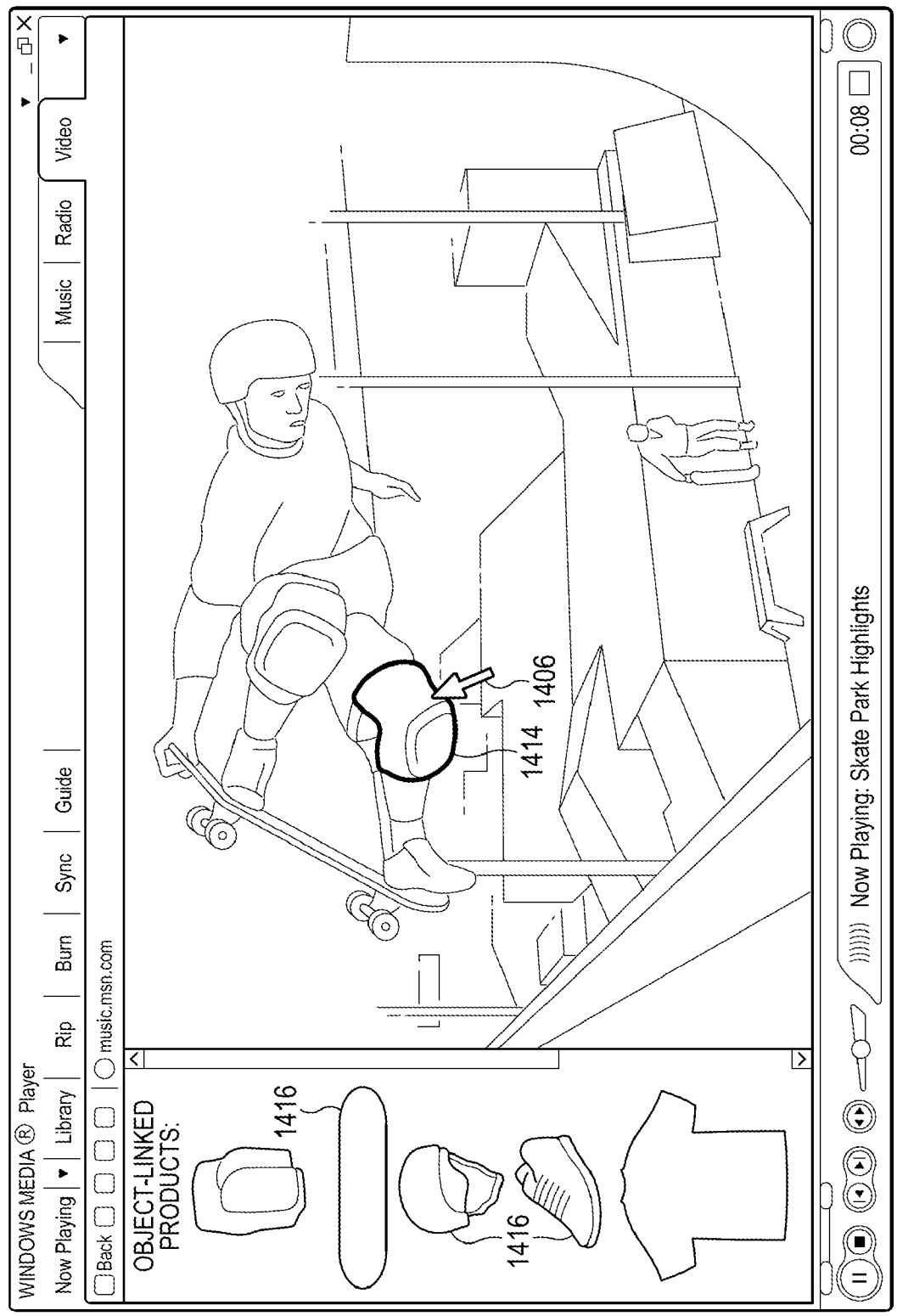

FIGS. 14*a*-*g* show embodiments wherein Object-linked data is immediately viewable by a Viewer. With reference to FIG. 14*a*, a Viewer views Content 1402, in this example a skateboarding video, using a computer program 1404 (e.g., Windows Media Player) adapted for displaying the Content. In FIG. 14*b* the Viewer places an indicator 1406 within the selectable portion of an Object 1408 (e.g., the image of a skateboarder's shirt), and a defined boundary 1410 corresponding to a Marker becomes visible to the Viewer (e.g., a line drawn using a telestrator-like tool or capability). Because an Object is inserted/overlaid at the Marker, the Viewer can select the Object, and Object-linked informational content 1412 (e.g., clothing merchandise) becomes Viewable by the Viewer in a separate area proximate to the Content 1402. Likewise, as shown in FIG. 14c, the Viewer can move the indicator to a portion of the Content image corresponding to another Marker and Object 1414, associated in this example with a skateboarder's kneepad. When selected, other Object-linked content (e.g., skateboarding equipment) is immediately viewable in a separate area of the device display adjacent to the Content. The Object-linked content typically but not exclusively includes Promoter-relevant items, such as items (e.g. merchandise) the promoter offers for sale to viewers. Therefore, the Viewer can typically select one or more of the Promoter-relevant items displayed in response to the Viewer's selection of an Object 1414. Further, the items themselves can likewise be selectable. Selecting an item can initiate a commercial transaction allowing the Viewer to purchase merchandise, can initiate a communication means (e.g., e-mail, telephonic, instant message session) with the Promoter or another, can activate a virtual environment in which, or example, an avatar of the viewer can try on a t-shirt, or can link the Viewer (e.g., live in real time) to other Viewers based on metadata associated with the item, although the embodiments are not so limited.

Figure 14D:
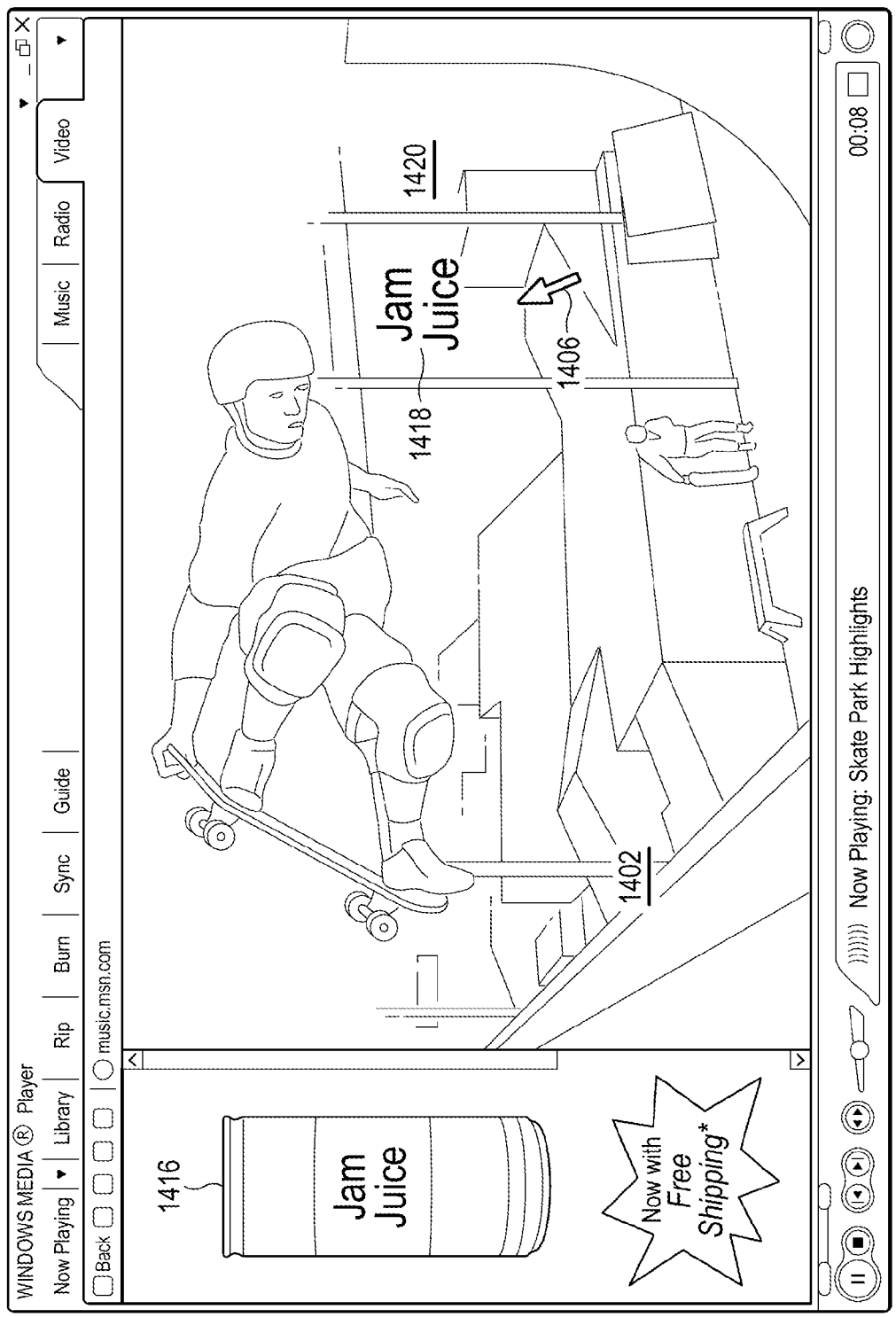

In FIG. 14c, the selectable Object is inserted at the Marker, and is effectively invisible, in that the Content image (e.g., the kneepad) is visible to the Viewer, and is not obscured from View by an overlaid visible Object. However, as shown in FIG. 14d, an Object can be overlaid at a Marker so that it is visible to the Viewer. Here, the visible Object 1418, a logo for a product (e.g., 'Jam Juice') is overlaid at a Marker associated with a portion of the Content image corresponding to a flat surface 1420 (e.g., a wall). The visible Object 1418 overlays portions of the flat surface, obscuring those portions from the Viewer's view. Once again, moving an indicator 1406 over the Object 1418 and selecting the Object 1418 causes Object-linked content 1416 (also shown in FIG. 14c) to be presented in an area of the display screen proximate to the Content 1402.

With reference again to FIG. 14b, the image of the skateboarder's shirt may appear in the original or marked Content substantially as shown in FIG. 14b, and the Object 1408 may be inserted so that it is substantially or completely invisible to the Viewer when viewing the Content. However, it is also possible that the skateboarder's shirt was another color (e.g., white) in the original Content, and the User assigned color to the Marker while or after associating the Marker with the portion of the Content corresponding with the skateboarder's shirt. Therefore, whenever and wherever the shirt is visible in the Content, all or a portion of the shirt appears to be the color assigned to the Marker by the User.

Likewise, in embodiments, a visible Object corresponding closely to an image in Content, such as the skateboarder's shirt and the Object-linked merchandise 1412 shown in FIG. 14b, can be overlaid at the Marker. This may be done by matching values, keywords, or other Content and/or Object relevant information (e.g. metadata descriptive information) provided by Users and/or Promoters, respectively. Therefore, throughout the viewing of the Content, the visible Object overlays and visually replaces a portion of the viewable Content (e.g., the skateboarder appears to 'wear' the overlaid Object shirt).

Figure 14E:
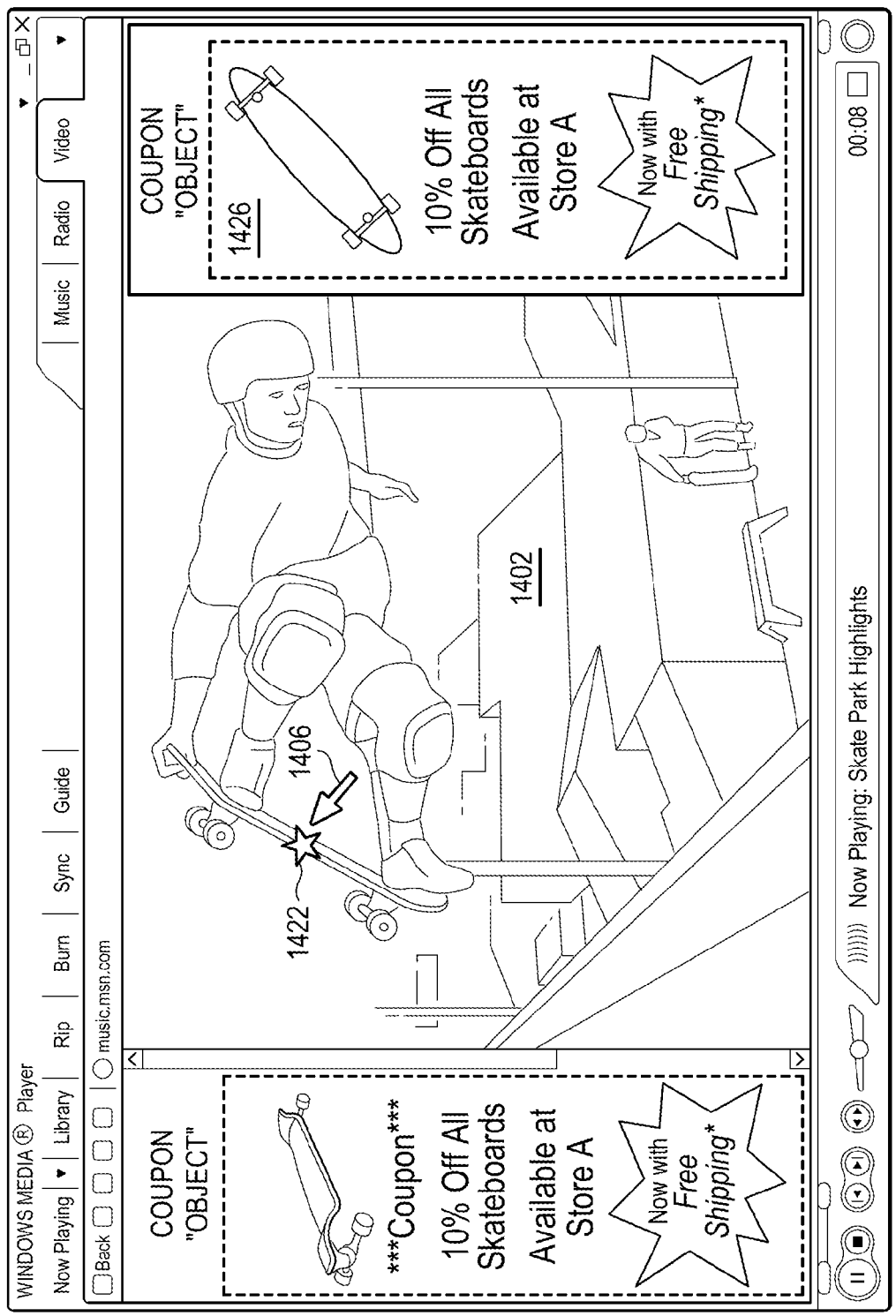

In FIG. 14e, the image of a 'coupon' Marker 1422 on an Object indicates the presence of an overlaid 'coupon' Marker. When the indicator 1406 is either rolled over the 'coupon' Marker 1422 or the 'coupon' Marker 1422 is clicked on, coupon Objects 1426 appear within the Content 1402 or at other areas of the display. The Server could have instructions for "coupon ads", configured as space that vendors could pay to have an advertisement placed within, such as by placing bids and being awarded access to the space upon placing the highest bid. In one embodiment, the coupon ads could be inserted within a "book" in a room or in an area that is visible to the Viewer so they can be viewed within one location that is understood to be for coupon ads. The Service could provide more areas for those who want to "pay" for inclusion in other parts of the visible areas—e.g., a branded Object that would have an indicator on it that there's a coupon available for it. The branded Object could serve as advertising for the brand and the Coupon Indicator (pictured here as a Star icon) could serve as a means to access coupons.

Figure 14F:
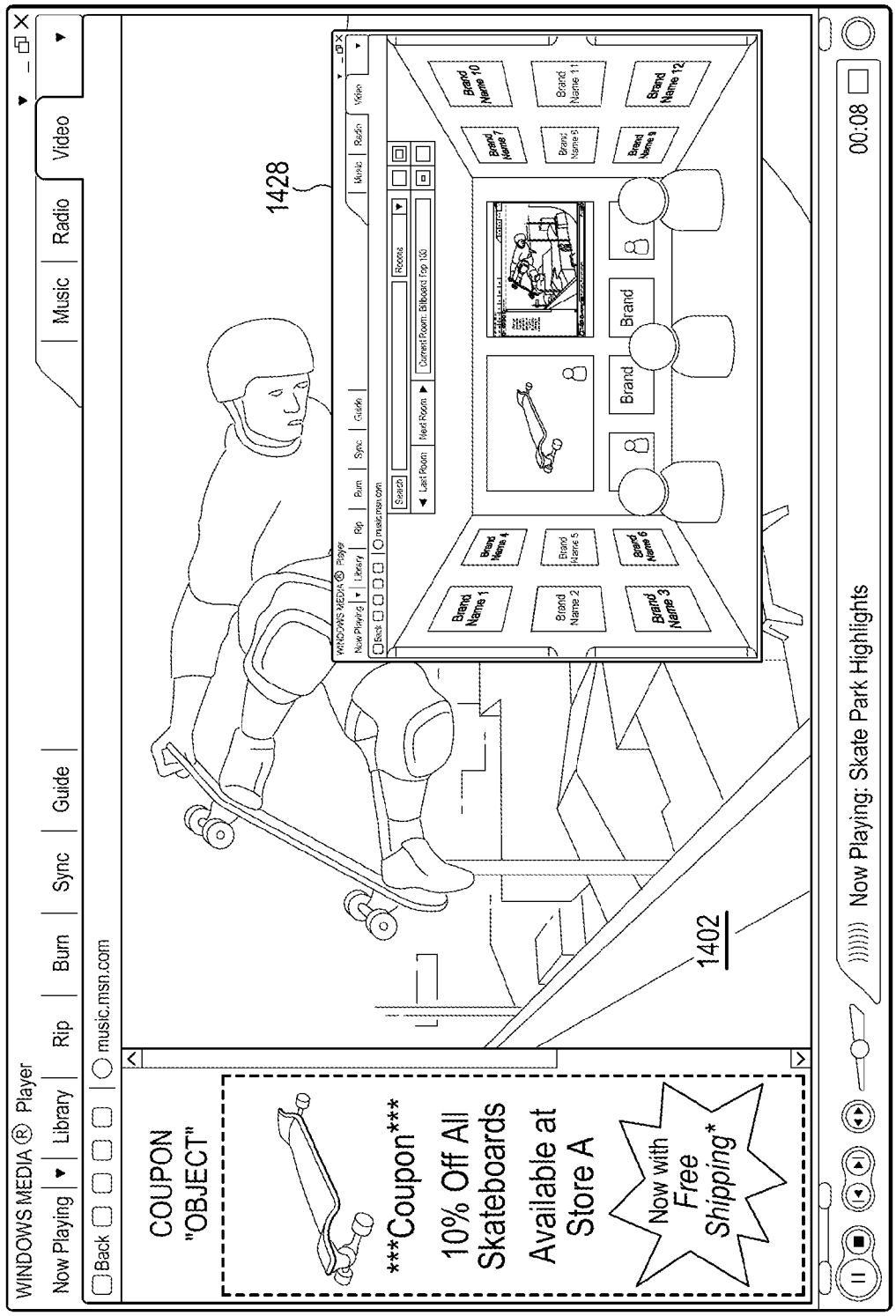
FIGS. 14f-g are screen-grab depictions of viewable content including selectable objects in n-dimensional virtual environments and/or worlds according to an embodiments of the invention.

In FIG. 14f, we see that by clicking onto areas of the Content 1402, a Viewer can elect to view and/or enter an n-dimensional virtual environment or world 1428, such as to be linked in a social network with other Viewers who are concurrently engaged in the same and/or similar Content. For example, FIG. 14F shows several Viewers who have been put into an n-dimensional environment or world together and are viewing the same Content, and these Viewers can communicate with each other, share and exchange Content files, and engage in other mutual/shared activities.

Figure 14G:
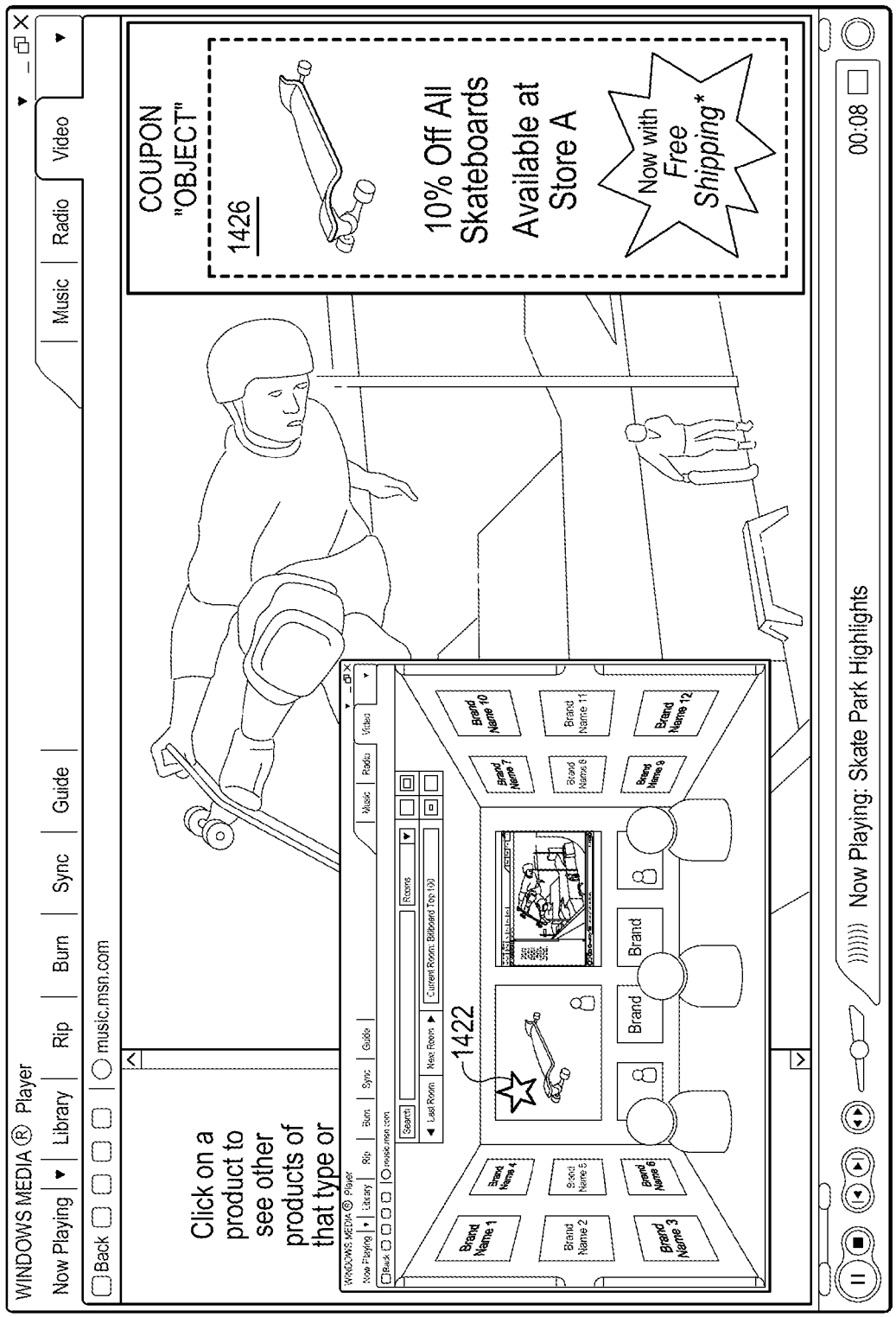

In FIG. 14g, coupon Markers (as indicated by the star 1422) can be placed on or within Content in an n-dimensional environment and/or world to launch the opening of coupon Objects 1426 that can be visibly overlaid within the Content or elsewhere in the display.

The examples described above should not be taken to imply that inserted Objects are necessarily invisible while viewing Content, nor that overlaid objects are necessarily visible while viewing Content. The visual attributes of visibility or invisibility can be assigned to both inserted and overlaid Objects without any necessary limitation of either attribute to either type of Object placement. Likewise, Objects both visible and invisible may be inserted or overlaid at Markers, whether those Markers are visible or invisible. In embodiments, a visible Object may obscure a portion of a visible Marker.

In the case of Data Packets associated with Content, the Data Packets may be either Viewer selectable or automatic (e.g. self-executing), or may be extractable through a software program that is designed to filter and extract data within Data Packets. With regard to Viewer selectability, selection of a Data Packet can result in any of a number of outcomes. For example, Viewer selection of a Data Packet may cause the data therein to execute, such as to play a video and/or audio clip, to display a message, to link to a webpage, or to cause some other User intended result. Alternatively, selection of a Data Packet by a Viewer may cause the Data Packet to be stored at or on a computer readable storage medium (e.g. a hard disc drive, a USB flash memory drive).

The data in a Data Packet could include links to web pages or shared window experiences with the Data Packet originator(s), so others can communicate with those who have retrieved certain codes or data from the Data Packets. For example, and to keep the Data Packets from being so large that they slow down the Content file downloads, the Data Packet information could be linked to external servers, web pages, systems or other entities that host web pages, and/or social networking sites. Such entities could keep records of all comments, correspondence or posts made into the Content, for review by all or by certain Data Packet retrievers. In an embodiment, a hosting entity could return and open in a separate window, or overlay on top of or associated with the Content, the messages that people want to leave and share with others who are viewing that Content. These messages/posts could be advertisements, communications among friends, invitations to join social networking groups, or other communication generated at least in part by exposure to Content, Data Packet information, and/or Objects. In another embodiment, the information within a Data Packet can be used to concurrently link the Viewer with one or more others who are engaged in the same and/or similar metadata as the Data Packet, or of Content in a live, social link, to communicate and share with those other Viewer(s).

As discussed, a User can designate what action is taken upon Viewer selection of a Data Packet, or a Viewer can so designate. In a preferred embodiment, the Viewer's designation will have priority over a User's designation, although in other embodiments a User's designation may control. Alternatively, the Service can override a designation of a User, a Host, a Promoter, or perhaps even a Viewer, such as to resolve a conflict, to prevent damage (such as by viruses or other sources of potential device or data corruption), to secure confidential information, to update Service tools, or for some other purpose.

Viewer selection of a Data Packet can also cause a confirmation message to be sent to the originating User, confirming that the Viewer has received and selected the Data Packet. According to this embodiment, a Data Packet can provide a valuable 'return receipt confirmation' function, similar to what is available in tangible postal systems (e.g., United States Postal Service) and/or email systems, even without utilizing these other systems.

In yet another embodiment, upon selecting Content for viewing, a new 'window' may open on a Viewer's device display, containing a directory (e.g., menu, index) of all Data Packets, and/or Objects associated with the Content. Display of a 'directory window' allows the Viewer to select Data Packets and/or Objects individually or in combinations. So selected, the Viewer may be able to designate and initiate (or schedule initiation of) a desired activity, such as viewing, storing, responding, navigating to, forwarding, or other options, with respect to the Data Packets and/or Objects. When selecting multiple Data Packets or Objects, a Viewer may choose to initiate an action with respect to each according to a sequence, as a batched activity, or according to some other schedule. For example, a Viewer may select one or more Objects and/or Data Packets from a directory and inspect them for viruses in a batch process using a computer virus scanning software program, prior to taking any other actions (e.g., executing, storing, forwarding) with respect to any of them.

Data Packets may also be associated with Content to provide additional information related to the Content itself when selected by a Viewer. For example, a Data Packet can display, in a separate window or as text overlying some portion of the Content itself, information about the actors, setting, director, or some other aspect of viewable content, such as a short movie clip. Alternatively, a Data Packet can provide information about various products depicted in viewable content, allowing a Viewer to navigate to a website where the User can purchase the products.

Data Packets can function like 'sticky notes' placed in Content. A Viewer can select a Data Packet, or a Data Packet may automatically activate when a portion of active Content plays, and the Data Packet may cause a message to appear, remain temporarily, and then disappear once again from view. Therefore, Content can be used as a type of message board and/or reminder tool for Viewers, through the use of 'pop-up' messages delivered by Data Packets associated with the Content (e.g., as 'notes' posted for their friends to see). Alternatively, Data Packets allowing subsequent n-User data entry can function as a 'visitor register' for Content Viewers to record their names and/or comments regarding the Content.

Data Packets can be particularly useful for providing confirmation of the occurrence of an activity or affirmation. For example, distance learning may be accomplished by making available to a remote Viewer certain educational content. One or more Data Packets may be associated with the Content by a User, such as an educational provider, wherein the packets monitor the Viewer's progress through Content and provide confirmation to the User that a Viewer viewed the Content. Alternatively, the Viewer may be prompted by automated 'reminder' Data Packets to activate other Data Packets at the end of a Content section, the activation of which provides affirmation by the Viewer that they have viewed the Content. Data Packets can also deliver quizzes to students regarding material viewed by the student, to monitor and ensure student comprehension. By these and/or similar embodiments, providers of distance learning can remotely deliver and confirm students performance of coursework, and other Users can achieve similar ends with regard to audiences for their Content.

Conversely, students, researchers, and others can create content (e.g., research papers, reports) combining multiple media forms. For example, a student can create a 'base' Content (e.g. a text report), and associate with the content, at various locations throughout, Data Packets providing notes, video clips, photographs, links to websites, invitations to 3-dimensional interactive exhibits, inquiry submission forms, or other informative materials. Therefore, a rich and active informational experience emerges from an otherwise textual report through the use of associated Data Packets.

Although it is not repeated with regard to each and every embodiment herein, Data Packets associated with Content can also collect and or monitor information regarding Viewers' activities, and distribute that information to designated entities (e.g., the Service, the User, a Host, a Promoter, or a third party such as viewer's parent or teacher, among others). This may be true with regard to any or all of the embodiments described herein. Data Packets can also prevent a Viewer from accessing certain Content without first viewing other Content and/or taking some action. For example, a Viewer may not be able to view Content without first viewing a licensing agreement or a copyright warning, and/or acknowledging having done so.

7) Viewer Attribute-based Insertion/Overlay

Figure 5:
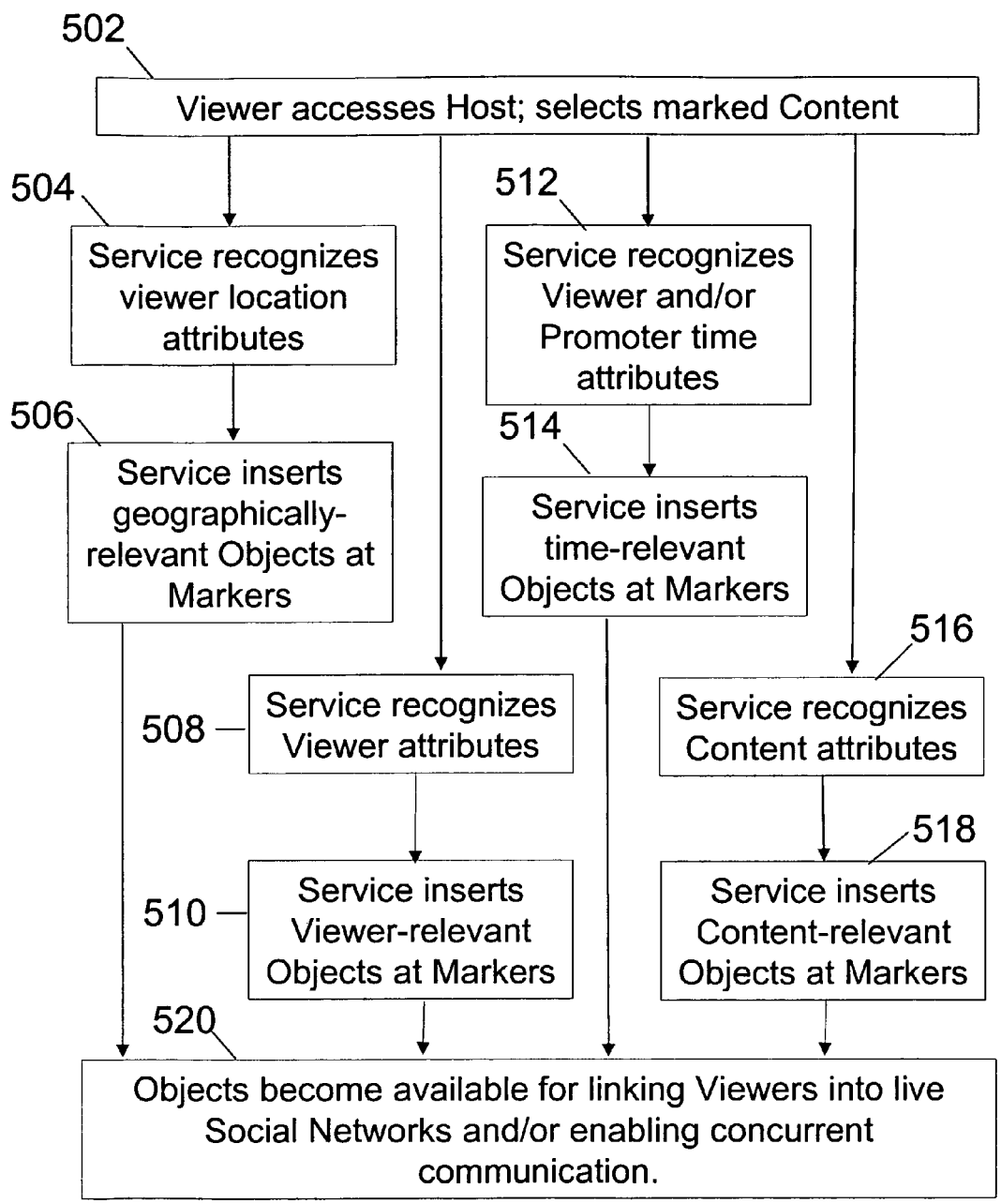
FIG. 5 is a block diagram depicting a plurality of operations including inserting and/or overlaying attribute relevant objects according to embodiments of the invention.
Figure 6:
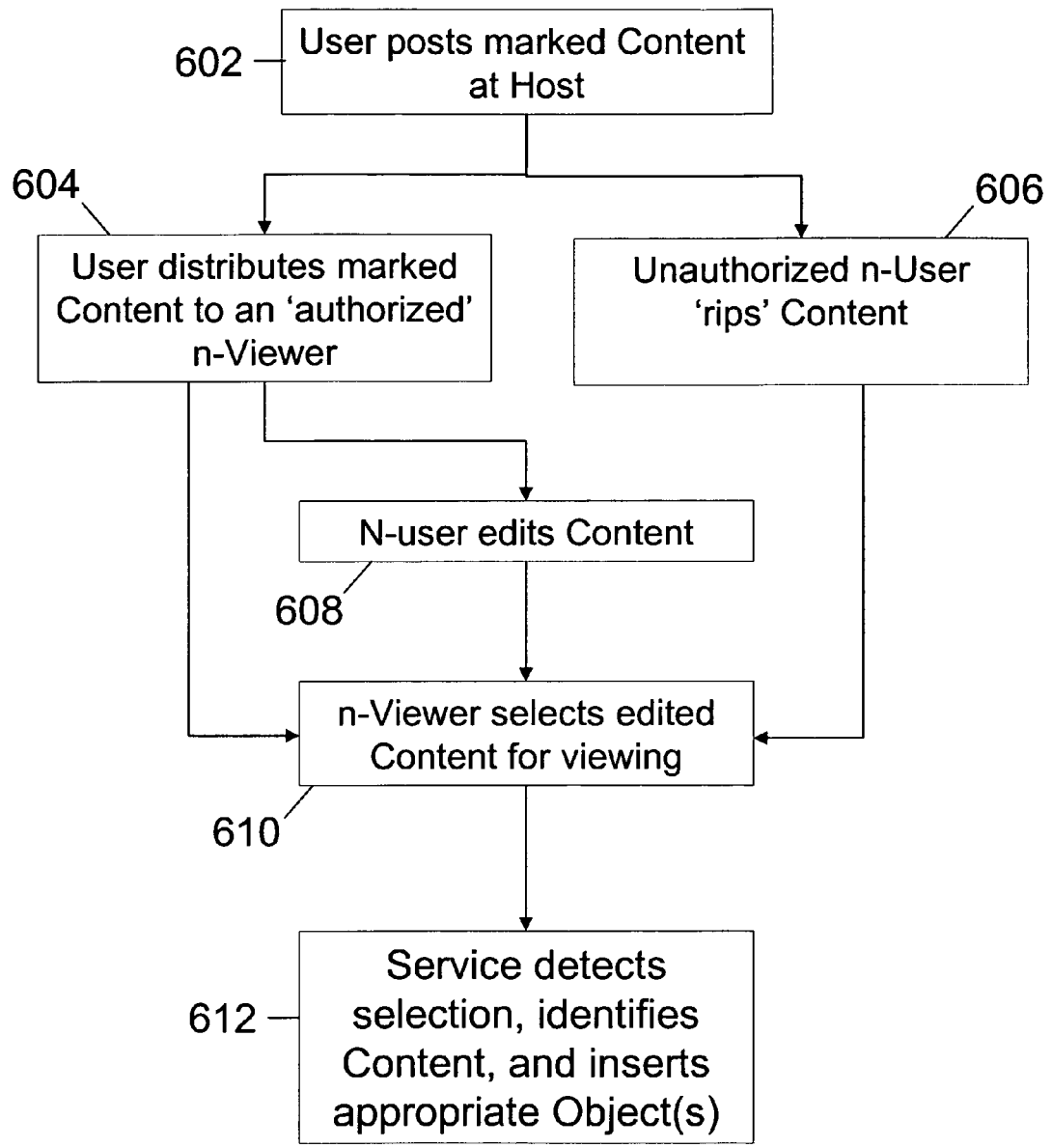
FIG. 6 is a block diagram depicting a plurality of operations including inserting and/or overlaying objects relative to distributed and/or edited content according to embodiments of the invention.
Figure 7:
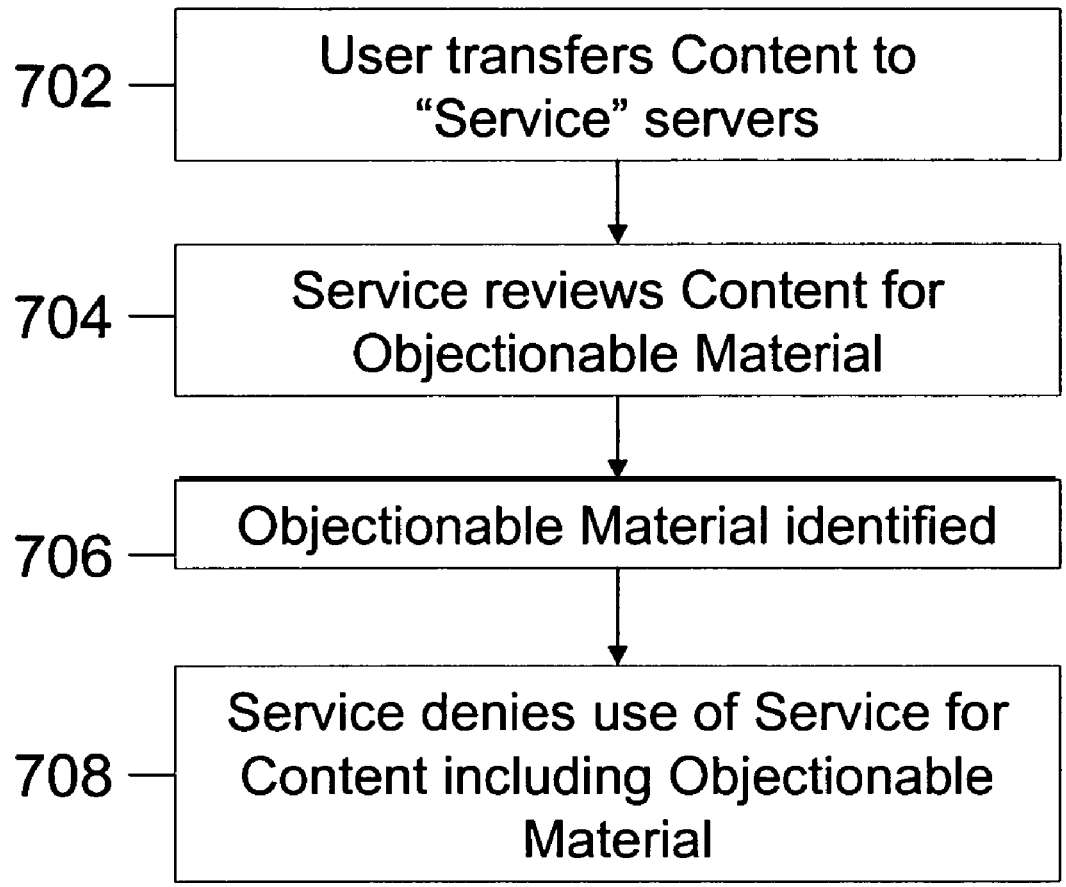
FIG. 7 is a block diagram depicting a plurality of operations including reviewing content for objectionable material according to an embodiment of the invention.

As shown in FIG. 5, embodiments of the invention also provide for insertion/overlay of Objects at Markers based upon various attributes of a Viewer. These and related embodiments provide a high degree of flexibility and effectiveness to, and increase the revenue generating potential and efficiency of applications of the embodiments.

In general, a Viewer accesses a Host, at 502, and selects marked Content for viewing. As previously described, the Service can detect the selection of marked Content, and can identify the Content by its unique identification associated and/or embedded into the Content during registration by the User. However, according to an embodiment, the Service also recognizes, at 504, the geographic location of the Viewer. For example, the Service may recognize that a Viewer selecting Content for Viewing is located in Japan. Therefore, at 506, the Service is able to insert and/or overlay Objects of relevance to Viewers in Japan at Markers in the selected Content. Further, the Service may have agreements with Promoters of products, services, or information that the Promoter wishes to direct toward Viewers in Japan, whether those Promoters are located in Japan or not. By this embodiment, Promoters can target information to specific (e.g., cities, provinces) or general (e.g., countries, regions) geographical areas without the need to create wholly separate Content for each.

In another embodiment shown at 508, the Service recognizes Viewer-specific attributes, and inserts Viewer-relevant Objects at Markers in the selected Content, at 510. In one instance, the Viewer may have provided to the Service information about the Viewer's interests and/or other demographic information pertinent to the Viewer or to a group with which the Viewer is associated. This information may have been provided by the Viewer via an on-line Viewer information survey or other data-collection means available from the Service. This information (the Viewer-specific attributes that are provided to the Service) and the Viewer-relevant Objects that are inserted into the Markers, could be used by the Service to link Viewers to other Viewers to create social networks around the commonality of their interests, in the same or a similar manner as that described in U.S. Provisional Patent Application Ser. No. 60/856,404, indicated above.

The Viewer, while performing internet searches for content may specify keywords, for example 'snowboard', to guide search engines (e.g., Google, Ask.com, Yahoo) during a search. Such keywords can serve as Viewer attributes indicating topics of interest that the Service can use to insert/overlay Objects of interest to the Viewer. As in the example given, the Service can insert/overlay Objects related to snowboarding gear, suppliers, and/or facilities, just to name a few possibilities.

In another instance, the Viewer may have provided such information to the Host as part of a registration process for access to the Host, and the provided information is made available to the Service. Due to on-line privacy concerns, such information frequently may be provided only with the Viewer's consent. Absent specific consent, Viewer information may be provided to the Service by a Host in cumulative form, relating to viewers similar in type to the Viewer, without being specific to or identifying that individual Viewer. Alternatively, the Viewer's anonymity can be preserved by the use of neutral tokens as described in Provisional Patent Application No. 60/856,404, indicated above. In still another instance, the Viewer may be given the opportunity to provide information prior to, while, or after viewing the Content. This information can then be provided to the Service and the Service can update the Objects inserted/overlaid in the marked Content, or use the information to select appropriate Objects for inserting in subsequently selected Content.

The Service may also have the tools and/or capability to track a Viewer's on-line habits, such as which sites they visit, what kinds of music or other items they download, from which on-line retailers they make purchases, and other such information which can also constitute 'Viewer Attributes'. By such information, the Service can insert/overlay Objects that are not only relevant to a Viewer's interests, but which can also change as a Viewer's interests, as indicated by their habits, also change. In addition, the Service can use these "Viewer Attributes" to link Viewers to other Viewers to create social networks around the commonality of their interests, in the same manner that is described in U.S. Provisional Patent Application Ser. No. 60/856,404, indicated above. This process follows the same or similar steps as in the embodiment depicted in FIG. 16.

In still another embodiment, the Service can recognize Viewer and/or Promoter time-relevant attributes at 512, and insert time-relevant Objects at Markers in Content at 514. For example, a Promoter may select and specify an Object for insertion/overlay only after a specified date/time. Therefore, the Object would not be inserted until after the specified date and/or time. Likewise, a Promoter may specify a time and/or date after which an Object should be inserted/overlaid, or some combination of start/end dates or times, as well as a duration for and an interval between each. In such situations, the Service can detect the time and/or date when a Viewer selects Content for viewing. When such time/date falls within a time/date specified for inserting/overlaying (or ceasing to insert/overlay) the time-specified Object, the Service can insert/overlay (or cease to insert/overlay) the Object(s) as requested by the Promoter.

The ability to recognize time attributes enables Promoters to present time-sensitive information to Viewers. For example, clothing retailers who schedule specific fashions or seasonal clothing promotions to coincide with the specific times of the year can provide Viewers with access to information about those products at the appropriate times. This can include notifying Viewers of short-duration sales, limited-availability items, special events, or other time-sensitive or time-limited information.

Likewise, Viewer-relevant time attributes could relate to the season and/or time of date at the Viewer's location, enabling a Promoter to provide information relevant to the Viewer's time-based needs. In an embodiment, a Viewer may be able to set 'alarms' or other time or date-relevant indicators, such as for birthdays or anniversaries of friends or family members. A Service could then detect those indicators, and insert and/or overlay marked Content Objects relevant to the Viewer's time-based needs. For example, Objects could include recommended gift items, coupons, personal messages, reminders, as just a few examples.

Of course, a Service could likewise recognize both Viewer and Promoter time-relevant attributes, and meaningfully related them to provide increased benefit to both the Viewer and the Promoter. For example, a Promoter may wish to schedule the release of information to coincide with time-based events at other locations. The information could be a television broadcast of New Year's Eve events in New York's Times Square, to be delivered to each Viewer time zone only after midnight in the time zone. Therefore, the Promoter could associate time-relevant values with an Object (e.g., link to a broadcast), and a service will only insert and/or overlay the Object when a Viewer selects Content for viewing and the Service detects that it is after midnight where the Viewer is located, based on, for example, a clock on the Viewer's computer or other content viewing device.

According to yet another embodiment, the Service recognizes attributes of the selected Content at 516, and at 518 inserts/overlays Objects having relevance to the Content attributes at Markers in the Content. For example, Content-relevant attributes can be values attributed to the Content by the User during Content registration. As described earlier, recognizing Content-relevant attributes allows the Service to insert/overlay sports-related Objects at Markers associated with sports-related Content. This increases the relevance of inserted/overlaid Objects with the underlying Content, and increases the chance that Promoters can direct information more effectively at Viewers with relevant interests. That is, Viewers of sports-related Content may be more likely to buy sports-related products, or be more interested in sports news, videos, or other sports-relevant, Object-linked information.

Thereafter, as seen at 520, the Service can use the Objects placed at the Markers to link Viewers together into a live social network, wherein the Viewers are concurrently engaged in Content having the same and/or similar context, Objects, and/or Object metadata, for concurrent and live communications.

One of ordinary skill in the art will recognize that numerous combinations of subsets of the above described embodiments would also be extremely useful. For example, an airline company may want to insert an Object only for Viewers in Japan, and only during the winter, for example to advertise discount flights from Tokyo to Australia. Therefore, the Service may recognize geographical and time-relevant attributes of Viewers selecting Content, or of Content itself, and perhaps Viewer attributes relating to income or interests, and insert/overlay an Object into marked Content accordingly. Likewise, the Service could recognize Promoter attributes, such as may relate to seasonal discounts, room availability, and/or off-peak pricing. At the same time, however, Content Viewers in Maine may receive Objects advertising vacation opportunities in Arizona, as indicated by time, geographical, Viewer, Promoter and/or other relevant attributes. Other embodiments likewise include combinations of two or more attribute types, to specifically target information according to the specific or general needs of a Promoter.

8) Marker Persistence in Distributed Content (Authorized and Unauthorized)

It is almost inherent in the nature of the internet that Content posted to even a single website is frequently copied to other websites, downloaded by internet users, modified and reposted, and generally distributed both with and without authorization from the Content owner. Embodiments of the invention take this transient nature of Content into account, and provide benefits to Promoters, Viewers, Users, and the Service despite such occurrences.

For example, consider a User who posts marked Content at a Host (e.g., YouTube, Kodak Gallery, MySpace), at 602. The User may intend for, or expect that, Viewers will download and share the Content. For example, the Content downloaded by a first Viewer may be conveyed to a second Viewer, who may convey the Content to a third Viewer, and so on. Thus, the User has authorized, either by intent or acquiescence, that the Content be distributed to multiple Viewers (n-Viewers). In such situations, although the Content may be copied from the Host and distributed from each n-Viewer to subsequent n-Viewers, the Markers and unique identification associated with the Content during Content registration remain associated with the Content. Thus, each time an n-Viewer selects the Content for viewing, at 610, the Service detects the selection at 612, identifies the Content, and inserts/overlays the appropriate Objects at each Marker in the Content.

The User may also provide authorization (e.g., express or implied permission) allowing n-Users to edit Marked content. Therefore, an authorized n-User may edit Content, at 608, by removing portions, by combining other content into the Content, by copying portions of the Content into other content, or in other ways. However, when the edited Content, or other content including portions of the edited Content are selected by an n-Viewer for viewing, at 610, the Service will detect the selection. The Service can then identify the remaining Content, and insert/overlay appropriate Objects, at 612, at the Markers in the remaining portions of the Content. The Service is able to identify edited portions of Content because the unique Content identification, in embodiments, is included in or with a Marker. The Markers, and an associated unique identification may be considered linked and/or 'persistent'. Wherever the Marker goes, so goes the unique Content and/or Marker identifier. As long as an edited portion of Content retains at least one Marker, the Content remains identifiable by the Service, and Objects can be inserted/overlaid at the Marker.

Likewise, an unauthorized n-User may 'rip' Content, at 606. 'Ripping' generally means that the n-User does not have authorization, either explicitly or impliedly, to copy and/or edit the Content. In many cases, copying and/or editing the Content may be prohibited by contract, by law, or by another source of authority. In such situations, or in others reasonably similar, the n-User may be described as an unauthorized n-User. Subsequently, the unauthorized n-User may view the Content himself (as an n-Viewer), or may redistribute the Content to other n-Viewers. However, as in the case of an authorized User, when the edited Content, or other content including portions of the edited Content are selected by an n-Viewer for viewing, at 610, the Service will detect the selection, identify the remaining Content, and insert/overlay appropriate Objects, at 612, at the Markers in the remaining portions of the Content.

Generally, a system is anticipated for supplementing device-accessible, viewer-perceivable content utilizing plural service providers. Such a system can comprise one or more services configured to associate objects with markers identified to the first service. An action of a viewer with respect to content including a marker (e.g., downloading the content, selecting for viewing, saving, bookmarking, etc.) causes notification of one or more such services of the action. In response to the notification, the service(s) can associate an object with the marker, enabling the viewer to select or take some other action relative to the object when perceiving the content.

In situations where content includes only markers identified to one service (e.g., registered by or to the service) is acted upon by a viewer, that marker typically receives association with one or more objects from only that service. However, when content includes markers identified to more than one service, each marker in the content can receive association with objects by whichever service the marker is identified. Therefore, content can receive object/marker associations from more than one service in response to a single action taken by a viewer relative to the content.

In still another embodiment, content may include one or more markers obtained from a third party (e.g., perhaps not a 'service', but rather a provider of custom markers) and identified to one or more services. When such content is acted upon by a viewer, the markers can receive association with objects via any of multiple service providers to whom the markers are identified. Thus, an embodiment of the invention anticipates a secondary market for vendors or other providers of custom markers. The markers can then be registered with one or more services by the vendor or other provider of the custom markers, by a purchaser or other receiver of the custom markers, or by a User placing markers into Content.

As described, although marked Content is distributed and re-distributed after being transferred to a Host by an original User, and may also be edited by both authorized and unauthorized n-Users, the Markers remain persistent in Content. Therefore, each time the marked Content or portions thereof are selected for viewing by an n-Viewer, the Service is able to detect the Content selection, and appropriately insert/overlay Objects at Markers in the Content (e.g., as relevant to time, geographical location, supply/demand curves). The n-User who 'rips' Content may insert alternative Markers in the Content and register those alternative 'Markers' with an alternative Host and alternative Service that will be able to insert/overlay alternative Objects in the 'ripped' Content. The 'ripped' Content can allow for insertion of Objects from the original Host and the original Service in any of the original Markers that remain in the 'ripped' Content and also insert alternative Objects in the alternative Markers as described herein, from the alternative Host and the alternative Service.

Associating Data Packets with Content provides Users with another method to ensure the persistence of supplemental informational value in Content. As described, Data Packets generally carry with them a discrete, complete set of information enabling a particular function or result. As such, Data Packets can be excised along with a portion of the original Content by an n-User, and will generally retain full functionality. Therefore, if the n-User republishes a portion of Content including a Data Packet associated with the original Content by the User, the Data Packet will still function as designated by the User.

In some embodiments, however, a User may wish to set Data Packet parameters such that the packets cease to function if separated from all or a designated portion of the original Content. Such embodiments provide Users with some measure of control by preventing data included in a Data Packet from being associated with Content that is not congruent with the nature of association intended by the User. For example, if a User so designated, an n-User would not be able to associate a Data Packet related to ecclesiastical material with pornographic content. Thus, the Data Packet will not, for example, extend invitations to pornography viewers to join an ecclesiastical social network, or vice versa.

9) Identification of Objectionable Content and/or Objects; Denial of Use of Service Promoters may not want their brand names, products, Objects, or identity associated with Content which includes objectionable material. Therefore, once the User transfers Content to the Service servers, at 702, during registration for using the Service to associate Markers with the Content, the Service can review the Content for the presence of objectionable material, at 704. This can be accomplished by human review of the Content, or by using a pattern recognition system (e.g., software). For example, representatives of the Service (or certain of its Viewers or Promoters) may visually detect the presence of objectionable material. If objectionable material is identified in the Content, at 706, representatives of the Service (or certain of its Viewers or Promoters) can deny use of the Service and its tools and capabilities (e.g., Marker and insertion processes) with regard to the Content including the objectionable material at 708. In this manner, the Service can 'filter out' Content containing objectionable material, and prevent Service Markers and Promoters' Objects from being associated with objectionable material.

Alternatively, the Service may be able to provide an option to the user, a third party, and/or an automatic or selective software program to insert clothing or some other cover over a partially or fully nude body, or other objectionable material in the Content.

Additionally, the Service can detect (by various means including possibly by a software program, by visual scans by representatives of the Service, by Viewers, or by Promoters) and deny use of the Service to Content including depictions of, or Content which in and of itself constitutes certain illegal activities, including, but not limited to:

a) content or activities that constitute or cause, directly or indirectly, a breach of any contractual or other duty owed by the User to a third party;

b) content or activities that constitute a tort or other legal wrong of any kind against a third party;

c) content or activities that constitute a violation of any national, state or local law, regulations, ordinance or other applicable restriction;

d) content or activities that constitute or involve computer hacking, the creation of computer 'viruses' of any kind or description, and/or the negligent, reckless or intentional distribution of such viruses; and/or e) activities that involve, foster, or are in the nature of bulk emailing, 'spamming', or similar mass distribution activities.

The Service can detect (by various means including possibly by a software program, by visual scans by representatives of the Service, by Viewers, or by Promoters) and deny use of the Service to Content including depictions of, or Content which in and of itself constitutes certain potentially harmful activities, including, but not limited to:

a) tobacco, alcohol, and or drug use;

b) use of weapons;

c) gambling;

d) content that sets a bad example for young children, and/or that teaches or encourages children to perform harmful acts or imitate dangerous behavior;

e) content that creates feelings of fear, intimidation, horror, and/or psychological terror; and/or, f) incitement or depiction of discrimination or harm against any individual or group based on gender, sexual orientation, ethnic, religious and/or national identity.

Additionally, the Service may identify (by various means including possibly by a software program, by visual scans by representatives of the Service, or by Viewers, or by Promoters) Content that is libelous, defamatory, threatening, abusive, fraudulent, harassing, that violates the privacy rights of any individual, that is of a political nature, or that is copyrighted, trademarked, patented or otherwise protected content for which there is no prior express written consent for use from its owner.

In much the same way as described above relative to Content, Users, Hosts, Viewers, and a Service itself may not want objectionable material inserted and/or overlaid at Markers in Content. This is particularly true considering that Content may be of a nature that young children may generally view, for example, and the objectionable nature of material inserted/overlaid within the Content may not be apparent until a child has already been exposed to it. Therefore, a Service may also wish to review Objects for objectionable material before allowing them to be inserted and/or overlaid at Markers. This may generally be unnecessary due to contractual provisions between a Service and a Promoter prohibiting such material in Objects or linked to by Objects. However, such capability provides an added layer of protection in case of breach of such a contract, or some other situation in which objectionable material may otherwise be inserted and/or overlaid in marked Content.

Figure 8:
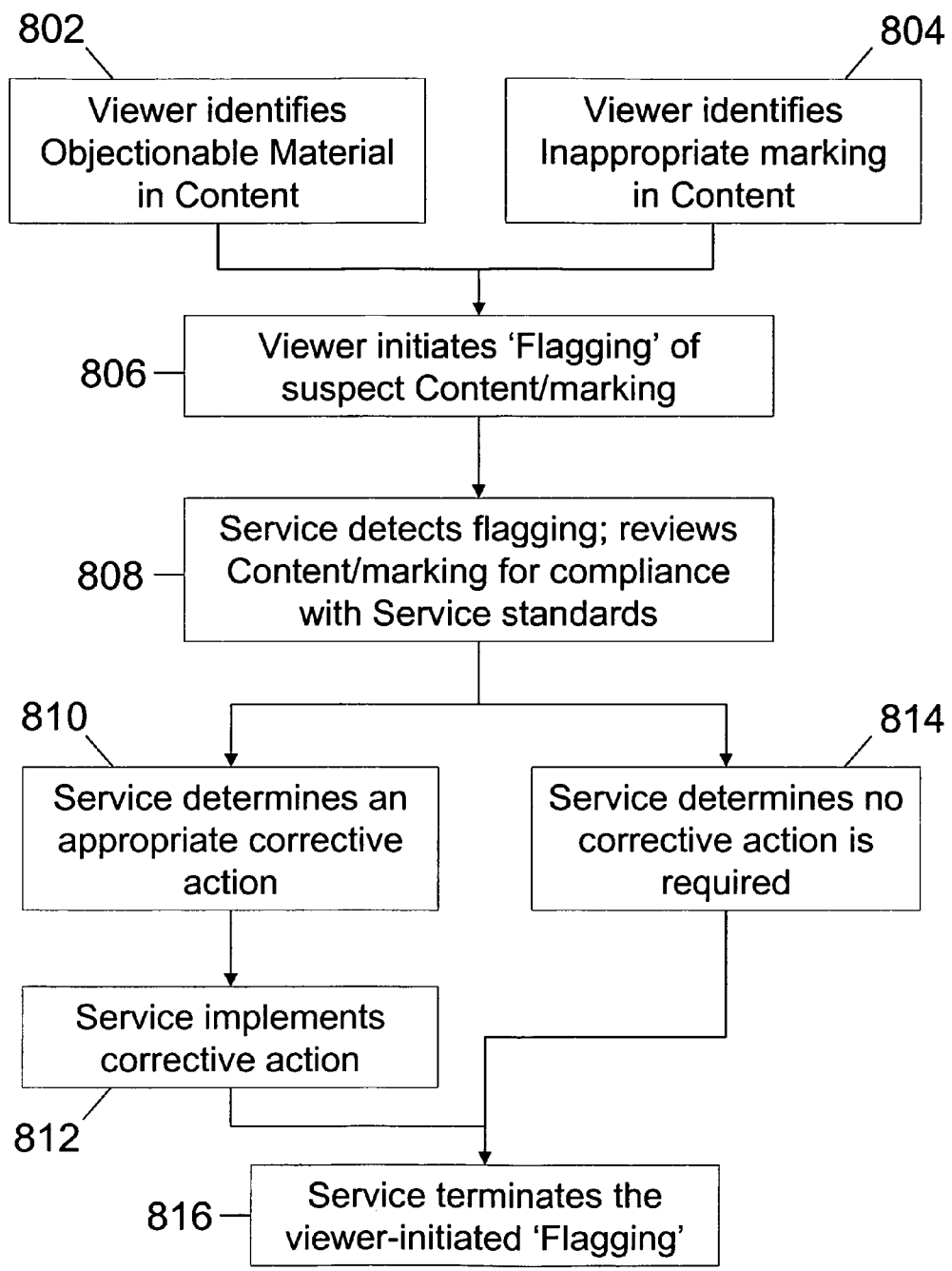
FIG. 8 is a block diagram depicting a plurality of operations including flagging content according to embodiments of the invention.

10) Control Over Content, Markers, and Inserted/Overlaid Objects: Flagging and Digital Rights Management Controls The Service can exert control over Content, Markers, and inserted/overlaid Objects in several ways. One method of control includes providing tools and capabilities to Viewers to 'flag' problems with Content or inserted/overlaid Objects. With reference to FIG. 8, a Viewer may identify objectionable material in marked Content, at 802, or inappropriate marking of Content, at 804, such as Markers that are not put in the right place or in the right context within Content.

In either case, the Service can provide the Viewer with capabilities to initiate 'flagging' of the suspect Content and/or Marking, as at 806. Flagging may be initiated, in embodiments, by selecting an icon in a toolbar, by opening an email or other messaging dialogue to the Service, or by some other method or tool. However activated, the Viewer-initiated flagging causes the Service to become aware of a Viewer-perceived problem with marked Content. Therefore, at 808, the Service detects the Viewer-initiated flagging, and either immediately or at some later time review the Content and/or its associated marking for problems. The flagging may allow the Viewer to provide information identifying and/or describing the general or specific nature of the perceived problem. For example, the Service may provide a list of selectable categories of general problem types, or may provide a text entry box into which a Viewer can describe the problem from the Viewer's perspective. Additionally, the flagging process may 'capture' the unique Content identification of the flagged Content so that the Service can readily and accurately associate the reported problem with the correct Content.

As mentioned, in general, the Service may not retain Content on Service servers after the Content is marked by a User. Therefore, the Service can either review the Content by accessing it where it resides at the Host, or cause the Content to be transmitted or copied back to the Service servers to be reviewed there.

After reviewing the Content in light of the Viewer-initiated flagging, if the Service determines that a corrective action is warranted at 810, the service can then implement an appropriate corrective action at 812. Examples of corrective actions can include, but are not limited to, removing or deactivating all or a subset of the Markers in the Content, deleting inserted/overlaid Objects from Content, fixing or prompting a User to fix the placement of all or a subset of the Markers in the Content, deleting or requesting a Host and/or User to delete Content or to otherwise prevent Viewer access to Content, and/or or other actions as deemed appropriate and/or effective to mitigate the problem at hand. In a situation where multiple Objects are inserted/overlaid at a Marker, and only a subset of the Objects is/are related to objectionable material, any one or more of the Objects can be removed from the Marker while leaving the other Objects in place. Thereafter, the Service can terminate the Viewer-initiated flagging, at 816.

Alternatively, after reviewing the Content and/or associated flagging in light of the Viewer-initiated flagging, the Service may determine that no corrective action is required, as shown at 814, and therefore terminate the Viewer-initiated flagging, at 816. Whether or not corrective action is taken, the Service can notify the Viewer regarding the determination and result.

Figure 9:
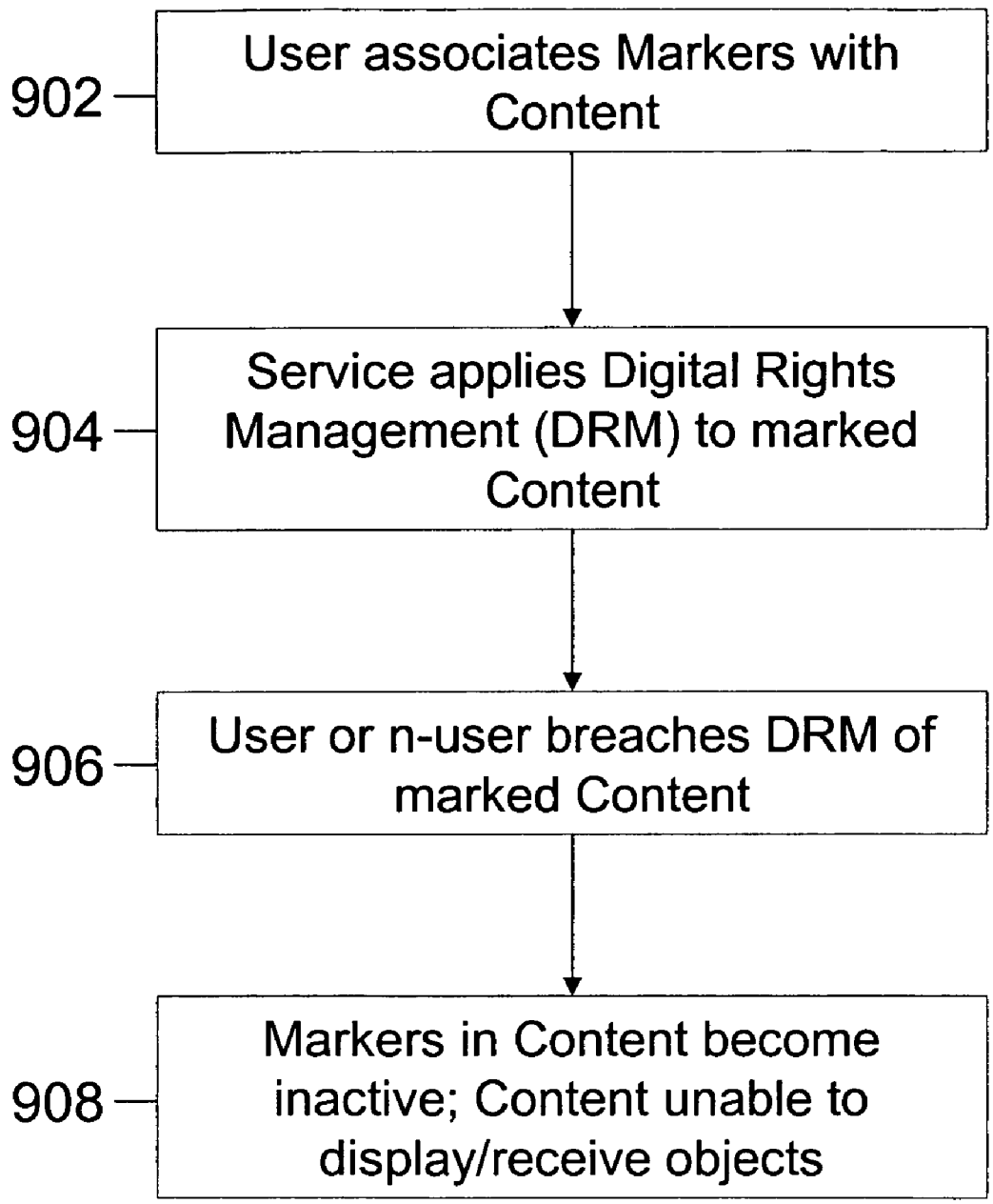
FIG. 9 is a block diagram depicting a plurality of operations including applying digital rights management to content according to an embodiment of the invention.

Another type of control that Service can employ for Content, Markers, and insertions/overlays is Digital Rights Management (DRM). DRM can be used to protect marked Content, active and/or interactive, so that it cannot be altered later. For example, DRM can prevent marked Content from being later edited to include or be included in objectionable material. With reference to FIG. 9, after a User associates Markers with Content, at 902, the Service can apply DRM to the marked Content, at 904. Thereafter, if an n-User, or even the User himself, breaches the DRM of the marked Content, at 906, the Markers associated with the Content become inactive, at 908. This may mean that the Markers can no longer receive inserted and/or overlaid Objects. It may also mean that any Objects already inserted/overlaid at Markers in the Content are deleted from the Content.

11) Promoter Control and Updating of Inserted and/or Overlaid Objects

Figure 10:
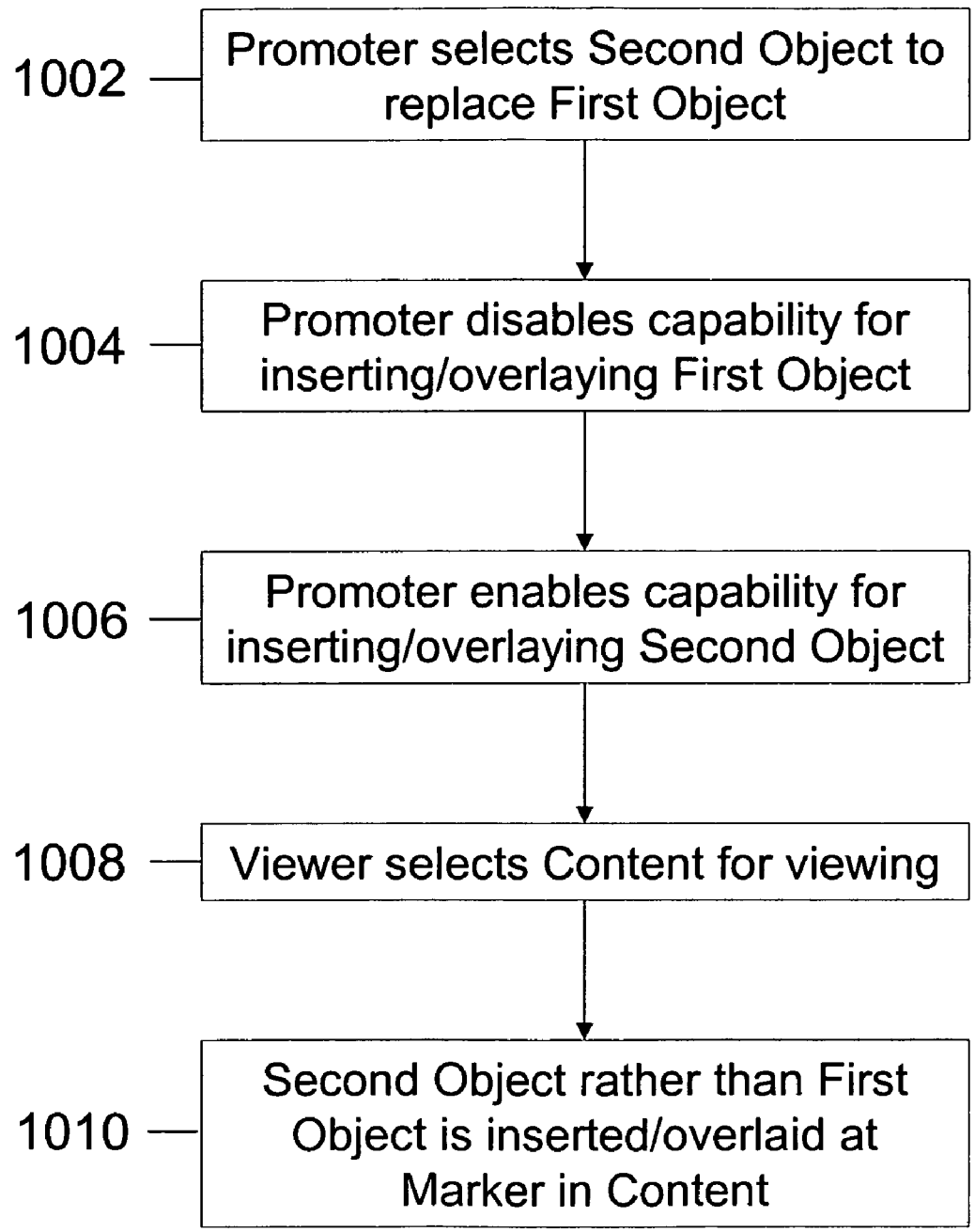
FIG. 10 is a block diagram depicting a plurality of operations including a promoter altering capability for inserting and/or overlaying objects according to an embodiment of the invention.

Embodiments of the invention provide Promoters with capabilities to control which Objects are inserted/overlaid at Markers, and allow updating of inserted/overlaid Objects to meet the Promoter's needs. With reference to FIG. 10 at 1002, after a Promoter has provided the Service with access to a first Object for insertion/overlay in marked Content, a Promoter may identify or select a second Object to replace the first Object. Therefore, the Promoter disables capability for insertion/overlay of the first Object, at 1004, and enables capability for insertion/overlay of the second Object, at 1006. Disabling insertion/overlay capability may involve removing the first Object from the Promoter's server, a Service server, or a third party server, or removing the Service's access to the first Object on the Promoter's or a third party's server. Likewise, enabling insertion/overlay capability may involve adding the second Object to the Promoter's server, a Service server, or a third party server, or providing the Service with access to the first Object on the Promoter's or a third party's server. The second Object may be provided to the Service or a third party by other means as well, such as by providing storage media including the second Object, although other alternative may also be used.

Once capability for inserting/overlaying the second Object is enabled, when a Viewer selects marked Content for viewing at 1008, the second Object rather than the first Object is inserted and/or overlaid at a Marker in the Content.

Figure 11:
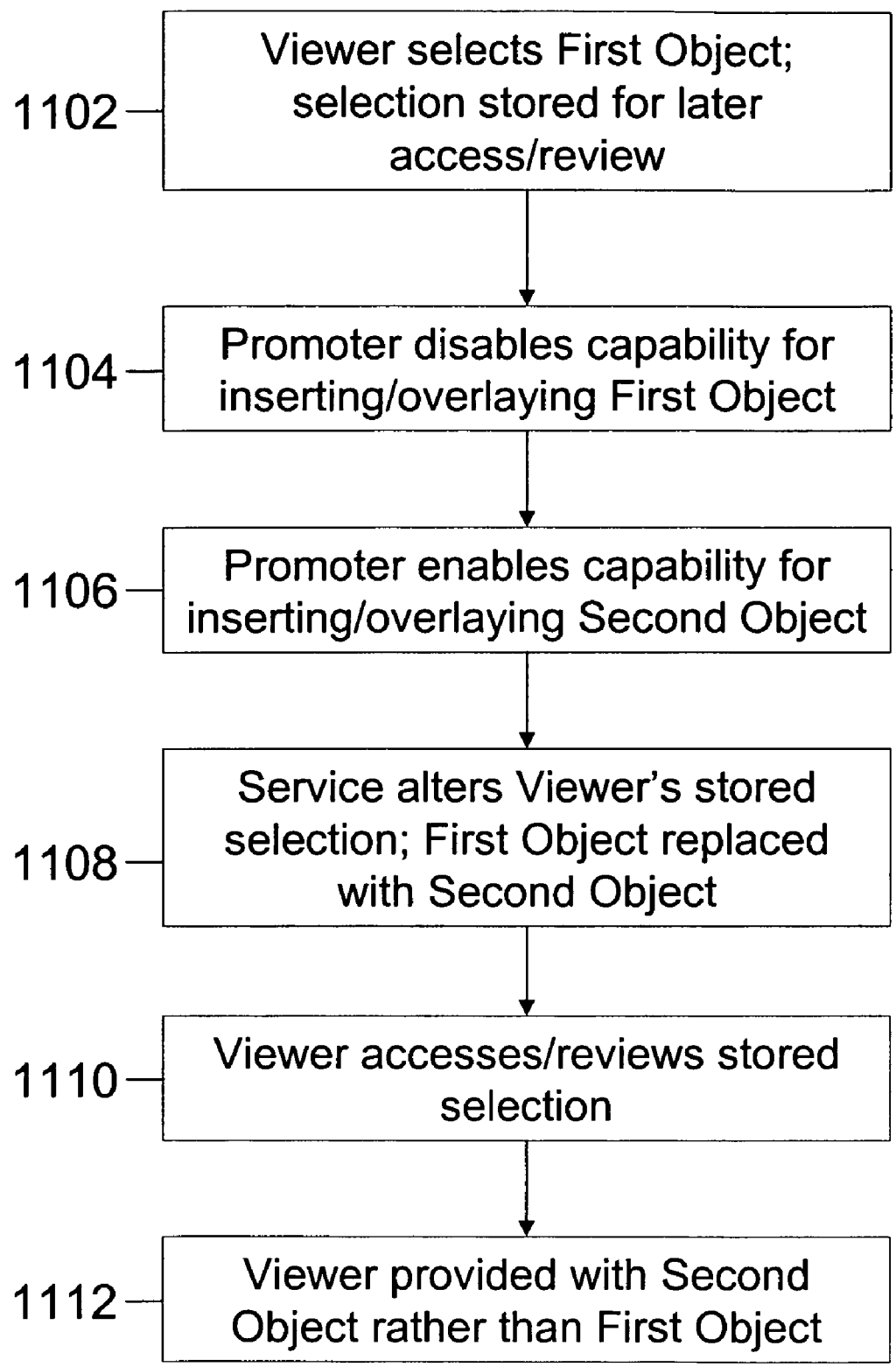
FIG. 11 is a block diagram depicting a plurality of operations including a promoter replacing an object with another object in a stored selection according to an embodiment of the invention.

The ability to update Objects can likewise include Objects already selected by Viewers and stored for later review. Further detail on this capability is provided in FIG. 11 and described below. As shown at 1102, a Viewer selects a first Object in marked Content, and the selection is stored so that the Viewer can access and/or review the Object at a later time. Alternatively, the Viewer may have downloaded and stored the Content itself without selecting a specific Object, although the Content already includes Objects inserted at Markers.

Sometime after the Viewer selects a first Object or downloads the Content, the Promoter decides disables capability for the first Object to be inserted/overlaid, at 1104, and instead, enables capability for insertion/overlay of a second Object. The Service, upon some pre-set time interval or some triggering action (e.g., Viewer connects to Internet, Viewer selects stored Content for viewing, Promoter sends request), alters the Viewer's stored selection so that the first Object is replaced with a second Object, at 1108. When the Viewer then accesses and/or reviews the stored selection (or Content), at 1110, the Viewer is provided with the second Object and its associated data rather than the first Object. The System may detect that the Viewer has limited bandwidth for transferring information, and may regulate the rate at which Objects are downloaded to the Viewer to prevent overloading the Viewer's bandwidth.

With the capability to update Objects as described, Promoters can ensure that Viewers receive the latest, most up-to-date and most relevant information that a Promoter wishes to provide. Further, Viewers can obtain updated information from previous selections, eliminating the need to access Content and repeat selections each time the Viewer wishes to learn about, for example, a Promoter's latest sale items, updated news stories, or promotional discounts or packages.

12) Insertion of Virtual Environments for Advertising, Additional Content Viewing and Sharing, and Social Networking Virtual environments represent another class of embodiments of the invention that a Service can enable for Users, Viewers, and Promoters, to further enrich a Viewer's Content-based experience.

Figure 12:
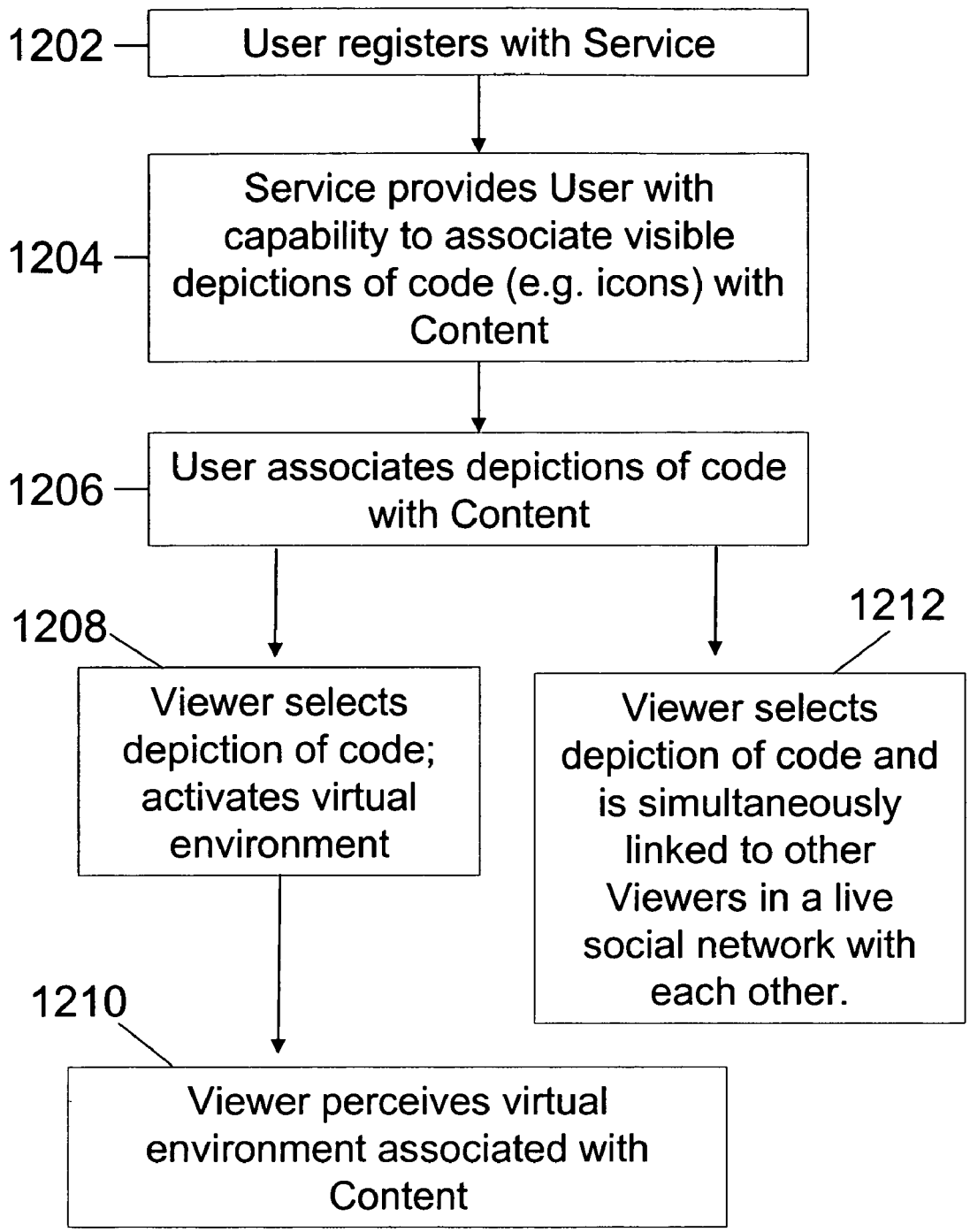
FIG. 12 is a block diagram depicting a plurality of operations including associating code relevant to a virtual environment with content according to an embodiment of the invention.
Figure 13:
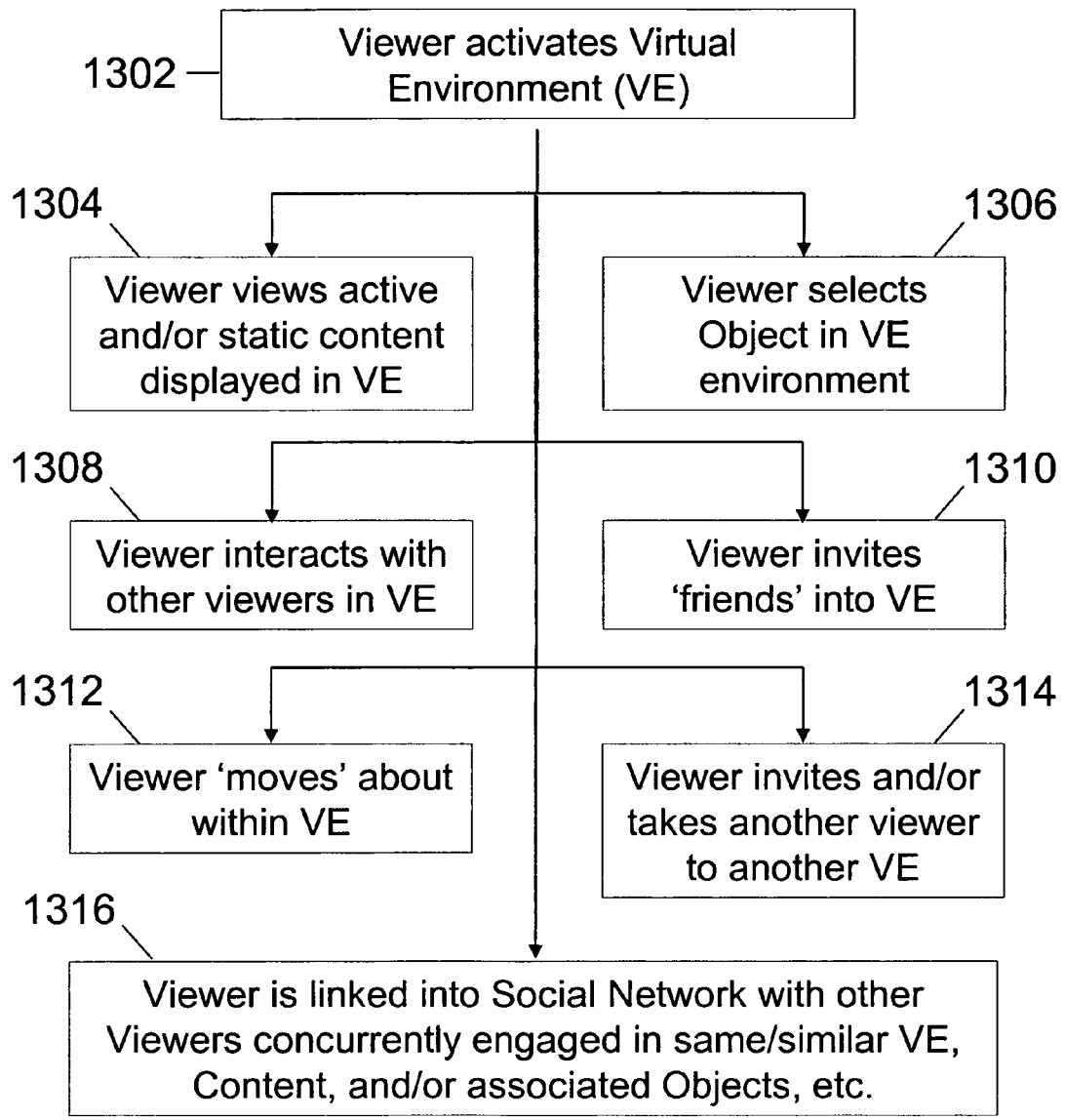
FIG. 13 is a block diagram depicting a plurality of operations relevant to a virtual environment according to embodiments of the invention.

With reference to FIG. 12, once a User registers Content with a Service, at 1202, the Service provides the User with the capability to associate visible depictions of code ('Code' hereinafter) (e.g., icons) with the Content, at 1204. As with Marker data, a Service will receive from a User and retain a record of data relating to the placement of Code, including characteristics relating to the placement of the Code relative to the Content. The Code enables a Viewer to see Objects inserted/overlaid in such virtual environments as virtual product rooms, virtual meeting rooms, virtual social networks (including as detailed in the above referenced provisional patent application), or other virtual environments, whether live or static. Such virtual environments can include capability for voice over internet protocol (VoIP) communications, text messaging, or other means of communications between a Viewer and others.

By associating the provided Code with Content, at 1206, the User enables virtual environments to be inserted/overlaid at a Marker associated with the Content, or elsewhere such as at the beginning or the end of the Content (e.g., a video), in a Content title, or somewhere within the Content (as described in U.S. Pat. No. 7,168,051 referenced above). A virtual environment, once activated by a viewer by selecting an icon or other Code at 1208, can exist as a virtual world overlay on top of the visible Content, or as an environment that is separate from the confines of the visual Content.

Viewer-selected depictions of code can, in an embodiment, be used to link the Viewer into a live social network with other Viewers who are simultaneously engaged in Content having the same/similar context or metadata of the selected Code, or who are engaged in the same/similar depiction of Code, for live (e.g., concurrent, contemporaneous, simultaneous) communications with each other.

For example, if the Content is a digital photo, selecting (e.g., mouse clicking on) the Code icon, or perhaps clicking on the photo image itself, will expose to the Viewer a virtual environment around, on, or within the photo. If within the photo, the virtual environment could have spatial dimensions such that an image of the photo is visible to the Viewer, for instance on a wall of a virtual room. Thus, at 1210, the Viewer perceives the virtual environment associated with the Content. Content displayed within a virtual environment can include advertisements and/or other branded items having some relevance to and/or representation(s) of a promoter's products, commercial identity, or message, and will generally be intended and/or configured to attract a Viewer's interest.

A virtual environment, according to embodiments of the invention, allows simultaneous access to more than one Viewer. A Viewer will be able to see and interact with other Viewers of the Content who, by also selecting associated Code, can also enter into the Virtual environment with the Viewer. Each Viewer in a common virtual environment can be represented visually by either a live or static image, avatar, or some other graphic or pictorial identification that others in the virtual environment can see. Alternatively, Viewers in a common virtual environment can be invisible to each other, and/or can permit or prevent other Viewers from interacting with them.

Once a Viewer activates a virtual environment, as at 1302 in FIG. 2, numerous options may be available. At 1304, the Viewer can view active and/or static content in the virtual environment, and at 1306, select Objects inserted/overlaid within the virtual environment. For example, a Viewer viewing Content may select an Object which takes the Viewer to a McDonald's branded social networking room. The room could contain McDonald's branding throughout, including further selectable Objects linked to McDonalds related brand and/or product information. In another example, a Viewer could select an Object branded with a clothing brand (e.g., Versace, Gap), which would open a virtual environment. The Viewer could then take a virtual walk through a store, and even try on clothing using a virtual mannequin having/representing the Viewer's physical dimensions (e.g., height, weight) and/or the Viewer's face/head. The Viewer could interact with other Viewers also in the virtual environment, as at 1308, getting recommendations for links to other clothing websites, talking with company representatives and/or sales people, meeting new friends, and carrying on other social networking activities. Additionally, selecting or otherwise interacting with a branding Object in a virtual environment can link the Viewer with others (e.g., whether also inside the virtual environment, outside it, or both) based on matching and/or similar metadata descriptors associated with the Object.

If, for example, a Viewer selects and enters a virtual environment for a department store, the Viewer can select Objects inserted/overlaid within that virtual environment which take the viewer into other virtual environments. For example, the Viewer may want to wander back and forth between the department store virtual environment and virtual environments of various merchandise companies, by selecting Objects representing the merchandiser's brand or products. The Viewer can even invite other Viewers in the first virtual environment to come with them into the other virtual environments, as at 1314. In this instance, the invited Viewer, accepting the invitation, can cede control, allowing the inviting Viewer to take both viewers into the second virtual environment simultaneously.

A virtual environment can include a plurality of virtual rooms (which can also be scenes, environments or other depictions of an n-dimensional environment wherein 'n' is greater than or equal to 2, and a Viewer can 'move' about within the virtual environment, at 1312, such as from one room to another. This may involve selecting Objects representing 'doors' to other rooms, or a Viewer may be able to select and drag or otherwise move a representation of themselves (e.g., an avatar) in a virtual environment through a virtual environment representation of a doorway, or some other method. The movement of the Viewer may be visible to other Viewers in the virtual environment. Likewise, the Viewer may be able to see other Viewers, or viewable representations thereof, moving about within the virtual environment, much as if all the Viewers were in a real world environment. Users can move within the virtual environment and move to and within other virtual environments in an expansive virtual world.

Each virtual room can contain movie screens, areas for displaying photos, videos, and/or text content, and/or inserted/overlaid Objects that link to other types of Content. The Viewer could select and play a video on one screen, while viewing photos on another area of the virtual room, and simultaneously selecting playing uploaded music on a virtual audio sound system embedded into the virtual environment. The Viewer could invite other Viewers in the virtual room to enjoy the sights and sounds, and can converse with them via email, text messaging, voice and/or video chat, VoIP, or any of a number of other communications methods. A Viewer, while in a virtual environment, can also contact friends or associates who are not simultaneously in the same virtual environment, and invite them in to share a rich virtual environment experience, as at 1310. For example, in addition to the communications methods listed above, the Viewer might select and drag a listing for a friend out of a 'buddy list' and into the virtual environment. As a result, a message may be sent to their friend inviting them into and providing information on how to access the virtual environment.

The effect of a virtual environment, as a shared social and entertainment experience, is that a Promoter can create a relatively 'captive' environment, immersing Viewers in a fully branded environment replete with the Promoter's identity and products. The longer a Viewer stays inside a virtual environment, the longer he is exposed to brand names or branded objects, and the more completely and effectively a Promoter can convey information to the Viewer. Therefore, in an embodiment, a virtual environment can present a collection of commercial transaction access points and/or commercial exposures, such as a virtual trade show, virtual mall, virtual department store, virtual entertainment complex, virtual commercial directory, or any combination thereof. In one example, in a real estate context, a real estate agent could take a client on a virtual tour around the exterior and/or interior of multiple homes, and can refine presented virtual environment based upon the client's desired features (e.g., number of bedrooms, etc.). Selecting different doors in a virtual environment can take the client to different properties, to different sales agents, to different geographical markets, etc.

Similarly to how Viewers can be invited into a virtual social networking environment, as already described, Data Packets associated with Content can serve the same or a similar purpose. Thus, a Viewer selecting a Data Packet may be invited into, or perhaps taken directly to, an n-dimensional (e.g. 2, 2½D, 3D, etc.) environment including avatars of other already present members/participants. Upon entering, there may be a welcome message and instructions on how to participate inside that environment. These instructions may include information on how to assume an avatar form, how to chat with other participants, how to move about within the environment, and other activities. Likewise, entry of the Viewer into the environment could activate a signal to other participants who may want to initiate interaction with the Viewer.

As shown at 1316, once the view activates a Virtual Environment, the Viewer can be concurrently linked with other Viewers in a live social network, wherein the other Viewers are concurrently engaged in the same and/or similar Virtual Environment, context, or Content.

13) Generating and Distributing Revenue Gained Through Insertion/Overlay of Content A system as described in an embodiment herein therefore also includes a revenue collection mechanism. Generally speaking, the revenue collection mechanism identifies instances of specified payment-obligation-incurring actions which, when taken by certain entities, for the basis for a payment obligation. Several examples of 'specified actions' are described below. A revenue collection mechanism, upon identifying an incidence of a specified action, creates a record indicting one or more of a payment obligation, an entity obligated to provide payment, and one or more entities entitled to receive all or a portion of the payment. Such record can be stored at a memory (data storage) means of a central server or otherwise.

There are numerous ways by which a Service can generate revenue through the numerous embodiments described herein. The Service can charge Promoters to place their Objects at the Service's Markers. Charges can vary based on the number of Objects inserted/overlaid, or the duration of time over which a Promoter has access to Markers for inserting Objects. The Service can receive payments from a Promoter based on the amount of sales and/or profit the Promoter generates through Viewers selecting inserted/overlaid Objects, or the total number of 'hits' a Promoter's Objects receive, regardless whether sales result from those 'hits'. Promoters could be charged for access to different geographic areas. Charges could also increase for placing Objects at Markers in highly popular Content, or Content accessible through particular Hosts. These are only a few examples, and should not be taken as limiting the possible revenue generating embodiments in any sense.

With regard to distribution of revenues or payments of other types, there are also many options conceived with regard to embodiments of the invention. For example, Viewers could be paid to recommend Objects to other Viewers, for example by using a tool and/or capability provided by the Service. A Viewer, before, during, or after selecting an Object, or while viewing Content, could select an icon or other command, and send a message to another Viewer recommending the Content and/or Object. The message would have information associated and/or embedded within it which would inform and/or provide the receiving Viewer with information guiding them to the recommended Content and/or Object. The payment may be based solely on the recommendation, and/or may include some payment for any sales that result from the recommendation. Viewers may also receive payment or some other value for identifying and flagging problems with Content and/or Objects inserted/overlaid in Content.

Users, Promoters, or others could receive payment for any revenue and/or profit resulting from Objects inserted/overlaid at Markers the User associated with Content. This serves as an incentive for Users to mark Content, and could form the basis of a new business model. Additionally, Users, Promoters or others could receive revenue based on the amount of time Viewers spend in virtual environments/worlds (VE) triggered by selection of an inserted/overlaid Marker, Object, Data packet, Icon, or other similar code, or selection of inserted/overlaid Markers, Objects, Data packets, Icons, or similar code within a VE initiated by a Viewer action relative to marked Content.

Hosts may be compensated for referring Users to the Service, and for providing the Service with functional access to marked Content located on their server(s) and/or websites. Functional access may include, as described above, the ability to edit Content or Markers in Content, for example when offensive material is detected in Content through flagging. Likewise, the Service may need to be able to remove the Content entirely from the Host site and/or return it to affect corrective actions related to Content.

Objects in content or in a virtual environment could also be used to provide a Viewer with coupons for products or services. For example, the Viewer could select and 'open' a virtual refrigerator or cabinet and be presented with one or more Objects (e.g., food items, household items, entertainment events, etc.). The Objects may include an indication that a special offer (e.g., coupon, rebate, etc.) related to an aspect (e.g., appearance, etc.) of the Object is available to the Viewer. For example, the Viewer may see an object appearing as a bottle of ketchup, with visual highlighting distinguishing it from other similarly placed Objects. By selecting the ketchup bottle object, the viewer can obtain a coupon usable for a commercial transaction (e.g., a purchase, rental, lease, etc,) related to the item. The commercial transaction utilizing the coupon could be a virtual transaction (e.g., in a virtual world such as Sim City), an on-line actual transaction (e.g., at Amazon.com), a real-world physical transaction (e.g., at a grocery store), or any other commercial transaction. Revenue could be generated by obtaining payment from Promoters for placement of objects providing access to coupons, etc., such as by auctioning object placement to the highest bidder.

In general, embodiments of the invention provide the capability to, and indeed anticipate, a broad range of new business and revenue producing models not limited to those examples specifically listed herein.

14) System for Creating, Distributing, Hosting, and/or Viewing Marked Content

Figure 15:
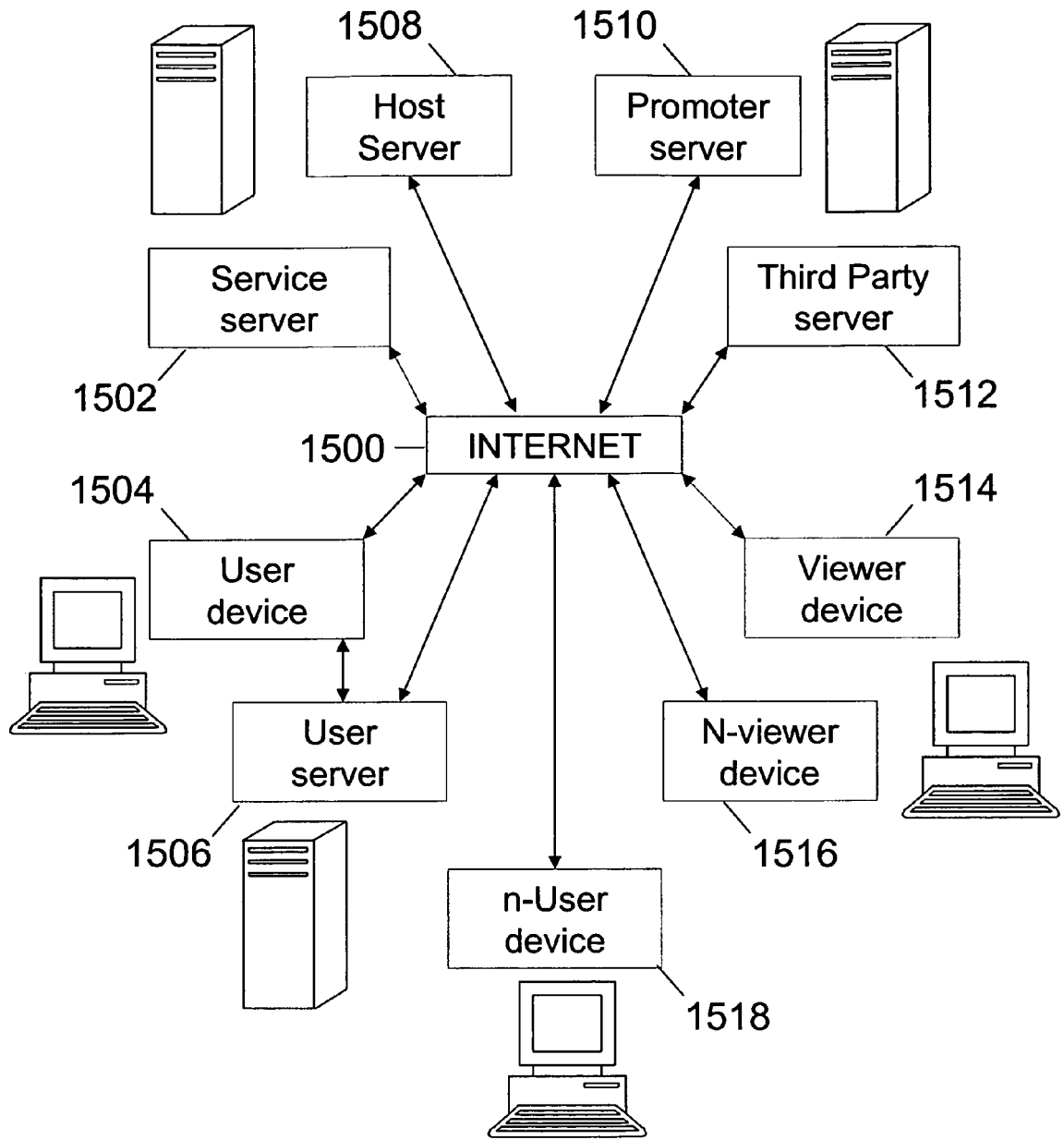
FIG. 15 is an iconic system diagram depicting aspects of a system for creating, distributing, hosting, and/or viewing content having enhanced informational and/or other value according to an embodiment of the invention.

With reference to FIG. 15, a system is described herein by which viewable content can be marked, distributed, hosted, and/or viewed, and objects can be inserted and/or overlaid relative to marked content. Embodiments of a system need not include all features or elements depicted according to FIG. 15, and can include other features or elements as would be understood to those having ordinary skill in the art.

An embodiment of a system can include between one and n-servers, where 'n' can represent either a fixed or variable number of servers in a system. A Service server 1502 can retain Marker-relevant data, Content-relevant data, and User-relevant data, as well as other data useful to facilitate placement and use of Content Markers according to embodiments of the invention. A User server 1506 may be present for posting Content for distribution, such as when a User is also a Content Host, although it is not limited to only such situations. A Host server 1508 may be present in embodiments to provide hosting for marked Content. An example of a host server would be a server maintained by a website provider (e.g., YouTube, Google Images, Kodak Photo Gallery, a government agency, an educational resource, or others).

An embodiment of a system may include a Promoter server 1510 where Objects can be retained, or from which Objects may be provided to the Service for inserting and/or overlaying relative to marked Content. A third party server 1512 may be present, and may provide data retention, transfer, processing or other functions or services on behalf of a Host, Promoter, Service, User, or Viewer.

Any and/or all servers in a system according to embodiments will generally, but not necessarily, be connected in some form to the internet 1500 (or another network). Connection to the internet 1500 may be provided through a third party internet service provider (ISP), or through a proprietary internet service provided and/or controlled at least in part by a Host, Promoter, Service, User, and/or Viewer. Connections may be wired or wireless, and may utilize any of the numerous wireless technologies (e.g., 802.11 a, 802.11 g) and/or wired technologies (e.g., high speed electrically conductive cable, telephone modem, fiber optic cable) currently available and/or known to those having skill in the art. Various equipment and/or devices such as routers, repeaters, modems, relays, switch boxes, transmitters, network card devices, and other devices may also be utilized to facilitate and/or enable data transmission between servers (and/or devices) and the internet, and with other servers (and/or devices) through the internet. Any such equipment and/or devices, either individually or collectively, can be considered a data transmitting means in an embodiment.

In addition to servers, a system according to various embodiments also includes devices for creating, marking, storing, viewing, editing, and/or otherwise transmitting, receiving, and/or utilizing marked Content, although the use of devices is not so limited. A User device 1504 and/or an n-User device 1518 provides numerous functions as described above with regard to creating and/or marking Content, and uploading Content, marked or unmarked, to a Service and/or a Host. A User device 1504 and/or an n-User device 1518 can also be used for viewing marked or unmarked Content, editing Content, selecting Objects, and processing Object-linked data, among numerous other uses and activities.

A Viewer device 1514 and/or an n-User device 1516 can likewise be used for viewing marked or unmarked Content, editing Content, selecting Objects, storing selections, and processing Object-linked data, among other uses and activities. A Viewer device 1514 and/or an n-User device 1516 can also provide for communicating with other Viewers and/or n-Viewers, via email, text messaging, instant messaging, voice messaging, VoIP, or other communications technologies and/or methods currently in use or known to those having ordinary skill in the art.

Viewer devices 1514 and/or User devices 1516 may transfer data with and/or via the internet by any of the devices, technologies and/or methods listed above regarding servers, as well as by any other technologies and/or methods currently in use or known to those having ordinary skill in the art. However, viewer devices 1514 and/or User devices 1516 may also operate temporarily or for extended periods of time without having an active connection with the internet, either wired or wireless. Thereafter, such devices can then be connected with the internet, and data can be transferred with and/or via the internet.

A User and/or a Viewer device will typically include some type of software generated 'desktop' comprising all or some portion of the viewable display of the device. The desktop may be functionally enabled by software resident on the device (e.g., Microsoft Windows desktop, Mac OSX desktop, or others), or on a peripheral connected device. Alternatively, it may be a web desktop (a.k.a. 'webtop' or 'virtual desktop') enabled at least in part by a remotely located software source acting over the internet and interacting with browser software (e.g., Microsoft Internet Explorer, Safari, FireFox, Netscape Navigator, or others) on a device.

It should be clear, therefore, that any device and/or server listed or implied to exist in the embodiments described herein may be connected with any other device and/or server listed or implied to exist herein via permanent, lasting, temporary, and/or occasional connection with and/or through the internet. Further, Service-related activities can be enabled and can transact via an entirely web-based interaction. For example, all software, files, programs, and/or capabilities of a Service or otherwise useful to practice the invention can be accessed and employed by a User, Promoter, Viewer, n-User, or n-Viewer via the internet or another network. This arrangement enables practice of an embodiment of the invented methods from any internet-linked or linkable device, no matter where located. For example, a User need not use the same device or access a Service from the same location at each instance, but can remain mobile. Also, an embodiment of the invention can be practiced on, by, or through any internet-linked or linkable device, even if the device has not been prepared in any particular way for such practice. For all practical purposes, even a device which has no capability for storing files, software instructions, Content, etc., can practice an embodiment of the invention. This is because any and/or all instructions, files, Content, etc. can be accessed and executed via the internet, and a beneficial result can then be transmitted to a Viewer or other for Viewing and/or other purpose at the device.

User and/or n-User devices (1504 and 1518, respectively, and Viewer and n-Viewer devices (1514 and 1516, respectively) may be any electronic device capable of and/or aiding in viewing, processing, storing, editing, manipulating (e.g., altering frame rate, image contract, tone quality), transferring, or otherwise using marked and/or unmarked Content, Objects, and/or Object-linked information. Examples include, but are not limit to, personal computers (e.g., desktop, mobile, palmtop), personal data assistants (PDA), electronic game systems (e.g., Playstation III, X-box 360, Nintendo Wii), mobile telephones, televisions, digital video recorders (DVR), satellite enabled devices (e.g., navigation, radio, communication) and other devices or instruments. This includes such devices and/or instruments whether they are generally considered consumer, commercial, enterprise, scientific or industrial in nature.

Devices and/or servers according to embodiments of a system described herein also generally include peripheral input and/or output devices. Examples of such I/O devices may include a keyboard, mouse, display ('monitor'), wireless card, antenna, printer, facsimile, scanner, enabling device (such as a may be visually, physically, and/or hearing impaired), port replicator, docking station (e.g., for media players including iPod, for mobile phones, for mobile personal computer), although the embodiments are not so limited.

Likewise, devices and/or systems described herein may be capable of operation utilizing various operating systems, including but not limited to those provided by or based upon Microsoft, Apple, Novell, Linux, Unix, or other commercial, open, and/or proprietary technologies, and whether 32-bit, 64-bit, or some other architecture currently available or know to those having ordinary skill in the art.

As a relatively centralized data-handling entity, a Service can send, receive, accommodate, interpret, store, compile, connect, recognize, manipulate, alter, process, pass-through and/or ignore numerous types and quantities of information to and/or from numerous types and quantities of information sources and/or targets (e.g. requesters or designated recipients). Other data-handling activities are also possible. A Service can recognize and record transactions, and provide a record for later retrieval or other action. A Service can recognize Marker, Object, and data packet related activity whenever a device or entity undertakes such activity (e.g., selection, execution, placement, association, or others) and the device or entity is concurrently, or subsequently becomes, electronically connected with the internet. Likewise, a Service can retain a record of every Marker, Object, and/or Data Packet associated with Content, as well as the information (e.g., textual, graphic, audio, or other) comprising an Object or Data Packet, and various other relevant information (e.g. temporal information, User information, or other information) related to the same.

Therefore as shown in FIG. 16, Viewers in live social networks and/or n-dimensional virtual environments can communicate with each other, share advice, trade content files and partake in other interactive activities involving 'information', as at 1602, and a service can record and store some or all of the information, as at 1604. At 1606, Viewers can access this stored (historical) information at the same time or at a later time when selecting Objects, Markers, or Content, such as when entering into a specific social network and/or a specific virtual environment within which and/or from which such information originated. As shown at 1608 and 1610, respectively, the accessed information can be use by Viewers to create live social networks and/or Virtual environments, and a Service can use the information for commercial purposes. Therefore, storage and availability of information arising within social networks and/or n-dimensional virtual environments for concurrent and/or later use is contemplated within an embodiment of the invention.

Therefore, as described herein, the embodiments of a system for creating, distributing, hosting, and/or viewing marked Content, among other activities and/or operations described herein, may be quite broad and inclusive.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention. This can include altering the sequence of operations depicted in the figures according to various embodiments, as well as the sequence of various figures should not be interpreted as limiting the scope, character, operability or utility of alternative embodiments of the invention.

From the foregoing, those of skill in the art will appreciate that several advantages of the present invention include the following:

Embodiments of the present invention provide Content creators (Users), Hosts, and Promoters with new and highly adaptive opportunities to generate revenue streams. Embodiments of the invention have the realistic potential to enable entirely new and innovative business models.

Embodiments of the present invention prevents Content from quickly becoming irrelevant and uninteresting, and allows Promoters to target information to those Viewers most likely to have an interest in their information.

Embodiments of the present invention provide the ability to prevent Promoters' names, brands, products, and information from being associated with objectionable material, thereby providing the ability to protect their image while simultaneously increasing their marketing reach and effectiveness.

Embodiments of the present invention provide Content Viewers with ready access to highly relevant, interesting, fresh, and helpful information, and keep Content interesting. In essence, Content becomes a dynamic information source and a rich experience, including even an access point to interactive virtual environments populated by others sharing similar interests.

Embodiments of the present invention cumulatively possess the potential to save all parties involved, Promoters, Users, Viewers, Hosts, and others enormous amounts of at least two precious resources; time and money. This is accomplished by enhancing of relevance of Content, which can be tailored by Promoters, Users, Viewers, and perhaps even Hosts, to connect those who want with those who have, quickly and efficiently.

Embodiments of the present invention also provide a system and a method for enabling the above mentioned advantages, including a Service that provides the enabling tools and services. Thus, the Service provides the ability to reshape the way people interact with each other, with providers of good, services, and information, and with the Content that so strongly influences social culture.

The advantages listed here do not constitute an exclusive list, nor should they be interpreted, either individually or collectively, as a statement of the complete intents and/or purposes of the present invention.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that the method, system and apparatus of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A method for increasing the derivable value of device-accessible viewer-perceivable content, comprising:
   providing to an internet-linked device user an option to associate one or more of software-encoded markers, data packets, and visible depictions of code (icons), with device-executable viewer-perceivable content;
   assigning a unique identifier to the content;
   providing to the user access to one or more of a marker, a data packet, an icon, or any combination thereof;
   providing to the user access to internet-linked device-executable tools configured to enable the user to associate the one or more markers, data packets, or icons with the content, wherein associating one or more markers, data packets, or icons with content comprises:
   selecting a viewer-perceivable element of the content,
   selecting a marker, data packet, or icon from among one or more available marker types, data packet types, and icon types, and
   creating data indicating an association between the marker, data packet, or icon, and the selected viewer-perceivable element of the content such that execution of the content on a device configured to render the viewer-perceivable element perceivable to a viewer also renders operative the marker, data packet, or icon when the associated viewer-perceivable element is rendered perceivable;
   providing to the user a pattern recognition software programmed to perform functions of:
   altering one or more characteristics of a marker to correspond with a changing characteristic of an associated viewer-perceivable element, wherein the altered characteristic of the marker comprises one or more selected from the group including size, shape, color, transparency, position within a viewer-perceivable field of view, viewer-perceivable position relative to the viewer-perceivable element, and progressive transition out of a viewer-perceivable field of view;
   receiving from the user one or more of marker data, data packet data, or icon data, wherein the marker data, data packet data, or icon data include one or more characteristics relating to the user's association of one or more of the markers, data packets, and icons with the content;
   assigning one or more content descriptive values to the content; and storing a data record at a data storage medium of a server, the data record including the unique content identifier, the one or more descriptive values, and the marker data, data packet data, or data corresponding to icons.

2. The method of claim 1, further comprising one or both of:
   (a) reviewing the content for objectionable material, and if objectionable material is identified in the content, acting to prevent association of one or more of markers, data packets, and icons with the content including one or more selected from the group consisting of:
      denying to the user access to one or more of markers, data packets, and icons for use with respect to the content including the objectionable material,
      removing the objectionable material from the content, and
      interfering with a viewer's ability to perceive the objectionable material in the content, and
   (b) receiving from a viewer of marked content an indication that the content contains one or both of objectionable material and inappropriate marking, reviewing the content, and determining the necessity for corrective action.

3. The method of claim 1, further comprising:
   applying Digital Rights Management (DRM) to content that includes one or more of markers, data packets, and icons, the DRM configured so that an unauthorized alteration of the content will either diminish the functionality of the one or more markers, data packets, and icons associated with the altered content, or remove one or more of the markers, data packets, and icons from the altered content, or both.

4. The method of claim 1, wherein the characteristics included in one or more of the marker data, data packet data, and icon data include one or more selected from the group consisting of user identification data, the unique content identifier, user recommendations of objects to be inserted or overlaid at the marker, marker visual attributes, a unique marker, data packet, or icon identifier, an authorization code, and data corresponding to a temporal or spatial positioning of the marker, data packet, or icon within a viewer perceivable portion of the content.

5. The method of claim 1, further comprising:
   placing one or more of a promoter-designated object and data packet at one or more markers associated with content, the placing comprising one or more actions selected from the group consisting of:
      providing a promoter with access to one or more tools configured to associate one or more of objects and data packets with markers in marked content,
      providing the promoter with access to the markers,
      receiving from the promoter data identifying one or more of selected objects or data packets designated by the promoter for placing at a marker, and
      receiving from the promoter data indicating object-relevant values linked with an object or data packet-relevant values linked with a data packet; and
   receiving from the promoter access to objects or data packets designated by the promoter for placement at a marker in content.

6. The method of claim 5, wherein selection of content by a viewer makes available to the viewer a directory, the directory listing all or a subset of all data packets and objects associated with the content, and wherein the listed data packets and objects can be selected by the viewer, either individually or collectively, for taking one or more actions selected from the group consisting of viewing, storing, responding to, navigating to, and forwarding the selected data packets and objects.

7. The method of claim 1, wherein the content is either accessed via the internet or saved at a device used by a viewer, and further comprising one or both of:
   (a) detecting selection by a viewer of content including a marker, wherein the marker has previously been assigned a unique marker identifier,
   identifying the unique marker identifier, and
   placing at the marker an object, wherein:
      the object comprises one selected from the group consisting of:
         an object specified for placement at that marker or a marker of that type,
         an object specified for placement at a marker in that content or in content of that type,
         an object of a type suggested for placement at that marker or at a marker of that type, and
         an object of a type suggested for placement at a marker in that content or in content of that type,
      wherein a specification or suggestion for object placement is provided by one or more selected from the group consisting of a content creator, a user, a promoter, a host, or a provider of markers, and wherein an object type is substantial determined based upon object-relevant values, a marker type is substantially determined based upon marker data, and a content type is substantially determined based upon content descriptive values; and (b) detecting selection by a viewer of content including a data packet, accessing one or more previously set data packet parameters, and executing or disabling executable data of the data packet as specified by the one or more data packet parameters.

8. The method of claim 7, wherein:
the content is altered between the time the marker or data packet was associated with the content and the time the viewer selection is detected, and
a data packet parameter either continues to function or ceases to function as determined by a previously set data packet parameter.

9. The method of claim 7, further comprising:
specifying or suggesting a first object or data packet for placement at a marker;
enabling a capability to place the first object or data packet at the marker;
subsequently disabling the capability to place the first object or data packet at the marker:
specifying or suggesting a second object or data packet for placement at the marker;
enabling a capability to place a second object or data packet at the marker; and
placing the second object or data packet rather than the first object or data packet at the marker.

10. The method of claim 7, further comprising:
continuing to place one or more of objects and data packets at markers in marked content, including one or more instances of removing a previously placed object or data packet and placing another object or data packet at the same marker, during a period of continued viewing of the content by a viewer.

11. The method of claim 1, further comprising:
detecting a viewer selection of marked content accessed via a host,
recognizing relevant attributes including one or more of viewer location attributes, viewer attributes, viewer time attributes, promoter time attributes, and content attributes; and
placing at least one corresponding object or data packet at one or more markers associated with the content, wherein one or more of geographically-relevant objects or data packets, viewer-relevant objects or data packets, viewer time-relevant objects or data packets, promoter time-relevant objects or data packets, and content-relevant objects or data packets correspond with the relevant attributes, respectively.

12. The method of claim 1, wherein an icon, either when selected by a viewer or when automatically executed on a user device, causes the device, a connected device, or both, to activate a viewer-perceivable n-dimensional virtual environment wherein n is greater than 1, and wherein the virtual environment is perceived as existing within, surrounding, or superimposed upon the viewer-perceivable content.

13. The method of claim 12, wherein the viewer-perceivable virtual environment comprises one or more characteristics selected from the group consisting of:
an ability to display active content, static content, or both, within the virtual environment,
an ability for a viewer to interact with other viewers in the same virtual environment via one or more methods selected from the group consisting of vocal, textual, symbolic, and visual communication,
an ability to depict within the virtual environment an avatar representing the viewer,
an ability for a viewer to navigate throughout the virtual environment,
an ability for a viewer to select one or more of an object, an icon, and a data packet within the virtual environment,
an ability for a viewer to invite a third-party viewer into the virtual environment and if such invitation is accepted, for the virtual environment to be simultaneously perceivable to the third-party viewer, and
an ability for a viewer to invite or accompany other viewers in a virtual environment to another virtual environment.

14. The method of claim 1, further comprising:
detecting selection by a viewer of an object or data packet placed at a marker in content;
recognizing the unique identifier of the object or data packet; and
providing to the viewer an option to view data associated with the object or data packet substantially immediately, to store data associated with the selected object or data packet for later access and viewing, or both.

15. The method of claim 1, further comprising:
providing to a user the ability to encode either or both of a data packet and a marker with a specific code, wherein the specific code is configured to control one or more capability selected from the group consisting of:
preventing execution of data in a data packet except upon correct entry of the specific code by a viewer,
associating the content with other content correspondingly encoded, and
associating a content provider with providers of content correspondingly encoded.

16. The method of claim 1, wherein access to one or more of tools, markers, data packets, and icons is provided via the internet.

17. The method of claim 1, further comprising:
detecting and maintaining a record of activity related to one or more of markers, data packets, icons, objects, and content, the activity comprising one or more selected from the group consisting of;
instances of placement of an object at one or more markers,
instances of associating markers with content,
instances of viewer selection of one or more marker, object, data packet, and icon,
instances of commercial transactions relating to viewer selection of a marker, object, data packet, or icon,
generation of proceeds arising from a commercial transaction relating to viewer selection of a marker, object, data packet, or icon, and
a referral by a user, promoter, viewer, host, or third party, of. another, to become a user, promoter, viewer, or host of one or more of content, markers, objects, and data packets.

18. The method of claim 1, further comprising:
retaining content at a data storage medium of a server, the content including one or more selected from the group consisting of a marker, an object, a data packet, and an icon; and
providing access to the content via an internet connection.

19. The method of claim 1, further comprising:

associating a marker with content, wherein the marker is associated with a specific visual element of the content;

placing an object at the marker; and altering one or more viewer-perceivable attribute of the object corresponding to one or more changes in the associated visual element, wherein the alteration comprises one or more selected from the group consisting of size, shape, color, rotation, degree of transparency, lighting, and position within a viewer-perceivable range of the content relative to other visual elements.

20. The method of claim 1, wherein:

one or both of selection of an object or execution of a data packet, whether by viewer selection or automatically, produces one or more effect selected from the group consisting of:

pausing a concurrent execution of content, opening a new content window on a device display, displaying full-motion video images, displaying still images, playing an audible audio clip, providing a result of executed software code, displaying a textual message, navigating an internet browser program to an internet destination, dispatching an electronic mail message, and opening a telephonic connection; and a viewer is provided with either no capability to control the execution of a data packet, or is provided with control comprising a capability to control one or more aspects of the execution of a data packet selected from the group consisting of start, stop, pause, resume, volume, speed, repeat, skip, next, previous, undo, edit, send, navigate, recall, save, forward, addressing, block, filter, and bookmark.

21. The method of claim 1, wherein selection by a viewer of content previously saved by the viewer on a data storage medium of a device initiates an internet connection, and further causes one or more actions selected from the group consisting of:

notifying a provider of markers of the selection, checking for updates to one or more objects or data packets to be placed at markers, checking for updated marker associations relative to the content, and placing one or more objects or data packets at markers in the content.

22. The method of claim 1, further comprising:

analyzing either marker-associated metadata in content selected by a viewer or codes placed at a marker by a viewer, or both; and enabling interaction between two or more viewers of content by linking the two or more viewers with each other via an interaction-enabling communication interface accessible to each of the two or more viewers, wherein the interaction comprises one or more of textual, audio and visual communication, and wherein the communication interface is presented to each viewer via an internet-linked device.

23. The method of claim 1, further comprising:

detecting selection by a viewer of either an object placed at a marker in content or a data packet placed at a marker in content, or both;

providing a separate viewer-perceivable section at a portion of a device display used by the viewer to make the selection; and displaying to the viewer in the separate viewer-perceivable section one or more promoter-relevant items linked by metadata with the selected object or data packet, wherein the promoter-relevant items comprise one or more selected from the group consisting of a product for sale, textual information, a static image, a full-motion video image, an avatar of another viewer, a representation of an identify of a commercial entity, and a virtual environment, and wherein one or more of the promoter-relevant items is selectable by the viewer to cause a response comprising one or more selected from the group consisting of:

initiating a commercial transaction relative to the item, initiating a communication medium, activating a virtual environment, and linking the viewer with other viewers.

* * * * *

UNITED STATES PATENT AND TRADEMARK OFFICE
CERTIFICATE OF CORRECTION

| | | |
|---|---|---|
| PATENT NO. | : 8,234,218 B2 | Page 1 of 1 |
| APPLICATION NO. | : 12/004392 | |
| DATED | : July 31, 2012 | |
| INVENTOR(S) | : Jack D. Robinson et al. | |

It is certified that error appears in the above-identified patent and that said Letters Patent is hereby corrected as shown below:

Column 41, Claim 2:
at line 56, replace "selected from the group consisting of;" with: --selected from the group consisting of:--.

Column 42, Claim 5:
at line 25, replace "selected from the group consisting of;" with: --selected from the group consisting of:--.

Column 44, Claim 17:
at line 59, replace "of. another" with: --of another--.

Signed and Sealed this
Thirteenth Day of November, 2012

David J. Kappos
*Director of the United States Patent and Trademark Office*